(12) United States Patent
Matsuzaki et al.

(10) Patent No.: US 7,308,583 B2
(45) Date of Patent: Dec. 11, 2007

(54) DATA DISTRIBUTION SYSTEM

(75) Inventors: Natsume Matsuzaki, Osaka-fu (JP); Toshihisa Nakano, Osaka-fu (JP); Tsutomu Matsumoto, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 888 days.

(21) Appl. No.: 10/348,956

(22) Filed: Jan. 23, 2003

(65) Prior Publication Data

US 2003/0161474 A1 Aug. 28, 2003

(30) Foreign Application Priority Data

Jan. 25, 2002 (JP) ............................. 2002-016547

(51) Int. Cl.
*G06F 21/00* (2006.01)
(52) U.S. Cl. .................... 713/189; 380/44; 380/200; 380/277
(58) Field of Classification Search ................ 713/157, 713/171, 189; 380/277–285, 201, 202, 45, 380/30, 44, 200
See application file for complete search history.

(56) References Cited

U.S. PATENT DOCUMENTS

| | | | | |
|---|---|---|---|---|
| 5,956,406 A | * | 9/1999 | Maldy | .......................... 380/30 |
| 6,398,245 B1 | * | 6/2002 | Gruse et al. | ................. 280/228 |
| 6,550,011 B1 | * | 4/2003 | Sims, III | .................... 713/193 |
| 6,629,243 B1 | * | 9/2003 | Kleinman et al. | .......... 713/163 |
| 6,728,379 B1 | * | 4/2004 | Ishibashi et al. | ............ 380/278 |
| 7,099,479 B1 | * | 8/2006 | Ishibashi et al. | ............ 380/281 |
| 2002/0150250 A1 | * | 10/2002 | Kitaya et al. | ................ 380/277 |

OTHER PUBLICATIONS

Gerard Salton, "Manipulation of Trees in Information Retrieval", Oct. 21-22, 1961, Communications of the ACM, pp. 103-114.*
Wen-Her Yang et al., "Secure Key Agreement for Group Communications", 2001, International Journal of Network Management, pp. 365-374.*
Tsudik et al., "One Simple and Secure Key Distribution", 1993, 1st Conference- Computer $ Communication Security, pp. 49-57.*
Briscoe et al., "Nark: Receiver-Based Multicast NOn-Repudiation and Key Management", 1999, ACM pp. 22-30.*

* cited by examiner

*Primary Examiner*—Kambiz Zand
*Assistant Examiner*—Tongoc Tran
(74) *Attorney, Agent, or Firm*—Wenderoth, Lind & Ponack, L.L.P.

(57) ABSTRACT

Each of a plurality of contents supply systems connected to a single user apparatus uses a group management method that employs flexible and unique tree structures. A manager in each contents supply system uses a system apparatus key distributed by a key management organization to generate a public list that corresponds to a unique tree structure, and releases the public list when the contents supply system is constructed. The user apparatus stores only an apparatus key corresponding to a leaf of the tree structure. Using the public list, which is released via a web page, package media or the like, the user apparatus reconstructs the tree sequentially from the leaf up, and derives a node key corresponding to the user apparatus. The user apparatus then decrypts an encrypted content using the derived node key.

19 Claims, 54 Drawing Sheets

FIG.3

APP KEY MNG TABLE 111

| APP INFO | |
|---|---|
| APP ID | APP KEY kdi |
| 1001 | kd₁ |
| 1002 | kd₂ |
| 1003 | kd₃ |
| ...... | ...... |

FIG.4

SYSTEM APP KEY MNG TABLE 121

| APP ID | SYSTEM INFO | |
|---|---|---|
| | SYSTEM ID (j) | SYSTEM APP KEY $Skdi^{(j)}$ |
| 1001 | 1 | $Skd_1^{(1)}$ |
| 1002 | 1 | $Skd_2^{(1)}$ |
| 1003 | 1 | $Skd_3^{(1)}$ |
| ... | ... | ... |
| 1001 | 2 | $Skd_1^{(2)}$ |
| 1002 | 2 | $Skd_2^{(2)}$ |
| 1003 | 2 | $Skd_3^{(2)}$ |
| ... | ... | ... |

FIG.7

MUSIC DISTR TREE TABLE

211

| NODE INFO | | | |
|---|---|---|---|
| LEVEL NO. | NODE NO. | NODE KEY | APP ID |
| 1 | 1 | $KeyA^{(1)}$ | — |
| 2 | 1 | $KeyB^{(1)}$ | — |
| 2 | 2 | $KeyC^{(1)}$ | — |
| 3 | 1 | $KeyD^{(1)}$ | — |
| 3 | 2 | $KeyE^{(1)}$ | — |
| 3 | 3 | $KeyF^{(1)}$ | — |
| 3 | 4 | $KeyG^{(1)}$ | — |
| 4 | 1 | $Skd_1^{(1)}$ | 1001 |
| 4 | 2 | $Skd_2^{(1)}$ | 1002 |
| 4 | 3 | $Skd_3^{(1)}$ | 1003 |
| 4 | 4 | $Skd_4^{(1)}$ | 1004 |
| 4 | 5 | $Skd_5^{(1)}$ | 1005 |
| 4 | 6 | $Skd_6^{(1)}$ | 1006 |
| 4 | 7 | $Skd_7^{(1)}$ | 1007 |
| 4 | 8 | $Skd_8^{(1)}$ | 1008 |

FIG.8

MUSIC PUBLIC LIST 221

| SYSTEM ID | 1 |
|---|---|
| PUBLIC INFO | |
| INDEX INFO (LEVEL NO., PATH NO.) | ENCRYPTED NODE KEY |
| (3, 1) | $E1(Skd_1^{(1)}, KeyD^{(1)})$ |
| (3, 2) | $E1(Skd_2^{(1)}, KeyD^{(1)})$ |
| (3, 3) | $E1(Skd_3^{(1)}, KeyE^{(1)})$ |
| (3, 4) | $E1(Skd_4^{(1)}, KeyE^{(1)})$ |
| (3, 5) | $E1(Skd_5^{(1)}, KeyF^{(1)})$ |
| (3, 6) | $E1(Skd_6^{(1)}, KeyF^{(1)})$ |
| (3, 7) | $E1(Skd_7^{(1)}, KeyG^{(1)})$ |
| (3, 8) | $E1(Skd_8^{(1)}, KeyG^{(1)})$ |
| (2, 1) | $E1(KeyD^{(1)}, KeyB^{(1)})$ |
| (2, 2) | $E1(KeyE^{(1)}, KeyB^{(1)})$ |
| (2, 3) | $E1(KeyF^{(1)}, KeyC^{(1)})$ |
| (2, 4) | $E1(KeyG^{(1)}, KeyC^{(1)})$ |
| (1, 1) | $E1(KeyB^{(1)}, KeyA^{(1)})$ |
| (1, 2) | $E1(KeyC^{(1)}, KeyA^{(1)})$ |

FIG.12

DVD TREE TABLE

511

| NODE INFO | | | |
|---|---|---|---|
| LEVEL NO. | NODE NO. | NODE KEY | APP ID |
| 1 | 1 | $KeyA^{(2)}=g(KeyB^{(2)})$ | — |
| 2 | 1 | $KeyB^{(2)}=g(KeyD^{(2)})$ | — |
| 2 | 2 | $KeyC^{(2)}=g(KeyF^{(2)})$ | — |
| 3 | 1 | $KeyD^{(2)}=g(Skd_1^{(2)})$ | — |
| 3 | 2 | $KeyE^{(2)}=g(Skd_3^{(2)})$ | — |
| 3 | 3 | $KeyF^{(2)}=g(Skd_6^{(2)})$ | — |
| 3 | 4 | $KeyG^{(2)}=g(Skd_7^{(2)})$ | — |
| 4 | 1 | $Skd_1^{(2)}$ | 1001 |
| 4 | 2 | $Skd_2^{(2)}$ | 1002 |
| 4 | 3 | $Skd_3^{(2)}$ | 1003 |
| 4 | 4 | $Skd_4^{(2)}$ | 1004 |
| 4 | 5 | $Skd_5^{(2)}$ | 1005 |
| 4 | 6 | $Skd_6^{(2)}$ | 1006 |
| 4 | 7 | $Skd_7^{(2)}$ | 1007 |
| 4 | 8 | $Skd_8^{(2)}$ | 1008 |

FIG.14

DVD PUBLIC LIST  S21

| SYSTEM ID | 2 |
|---|---|
| PUBLIC INFO ||
| INDEX INFO (LEVEL NO., NODE NO.) | ENCRYPTED NODE KEY |
| (3, 1) | $E4(Skd_2^{(2)}, KeyD^{(2)})$ |
| (3, 2) | $E4(Skd_4^{(2)}, KeyE^{(2)})$ |
| (3, 3) | $E4(Skd_6^{(2)}, KeyF^{(2)})$ |
| (3, 4) | $E4(Skd_8^{(2)}, KeyG^{(2)})$ |
| (2, 1) | $E4(KeyE^{(2)}, KeyB^{(2)})$ |
| (2, 2) | $E4(KeyG^{(2)}, KeyC^{(2)})$ |
| (1, 1) | $E4(KeyC^{(2)}, KeyA^{(2)})$ |

FIG.17

MOVIE BROADCAST TREE TABLE

| NODE INFO | | | |
|---|---|---|---|
| LEVEL NO. | NODE NO. | NODE KEY | APP ID |
| 1 | 1 | $KeyA^{(3)}$ | — |
| 2 | 1 | $KeyB^{(3)}$ | — |
| 2 | 2 | $KeyC^{(3)}$ | — |
| 3 | 1 | $KeyD^{(3)}$ | — |
| 3 | 2 | $KeyE^{(3)}$ | — |
| 3 | 3 | $KeyF^{(3)}$ | — |
| 3 | 4 | $KeyG^{(3)}$ | — |
| 4 | 1 | $Skd_1^{(3)}$ | 1001 |
| 4 | 2 | $Skd_2^{(3)}$ | 1002 |
| 4 | 3 | $Skd_3^{(3)}$ | 1003 |
| 4 | 4 | $Skd_4^{(3)}$ | 1004 |
| 4 | 5 | $Skd_5^{(3)}$ | 1005 |
| 4 | 6 | $Skd_6^{(3)}$ | 1006 |
| 4 | 7 | $Skd_7^{(3)}$ | 1007 |
| 4 | 8 | $Skd_8^{(3)}$ | 1008 |

FIG.20

MOVIE PUBLIC LIST

821

| SYSTEM ID | 3 |
|---|---|
| PUBLIC INFO | |
| INITIAL VALUE | $X_o$ |
| INDEX INFO (LEVEL NO., RELEASE POINT NODE NO.) | RELEASE POINT Y-COORDINATE |
| (4, 1) | $S1_{(y)}$ |
| (4, 2) | $S2_{(y)}$ |
| (4, 3) | $S3_{(y)}$ |
| (4, 4) | $S4_{(y)}$ |
| (3, 1) | $S5_{(y)}$ |
| (3, 2) | $S6_{(y)}$ |
| (2, 1) | $S7_{(y)}$ |

FIG.45

MUSIC DISTR TREE TABLE

211b

| NODE INFO | | | | |
|---|---|---|---|---|
| LEVEL NO. | NODE NO. | NODE KEY | APP ID | PATH INFO |
| 1 | 1 | $KeyA^{(1)}$ | — | — |
| 2 | 1 | $KeyB^{(1)}$ | — | $P_1$ |
| 2 | 2 | $KeyC^{(1)}$ | — | $P_2$ |
| 3 | 1 | $KeyD^{(1)}$ | — | $P_3$ |
| 3 | 2 | $KeyE^{(1)}$ | — | $P_4$ |
| 3 | 3 | $KeyF^{(1)}$ | — | $P_5$ |
| 3 | 4 | $KeyG^{(1)}$ | — | $P_6$ |
| 4 | 1 | $Skd_1^{(1)}$ | 1001 | — |
| 4 | 2 | $Skd_2^{(1)}$ | 1002 | — |
| 4 | 3 | $Skd_3^{(1)}$ | 1003 | — |
| 4 | 4 | $Skd_4^{(1)}$ | 1004 | — |
| 4 | 5 | $Skd_5^{(1)}$ | 1005 | — |
| 4 | 6 | $Skd_6^{(1)}$ | 1006 | — |
| 4 | 7 | $Skd_7^{(1)}$ | 1007 | — |
| 4 | 8 | $Skd_8^{(1)}$ | 1008 | — |

FIG.46

MUSIC PUBLIC LIST

221b

| SYSTEM ID | 1 |
|---|---|
| PATH PUBLIC INFO | |
| PUBLIC INFO | e, n |
| INDEX INFO (LEVEL NO., PATH NO.) | PATH INFO |
| (1, 1) | $P_1$ |
| (1, 2) | $P_2$ |
| (2, 1) | $P_3$ |
| (2, 2) | $P_4$ |
| (2, 3) | $P_5$ |
| (2, 4) | $P_6$ |
| NODE KEY PUBLIC INFO | |
| INDEX INFO (LEVEL NO., PATH NO.) | ENCRYPTED NODE KEY |
| (3, 1) | $E1(Skd_1^{(1)}, KeyD^{(1)})$ |
| (3, 2) | $E1(Skd_2^{(1)}, KeyD^{(1)})$ |
| (3, 3) | $E1(Skd_3^{(1)}, KeyE^{(1)})$ |
| (3, 4) | $E1(Skd_4^{(1)}, KeyE^{(1)})$ |
| (3, 5) | $E1(Skd_5^{(1)}, KeyF^{(1)})$ |
| (3, 6) | $E1(Skd_6^{(1)}, KeyF^{(1)})$ |
| (3, 7) | $E1(Skd_7^{(1)}, KeyG^{(1)})$ |
| (3, 8) | $E1(Skd_8^{(1)}, KeyG^{(1)})$ |

DATA DISTRIBUTION SYSTEM

This application is based on application No. 2002-016547 filed in Japan, the content of which is hereby incorporated by reference.

BACKGROUND OF THE INVENTION

1. Field of the Invention

The present invention relates to technology for encrypting and distributing data.

2. Related Art

In recent years, there has been an expansion in the use of broadcasting, communications, package media (e.g. digital versatile disk or "DVD") and the like to distribute digital contents such as movies and music to specified apparatuses.

To protect copyright, contents are distributed to specified apparatuses in encrypted form. Only under conditions permissible to the copyright holder is a specified apparatus able to decrypt an encrypted content for playback or duplication using an apparatus key embedded in the apparatus.

The distribution of a voluminous content is generally carried out by employing a two-stage encryption method, involving the content being encrypted using a single group key, and the group key then being encrypted, so as to only be shareable with specified apparatuses. In the present description, this method involving the use of a unique apparatus key to share of a single group key is referred to as a "group key management method".

In the simplest example of a group key management method, a contents supplier generates encrypted key information by encrypting the group key using the unique apparatus key held by each apparatus, and distributes the encrypted key information after corresponding the encrypted key information with the encrypted content. A specified apparatus obtains the group key from the encrypted key information using its apparatus key, and decrypts the encrypted content using the group key.

However, with this simple method, the data volume of the encrypted key information becomes substantial when the group includes many members. Finding ways of distributing the group key efficiently while at the same time reducing this data volume has been the subject of much research.

The IETF (The Internet Engineering Task Force), for example, which is involved in the standardization of new technology relating to the Internet, has conducted extensive research with great success into a tree key-management method involving each apparatus holding a plurality of apparatus keys and the share relationship being expressed by a tree structure.

According to this method, each joint in a tree structure is known as a "node", and each apparatus is allotted to a "leaf" (i.e. most subordinate node in the tree structure) Each apparatus stores node keys corresponding to all nodes existing on a route from a leaf to a "root" (i.e. most superordinate node in the tree structure). A route connecting any two nodes is known as a "path". A key manager reduces the volume of encrypted key information by encrypting the group key using a node key shared by a plurality of apparatuses.

Much research is being conducted into this key management method because it allows, for example, (i) for the group key to be circulated using encrypted key information having a low data volume, even when the key manager adds new apparatuses to the group or has to expel specified apparatuses from the group for some reason, and (ii) for addition or removal of whole systems by corresponding a sub-tree, in which one of the nodes has been set as a root, with an existing system.

A group key management method that uses a tree structure will now be described as an example of a representative tree division method. For a detailed description, please refer to Reference 1: Toshihisa Nakano, Motoji Omori and Makato Tatebayashi, "Key Management System for Digital Content Protection", A5-5, *The* 2001 *Symposium on Cryptography and Information Security* (*SCIS*2001), Jan. 23-26, 2001, Oiso, Japan, The Institute of Electronics, Information and Communication Engineers (IEICE).

According to the tree division method disclosed in Reference 1, each apparatus is positioned at a leaf of the tree, and stores node keys corresponding to all of the nodes from the leaf to the root. As shown in FIG. 54, an apparatus 1 stores a key kd1 (unique to apparatus 1), a KeyD, a KeyB and a KeyA. KeyD is shared by apparatuses 1 and 2, KeyB is shared by apparatuses 1 to 4, and KeyA is shared by all of the apparatuses.

When operation of the system is commenced, the system manager generates encrypted key information by encrypting the group key using KeyA. If, for some reason, it becomes necessary to eliminate one of the apparatuses from the group, the system manager removes the key stored by the apparatus from the tree structure, and generates the encrypted key information by encrypting the group key using the key corresponding to the root of each of the plurality of smaller tree structures.

For example, if apparatus 1 is expelled from the group, the group key is encrypted using a KeyC, a KeyE, and a key kd2, respectively. Here, each piece of encrypted key information is referred to as a ciphertext. The encrypted key information is distributed by a contents supplier together with a content encrypted using the group key.

An apparatus (i.e. other than the expelled apparatus) that receives the encrypted content and the encrypted key information, derives the group key from the encrypted key information corresponding to the apparatus key stored by the apparatus, and decrypts the content.

Reference 2 discloses a tree pattern division method that allows for key information stored on a storage medium to be reduced in size, while at the same time suppressing any increase in the number of apparatus keys already held by an apparatus.

Reference 2: Toshihisa Nakano, Motoji Omori, Natsume Matsusaki and Makato Tatebayashi, "Key Management System for Digital Content Protection—Tree pattern Division Method", *The* 2002 *Symposium on Cryptography and Information Security* (*SCIS*2002), Jan. 29-Feb. 1, 2002, Shirahama, Japan, The Institute of Electronics, Information and Communication Engineers (IEICE).

At present, however, contents supply systems that differ in terms of administrative bodies, distributed contents, communication routes and media (i.e. package media, broadcasting, Internet), services provided, and the like, are administered using independent key management methods.

SUMMARY OF THE INVENTION

In the case of a single user apparatus being connected to a plurality of contents supply systems, the present invention seeks to provide a data distribution system, a key management apparatus, an encryption apparatus, a user apparatus, and a related method, computer program and storage medium that enable each contents supply system to conduct flexible and independent key management.

The above object can be achieved by a data distribution system formed from (i) a plurality of encryption apparatuses for encrypting data, and (ii) a plurality of apparatuses for decrypting encrypted data using an apparatus key of a corresponding encryption apparatus. In addition to encrypting and sending data to an apparatus, an encryption apparatus manages an apparatus key for each apparatus, and generates and releases a public list to the apparatus, and the apparatus decrypts the encrypted data using the public list and a corresponding apparatus key.

Here, the data distribution system may be structured such that the public list is supplied to an apparatus via package media or a web page corresponding to the encryption apparatus.

Here, the data distribution system may be structured to further include a key management organization, and the key management organization may generate, for each apparatus, keys corresponding to the encryption apparatuses, and supply the apparatus keys to corresponding apparatuses and encryption apparatuses.

Here, the key management organization in the data distribution system may be structured to generate and supply an apparatus key to each apparatus, input the apparatus key and identification information corresponding to an encryption apparatus into a one-way function on the side of the apparatus, and generate an apparatus key from the output.

The present invention may also be achieved by an encryption apparatus for encrypting and sending data to an apparatus, the encryption apparatus managing an apparatus key, and generating and releasing a public list to the apparatus.

Here, the encryption apparatus may be structured to construct a tree structure, allot one or more node keys to each node in the tree structure, allot an apparatus key corresponding to an apparatus to a leaf of the tree structure, and use the apparatus key and the node keys to generate the public list.

Here, the encryption apparatus may be structured to use only the apparatus key allotted to a leaf to generate, for inclusion in the public list, information for sequentially deriving node keys corresponding to nodes from the leaf to a root.

Here, the encryption apparatus may be structured to include in the public list, a ciphertext (here, "first information") that is generated by encrypting a node key corresponding to a node, using the node keys corresponding to all of the children nodes of the node.

Here, the encryption apparatus may be structured to sets as a node key of a node, a result obtained by using a predetermined one-way function to convert a node key corresponding to one of the children nodes of the node, and to include, in the public list, a ciphertext (here, "second information") that is generated by encrypting the set node key using a node key corresponding to another of the children nodes of the node.

Here, the encryption apparatus may be structured to generate a $(k+m-1)^{th}$ order curve that connects node keys of k number of nodes sharing the same parent node, and to include, in a public list, $(k+m-1)$ number of points (here, "third information") on the curve, excluding the node keys.

Here, the encryption apparatus may be structured to set as a node key corresponding to a parent node, a point uniquely determined from the $(k+m-1)^{th}$ order curve by a predetermined technique that uses a one-way function.

Here, the public list generation unit may be structured to generate a public key/secret key pair for public key cryptography, store the secret key secretly, include the public key in the public list, and to set, as a node key corresponding to a child node of a node in the tree structure, a result obtained by encrypting a node key corresponding to the node using the secret key. Here, information included in the public list is referred to as "fourth information".

Here, the encryption apparatus may be structured to (i) calculate a product n of secret prime numbers p and q, (ii) derive a lowest common multiple L of p-1 and q-1, (iii) derive an integer e that is less than or equal to L and relatively prime with n, (iv) derive, as a secret key, an inverse d of e mod L, (v) release (e,n) in the public list as a public key, (vi) use the secret key d to encrypt a value derived by performing an exclusive-OR operation on a node key corresponding to a node and a path number uniquely determined in advance for a path connecting the node to a child node of the node, and (vii) set the encrypted value as a node key corresponding to the child node.

Here, for each node having children nodes that are leaves, the encryption apparatus may be structured to include the first, second and third information in a public list, and for each node having children nodes that are not leaves, the encryption apparatus may be structured to include the fourth information in a public list.

The present invention may also be achieved by an apparatus for decrypting data encrypted by an encryption apparatus, the apparatus decrypting the encrypted data using an apparatus key and a public list corresponding to the encryption apparatus.

Here, the apparatus may be structured to store a unique apparatus key, and to use the apparatus key and identification information relating to the encryption apparatus to generate a corresponding apparatus key.

Here, the apparatus may be structured to be allotted a leaf of a tree structure that is determined by the encryption apparatus, and to store a corresponding apparatus key.

Here, the apparatus may be structured to use a public list corresponding to the encryption apparatus to sequentially derive, from an apparatus key allotted to a leaf of the tree structure, node keys corresponding to nodes from the leaf to a root in the tree structure.

Here, the apparatus may be structured to decrypt a corresponding ciphertext included in a public list using a node key of a node in the tree structure, to derive a node key of a parent node of the node.

Here, the apparatus may be structured to select a value that is one of (i) a decrypted node key generated by decrypting a ciphertext included in a public list, using a node key of a node in the tree structure, and (ii) an output value obtained by inputting the node key of the node into a one-way function, and to determine the selected value as a node key of a parent node of the node.

Here, the apparatus may be structured to derive a $(k+m-1)^{th}$ order curve that connects a node key of a node in the tree structure and $(k+m-1)$ number of points included in a public list, and to derive, from the curve, a node key of a parent node of the node by performing a one-way function.

Here, the apparatus may be structured to decrypt a node key of a node in the tree structure, using a corresponding public key included in a public list, and to set the decryption result as a node key of a parent node of the node.

Here, in the case that the encryption apparatus has calculated a product n of secret prime numbers p and q, derived a lowest common multiple L of p-1 and q-1, derived an integer e that is less than or equal to L and relatively prime with n, derived, as a secret key, an inverse d of e mod L, and released (e,n) in the public list as a public key, the apparatus may be structured to decrypt a node key of a node in the tree structure using the public key (e,n), and to set, as a node key corresponding to a parent node of the node, a value derived by performing an exclusive-OR on the decryption result and a path number of a path connecting the node and the parent node.

Here, the apparatus may be structured to derive node keys of nodes whose children nodes are leaves in the tree structure, using a public list that includes first, second and third information, and to sequentially derive node keys of nodes whose children nodes are not leaves, using a public list that includes fourth information.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 3 shows a data structure of an apparatus key management table 111;

FIG. 4 shows a data structure of a system apparatus key management table 121;

FIG. 7 shows a data structure of a music distribution tree table 211;

FIG. 8 shows a data structure of a music public list 221;

FIG. 12 shows a data structure of a DVD tree table 511;

FIG. 14 shows a data structure of a DVD public list 521;

FIG. 17 shows a data structure of a movie broadcast tree table 811;

FIG. 20 shows a data structure of a movie public list 821;

FIG. 30 is a flowchart showing the operations relating to the generation of the DVD public list by unit 506 (cont. from FIG. 29);

FIG. 32 is a flowchart showing operations performed by apparatus 800 (cont.

FIG. 33 is a flowchart showing operations performed by apparatus 800 (cont. from FIG. 32);

FIG. 36 is a flowchart showing the operations relating to the node key specification (1) by unit 1103 (cont. from FIG. 35);

FIG. 38 is a flowchart showing the operations relating to the node key specification (2) by unit 1103 (cont.

FIG. 39 is a flowchart showing the operations relating to the node key specification (2) by unit 1103 (cont.

FIG. 40 is a flowchart showing the operations relating to the node key specification (2) by unit 1103 (cont. from FIG. 39);

FIG. 42 is a flowchart showing the operations relating to the node key specification (3) by unit 1103 (cont.

FIG. 43 is a flowchart showing the operations relating to the node key specification (3) by unit 1103 (cont. from FIG. 42);

FIG. 45 shows a data structure of a music distribution tree table 211$b$;

FIG. 46 shows a data structure of a music public list 221$b$;

FIG. 48 is a flowchart showing the operations performed by apparatus 200$b$ (cont.

FIG. 49 is a flowchart showing the operations performed by apparatus 200$b$ (cont.

FIG. 50 is a flowchart showing operations performed by apparatus 200$b$ (cont.

FIG. 51 is a flowchart showing the operations performed by apparatus 200$b$ (cont. from FIG. 50);

FIG. 53 is a flowchart showing the operations relating to the node key specification (1) by unit 1103*b*, these being part of the operations performed by user apparatus 1100*b* (cont. from FIG. 52)

DETAILED DESCRIPTION OF THE PREFERRED EMBODIMENT

1 Encrypted Data Distribution System 1

The follows description relates to an encrypted data distribution system 1 as an embodiment of the present invention.

1.1 Structure of Encrypted Data Distribution System 1

Figure 1:
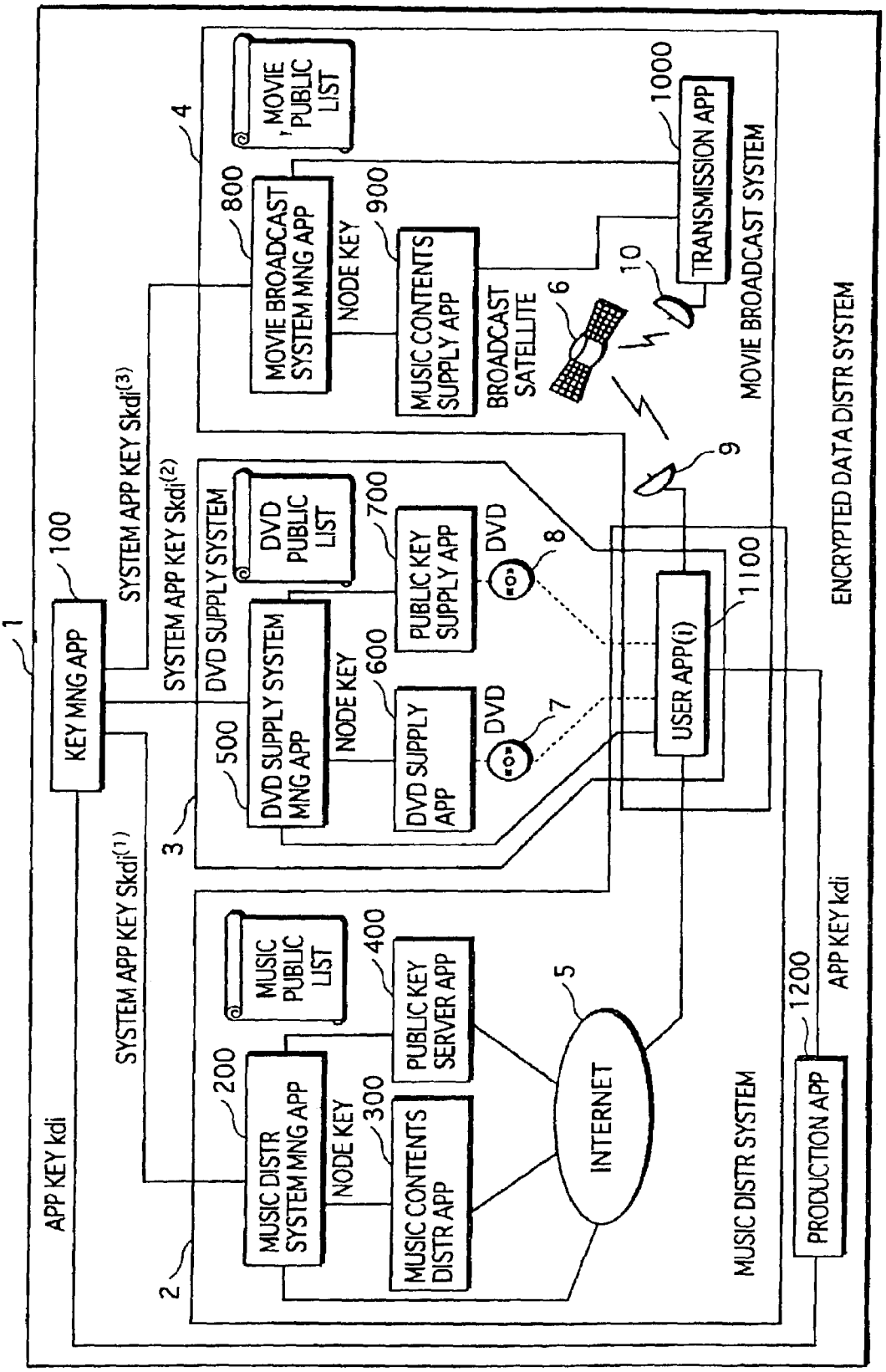
FIG. 1 is a block diagram showing a structure of an encrypted data distribution system 1.

As shown in FIG. 1, encrypted data distribution system 1 is structured from a key management apparatus 100, a music distribution system management apparatus 200, a music contents distribution apparatus 300, a public list server apparatus 400, a DVD supply system management apparatus 500, a DVD supply apparatus 600, a public list supply apparatus 700, a movie broadcast system management apparatus 800, a movie contents supply apparatus 900, a transmission apparatus 1000, a transmission antenna 10, a broadcast satellite 6, a reception antenna 9, a user apparatus 1100, other user apparatuses (not depicted), and a production apparatus 1200.

Here, it should be noted that the following abbreviations are used in the drawings: apparatus="APP"; distribution="DISTR", management="MNG", generation="GEN", information="INFO", number="NO.".

Key management apparatus 100 distributes an apparatus key kdi unique to user apparatus 1100 via production apparatus 1200, and distributes system apparatus keys $Skdi^{(1)}$, $Skdi^{(2)}$ and $Skdi^{(3)}$ (generated based on the apparatus key kdi) to music distribution system management apparatus 200, DVD supply system management apparatus 500, and movie broadcast system management apparatus 800, respectively.

A music distribution system 2 is a contents supply system that distributes music contents to a user via the Internet 5, and is structured to include music distribution system management apparatus 200, music contents distribution apparatus 300, public list server apparatus 400, user apparatus 1100, and other user apparatuses. Apparatus 200 manages keys used for encryption conducted in system 2, and releases (i.e. makes public) a music public list (described below) to user apparatus 1100 and other user apparatuses via apparatus 400. Apparatus 300 encrypts a music content based on the keys managed by apparatus 200, and sends the encrypted content to user apparatus 1100. User apparatus 1100 decrypts the encrypted music content based on the music public list and the apparatus key kdi stored in user apparatus 1100, and plays back the music contents.

A DVD supply system 3 is a contents supply system that supplies DVDs storing contents such as movies to a user, and is structured to include DVD supply system management apparatus 500, DVD supply apparatus 600, public list supply apparatus 700, user apparatus 1100, and other user apparatuses. Apparatus 500 manages keys used for encryption conducted in system 3, and releases a music public list (described below) to user apparatus 1100 via apparatus 700. Apparatus 600 encrypts the movie contents based on the keys managed by apparatus 500, records the encrypted contents on a DVD, and the DVD is supplied to a user. User apparatus 1100 decrypts the encrypted movie contents stored on the DVD based on the DVD public list and the apparatus key kdi stored in user apparatus 1100, and plays back the movie contents.

A movie broadcast system 4 is a contents supply system that uses broadcast waves to supply contents such as movies to a user, and is structured to include movie broadcast system management apparatus 800, movie contents supply apparatus 900, transmission apparatus 1000, transmission antenna 10, broadcast satellite 6, reception antenna 9, user apparatus 1100, and other user apparatuses. Apparatus 800 manages keys used for encryption conducted in system 4, and releases a movie public list (described below) to user apparatus 1100 via transmission apparatus 1000 and broadcast satellite 6. Apparatus 900 encrypts the movie contents based on the keys managed by apparatus 800, and supplies the encrypted movie contents to a user by broadcasting the encrypted movie contents on radio waves via transmission apparatus 1000 and broadcast satellite 6. User apparatus 1100 receives the radio waves, extracts the encrypted movie contents from the radio waves, decrypts the encrypted movie contents based on the movie public list and the apparatus key kdi stored in user apparatus 1100, and plays back the movie contents.

1.2 Structure of Key Management Apparatus 100

Key management apparatus 100 is included in a key management organization, and management and administration of apparatus 100 is carried out by the key management organization The key management organization is responsible for generating and managing the apparatus keys of the apparatuses.

Key management apparatus 100 generates an apparatus key kdi that is unique to user apparatus 1100, and distributes the generated apparatus key kdi to user apparatus 1100 via production apparatus 1200. Here, the apparatus key kdi generated by key management apparatus 100 is written into a portable storage medium, and the key management organization, in which apparatus 100 is included, passes the storage medium on to a producer in which production apparatus 1200 is included. Apparatuses 100 and 1200 are connected by a communication line, and apparatus 100 may use a secure communications protocol to send the apparatus key kdi to apparatus 1200 via the communication line.

Key management apparatus 100 is connected to system management apparatus 200, DVD supply system management apparatus 500, and movie broadcast system management apparatus 800 by a communication line. Apparatus 100 generates, based on the apparatus key kdi, the system apparatus keys $Skdi^{(1)}$, $Skdi^{(2)}$ and $Skdi^{(3)}$ to be used by apparatuses 200, 500 and 800, respectively, and uses a secure communications protocol to transmit the generated system apparatus keys to the respective apparatuses via the communication line.

Figure 2:
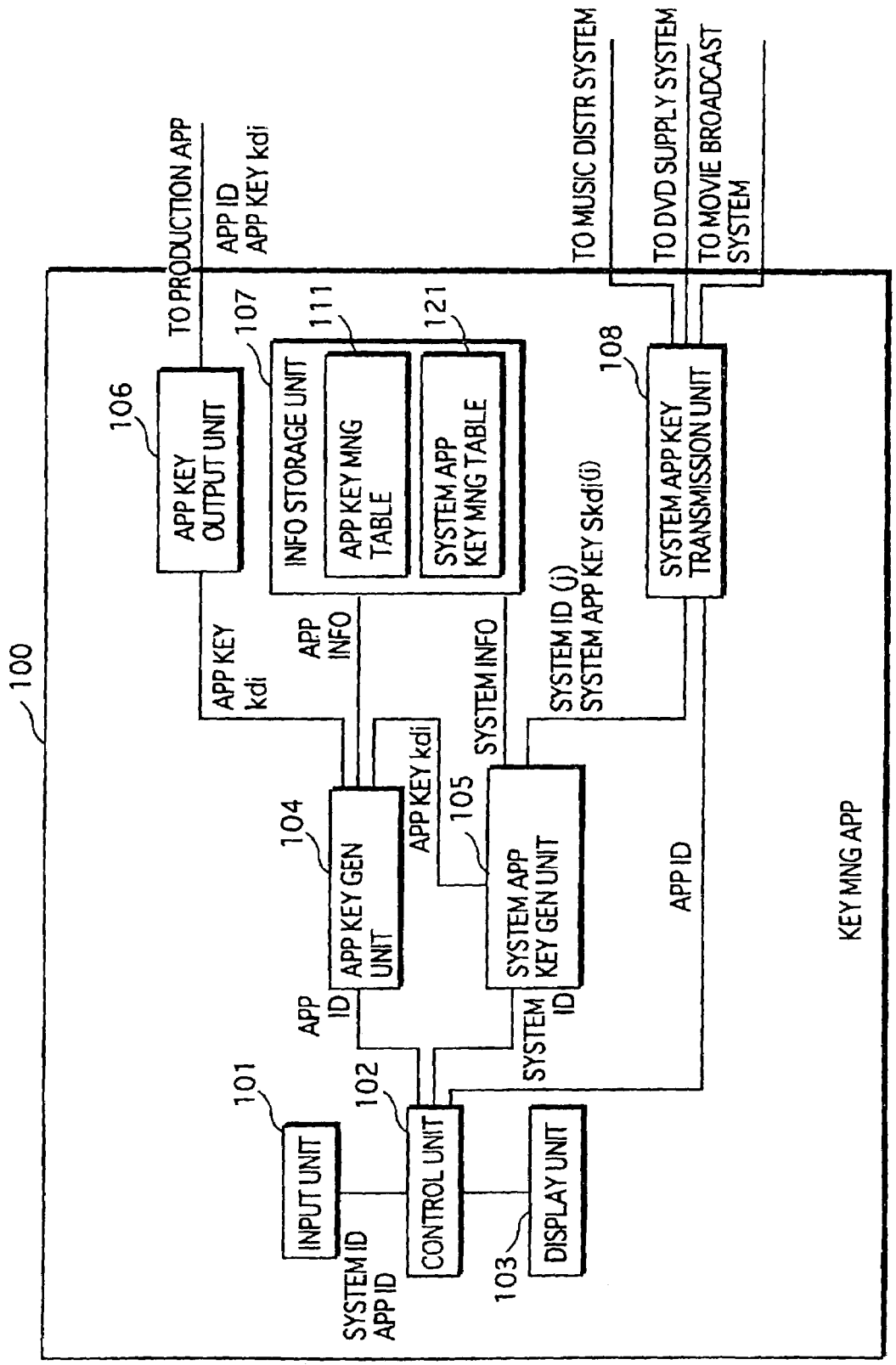
FIG. 2 is a block diagram showing a structure of a key management apparatus 100.

As shown in FIG. 2, key management apparatus 100 is structured from an input unit 101, a control unit 102, a display unit 103, an apparatus generation unit 104, a system apparatus key generation unit 105, an apparatus key output unit 106, an information storage unit 107, and a system apparatus key transmission unit 108.

Specifically, key management apparatus 100 is a computer system structured from a microprocessor, a ROM, a RAM, a hard disk unit, a display unit, a keyboard, a mouse, a communications unit, and the like, and a computer program is stored in the RAM or the hard disk unit. Key management apparatus 100 functions as a result of the microprocessor operating in accordance with the computer program.

(1) Information Storage Unit 107

Unit 107 includes an apparatus key management table 111 and a system apparatus key management table 121.

Apparatus key Management Table 111: As shown in FIG. 3, table 111 has an area for storing a plurality of pieces of apparatus information, each of which is formed from an apparatus ID and an apparatus key kdi.

System Apparatus key Management Table 121: As shown in FIG. 4, table 121 has an area for storing a plurality of pieces of system information, each of which is formed from an apparatus ID, a system ID and a system apparatus key $Skdi^{(j)}$.

An apparatus ID is identification information for identifying a user apparatus.

A system ID is an identifier for identifying a contents supply system that supplies/distributes contents, representative examples of which include music distribution system 2, DVD supply system 3, and movie broadcast system 4. In the given example, systems 2, 3 and 4 are identified by system IDs "1", "2" and "3", respectively.

A system apparatus key $Skdi^{(j)}$ in a contents supply system is a unique piece of key information allotted to a user apparatus. In "$Skdi^{(j)}$", the suffix "i" corresponds to an apparatus ID of a user apparatus, and the superscript "j" corresponds to a system ID of a contents supply system.

(2) Control Unit 102

Control unit 102 controls the elements structuring key management apparatus 100 to repeat processing related to the generation of apparatus keys and system apparatus keys until the generation of apparatus keys and system apparatus keys has been completed.

Furthermore, control unit 102 receives system IDs and apparatus IDs from an administrator of the key management organization via input unit 101.

On receipt of an apparatus ID, control unit 102 judges whether the received apparatus ID is stored in apparatus key management table 111, and if judged in the negative (i.e. received apparatus ID not stored in table 111), unit 102 outputs the apparatus ID to apparatus key generation unit 104, and instructs unit 104 to newly generate an apparatus key.

On the other hand, if judged in the affirmative (i.e. received apparatus ID is stored in table 111), control unit 102 reads apparatus information that includes the apparatus ID from table 111, extracts an apparatus key kdi from the read apparatus information, and outputs the extracted apparatus key kdi to system apparatus key generation unit 105.

(3) Apparatus key Generation Unit 104

Unit 104 receives an apparatus ID and an instruction to newly generate an apparatus key from control unit 102.

On receipt of the instruction, unit 104 generates a random number, and uses the random number to newly generate an apparatus key kdi. Next, unit 104 outputs the received apparatus ID and the generated apparatus key kdi to apparatus key output unit 106. Unit 104 also outputs the generated apparatus key kdi to system apparatus key generation unit 105, and writes apparatus information formed from the received apparatus ID and the generated apparatus key kdi into apparatus key management table 111.

(4) System Apparatus key Generation Unit 105

Unit 105 receives an apparatus key kdi and a system ID from apparatus key generation unit 104 and control unit 102, respectively, obtains matched information by combining the apparatus key kdi with the system ID, and generates a system apparatus key $Skdi^{(j)}$ by performing a one-way function h on the combined information:

system apparatus key $Skdi^{(j)}=h(kdi,systemID)$

Here, h(A,B) shows the one-way function h being performed on combined information formed from A and B. Furthermore, "SHA-1" is an example of a one-way function.

Next, unit 105 outputs the system ID and the generated system apparatus key $Skdi^{(j)}$ to system apparatus key transmission unit 108.

Unit 105 also corresponds the apparatus ID, the system ID and the system apparatus key $Skdi^{(j)}$ to form system information, and writes the system information into system apparatus key management table 121.

(5) Apparatus key Output Unit 106

Apparatus key output unit 106 receives the apparatus ID and the apparatus key kdi from apparatus key generation unit 104, and if an apparatus key has not be allotted to the user apparatus, unit 106 outputs the apparatus ID and the apparatus key kdi to the user apparatus via production unit 1200.

(6) System Apparatus key Transmission Unit 108

Unit 108 is connected to music distribution system management apparatus 200, DVD supply system management apparatus 500, and movie broadcast system management apparatus 800 via a communication line.

Unit 108 receives a system apparatus key $Skdi^{(j)}$ and an apparatus ID from system apparatus key generation unit 105 and control unit 102, respectively. Unit 108 then sends, via the communication line, the system apparatus key $Skdi^{(j)}$ and the apparatus ID to a system management apparatus shown by the system ID.

(7) Input Unit 101

Unit 101 receives input of a system ID and an apparatus ID from the administrator of the key management organization, and outputs the system ID and the apparatus ID to control unit 102.

(8) Display Unit 103

Unit 103 displays various types of information.

1.3 Structure of Music Distribution System Management Apparatus 200

Apparatus 200 manages keys used for encryption conducted in music distribution system 2, outputs node keys used for encryption to music contents distribution apparatus 300, and releases a music public list (described below) to user apparatus key 1100 via public list server apparatus 400.

Figure 5:
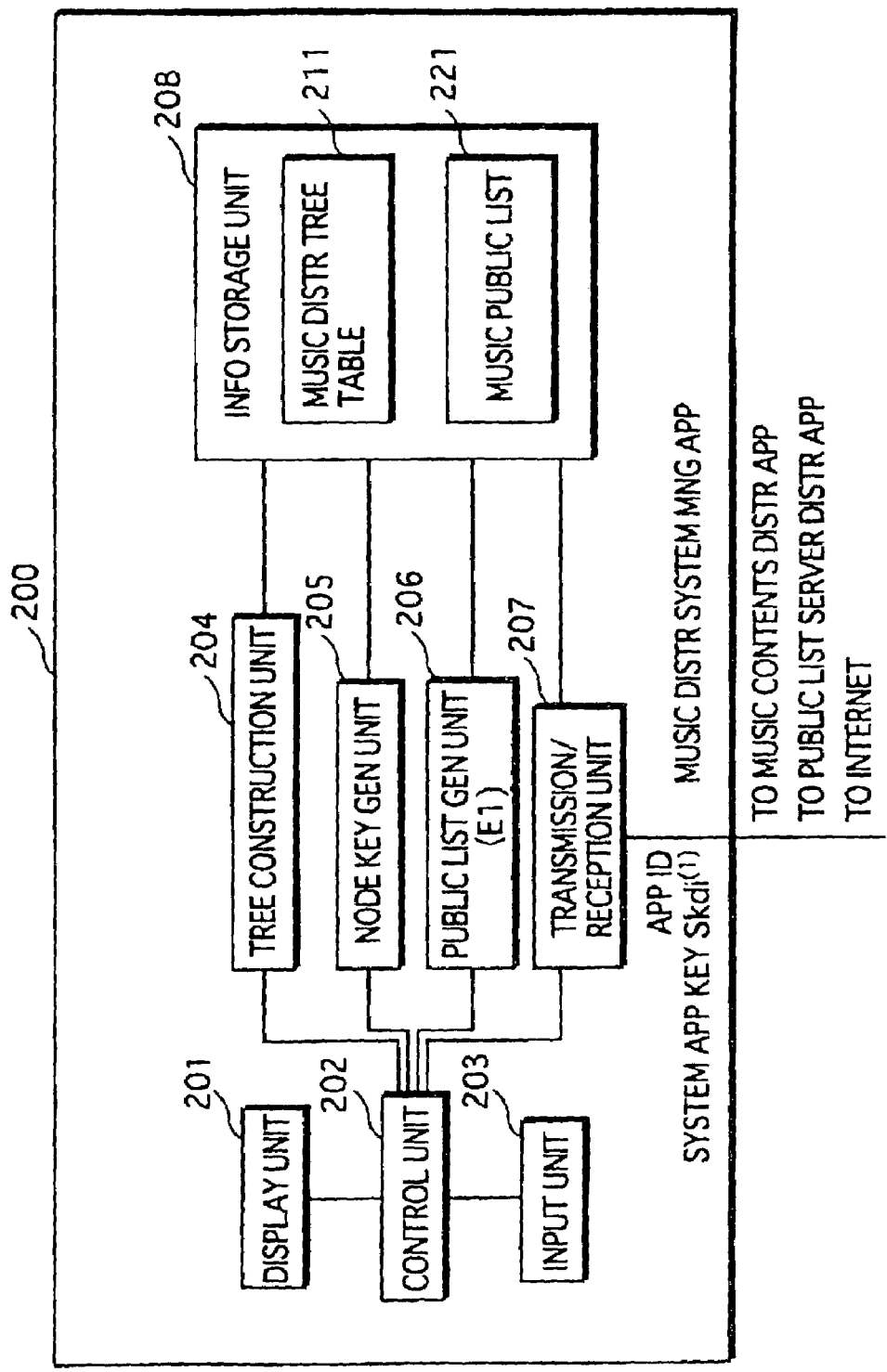
FIG. 5 is a block diagram showing a structure of a music distribution system management apparatus 200.

As shown in FIG. 5, apparatus 200 is structured from a display unit 201, a control unit 202, an input unit 203, a tree construction unit 204, a node key generation unit 205, a public list generation unit 206, a transmission/reception unit 207, and an information storage unit 208.

As with key management apparatus 100, apparatus 200 is a computer system, and functions as a result of a microprocessor operating in accordance with a computer program.

(1) Information Storage Unit 208

Unit 208 includes a music distribution tree table 211 and a music public list 221.

Figure 6:
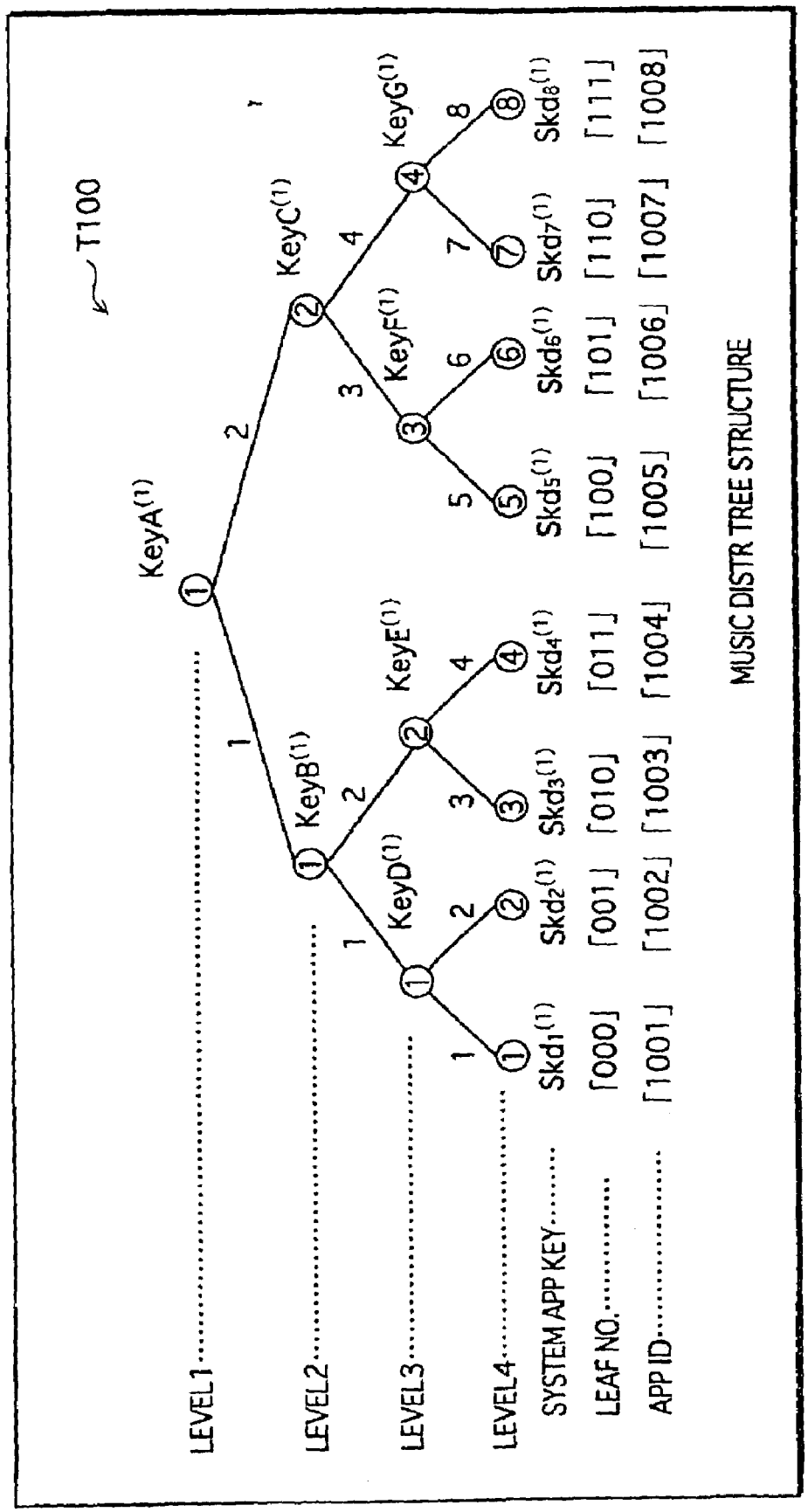
FIG. 6 is a conceptual diagram showing a tree T100.

Table 211 corresponds to a tree T100, an example of which is given in FIG. 6, and shows a data structure for expressing tree T100.

As described in detail in a later section, the data structure for expressing tree T100 is generated as table 211 by tree construction unit 204, and written into unit 208.

Tree T100: As shown in FIG. 6, tree T100 is a binary tree formed from four levels (levels 1-4). Because tree T100 is a binary tree, each node (i.e. parent node), excluding leaves, included in tree T100 is connected to each of two subordinate nodes (i.e. children nodes) via a path. Level 1 includes a single node (i.e. the root of the tree), level 2 includes two nodes, level 3 includes four nodes, and level 4 includes eight nodes. Here, the upper half of the tree structure shows the root side, and the lower half shows the leaf side.

The paths connecting each node (excluding leaves) of tree T100 with a subordinate node are numbered "1", "2", . . . , from left to right. Here, a path connecting a node with a subordinate node positioned on the left-hand side is referred to as a "left path", and a path connecting a node with a subordinate node positioned on the right-hand side is referred to as a "right path" (see FIG. 6).

Each node has attached a node number. The node number of the node (i.e. the root) belonging to level 1 is "1". Furthermore, the nodes belonging to levels 2 and below are allotted numbers "1", "2", . . . , from left to right. Here, the meaning of "left" and "right" is as described above. For example, the node numbers of the two nodes at level 2 are "1" and "2", respectively. Likewise, the node numbers of the four nodes at level 3 are "1", "2", "3", and "4", respectively.

Nodes (i.e. the leaves) in tree T100 belonging to the lowest level are each allotted a leaf number. As shown in FIG. 6, the eight leaves ("1", "2", . . . , "8") at level 4 are allotted the leaf numbers "000", "001", "010", . . . , "111", respectively. Here, the leaf numbers are expressed in binary.

The following description relates to how the leaf numbers are derived.

Of the two paths connecting each node (excluding leaves) in tree T100 with subordinate nodes, the left path is allotted a number "0" and the right path is allotted a number "1". These numbers have a 1-bit value expressed in binary. By allotting either a "0" or a "1" to all of the paths in tree T100 accordingly, it is possible to quickly identify a route connecting the root to a leaf by using the numbers allotted to each of the paths included in the route. The routes from the root to the leaves correspond one-to-one with the leaves, and thus these numbers may be thought of as identifying the leaves.

The leaf numbers are structured by arranging the numbers allotted to each path included in a route from the root to a leaf in top-down order (i.e. superordinate to subordinate).

For example, leaf number "000" shows that the corresponding leaf is reached by taking the left path from the root to level 2, the left path from level 2 to level 3, and the left path again from level 3 to level 4.

Each node in tree T100 is allotted a node key. As shown in FIG. 6, the root at level 1 is allotted a node key "KeyA$^{(1)}$". Likewise, the two node (node numbers "1" and "2") at level 2 are allotted node keys "KeyB$^{(1)}$" and "KeyC$^{(1)}$", respectively. This process is repeated for nodes at levels 3 and 4.

Furthermore, each leaf in tree T100 is allotted a user apparatus. Specifically, as shown in FIG. 6, this involves each leaf being allotted an apparatus ID.

Music Distribution Tree Table 211: As shown in FIG. 7, table 211 is structured to include an equal number of pieces of node information as there are nodes in tree T400, and the pieces of node information correspond one-to-one with the nodes structuring tree T100.

Node information relating to each node (excluding leaves) includes a level number, a node number and a node key, and node information relating to each leaf includes a level number, a node number, a node key and an apparatus ID.

A level number shows the level to which a node corresponding to a piece of node information belongs.

A node number identifies, within the level shown by a level number, a node corresponding to a piece of node information.

A node key is a key allotted to a node corresponding to a piece of node information.

Furthermore, an apparatus ID is only included in node information that corresponds to a leaf, and is not included in node information that corresponds to nodes other than leaves. An apparatus ID is identification information for identifying a user apparatus allotted to a leaf.

Music Public List 221: As show in FIG. 8, public list 221 is structured to include a system ID and a predetermined number of pieces of public information. Each piece of public information includes index information and an encrypted node key.

Here, the "predetermined number" is equal to twice the number of nodes (excluding leaves) included in tree T100, and each of these nodes corresponds to two pieces of public information in list 221.

As described above, a system ID is an identifier for identifying a contents supply system that supplies/distributes contents.

Each piece of index information includes a level number and a path number. Here, a level number shows the level to which a node corresponding to a piece of public information belongs, and a path number shows the path to a subordinate node from a node corresponding to a piece of public information. Since tree T100 is a binary tree, there are two paths from each node (excluding leaves) to subordinate nodes.

An encrypted key is generated by using a node key allotted to a subordinate node connected to the path shown by the corresponding path number as a key to perform an encryption algorithm E1 on a node key allotted to a corresponding node.

In the example given here, the encryption algorithm E1 is based on DES (Data Encryption Standard).

Furthermore, in the present description, a ciphertext obtained by using a key A to perform the encryption algorithm E1 on a plaintext B is expressed as E1(A,B).

Here, (3,1) in table 221 shows a level number "3" and a path number "1". Furthermore, E1(Skdi$^{(1)}$, KeyD$^{(1)}$) shows a ciphertext obtained by using Skdi$^{(1)}$ as a key to perform the encryption algorithm E1 on KeyD$^{(1)}$.

(2) Tree Construction Unit 204

Unit 204 generates music distribution tree table 211 and writes the generated table 211 into information storage unit 208. Specifically, unit 204 generates, for each node in tree T100, a piece of node information that includes a level number and a node number, and writes the generated node information into table 211. At this stage of the process, the node information does not include a node key or an apparatus ID.

Unit 204 receives an apparatus ID and a system apparatus key Skdi$^{(1)}$ from key management apparatus 100 via control unit 202, and writes the received apparatus ID and system apparatus key Skdi$^{(1)}$ into table 211, so that the system apparatus key Skdi$^{(1)}$ corresponds to a single leaf. Furthermore, unit 202 outputs a leaf number showing the leaf to control unit 202.

Thus, a system apparatus key is allotted to a leaf and node keys are allotted to other nodes in the tree structure.

(3) Control Unit 202

Unit 202 controls the receiving of apparatus IDs and system apparatus keys $Skdi^{(1)}$, the writing system apparatus keys into music distribution tree table 211, and the transmitting of leaf numbers to user apparatuses to be repeated until the receiving of apparatus IDs and system apparatus keys $Skdi^{(1)}$ is completed.

Next, unit 202 receives an apparatus ID and a system apparatus key $Skdi^{(1)}$ from key management apparatus 100 via transmission/reception unit 207, and outputs the received apparatus ID and system apparatus key $Skdi^{(1)}$ to tree construction unit 204.

Unit 202 also receives a leaf number from tree construction unit 204, and transmits, via transmission/reception unit 207 and the Internet 5, a system ID (=1) and the received leaf number to a user apparatus shown by the received apparatus ID.

Furthermore, unit 202 selects, from table 211, a node key based on a predetermined reference. In the given example, unit 202 selects, out of all the nodes existing on the route from the leaf to the root, the node key allotted to the most superordinate node (i.e. the root). Here, the selected node key may also be referred to as a "device key". Next, unit 202 sends the selected node key to music contents distribution apparatus 300. Here, a user apparatus decrypts a content based on the device key. Thus, the device key is determined from one or more node keys managed using the tree structure.

(4) Node Key Generation Unit 205

When judged by control unit 202 that the receiving of apparatus IDs and system apparatus keys $Skdi^{(1)}$ has been completed, unit 205 generates a random number for each node (except leaves) in music distribution tree table 211, uses the random number to generate a node key, corresponds the generated node key with the node, and writes the node key into table 211.

(5) Public List Generation Unit 206

Unit 206 generates music public list 221, writes the generated public list 221 into information storage unit 208, and also sends the generated public list 221 to public list server apparatus 400.

The generation of list 221 by unit 206 is described in detail in a later section.

(6) Transmission/Reception unit 207

Unit 207 is connected to music contents distribution apparatus 300 and user apparatus 1100 via a communication line and the Internet 5, respectively.

Unit 207 conducts transmission and reception of information between control unit 202 and apparatus 300, and also conducts transmission and reception of information between control unit 202 and user apparatus 1100.

(7) Display Unit 201, Input Unit 203

Display unit 201 displays various types of information under the control of control unit 202. Input unit 203 receives input of information from a manager of music distribution system management apparatus 200.

1.4 Structure of Public List Server Apparatus 400

Apparatus 400 is connected to music distribution system management apparatus 200 via a communication line, receives a music public list from apparatus 200 via the communication line, and stores the music public list internally. Furthermore, apparatus 400 is connected to user apparatus 1100 via a communication line, and sends the internally stored music public list to user apparatus 1100 via the Internet 5 in response to a request from user apparatus 1100.

Figure 9:
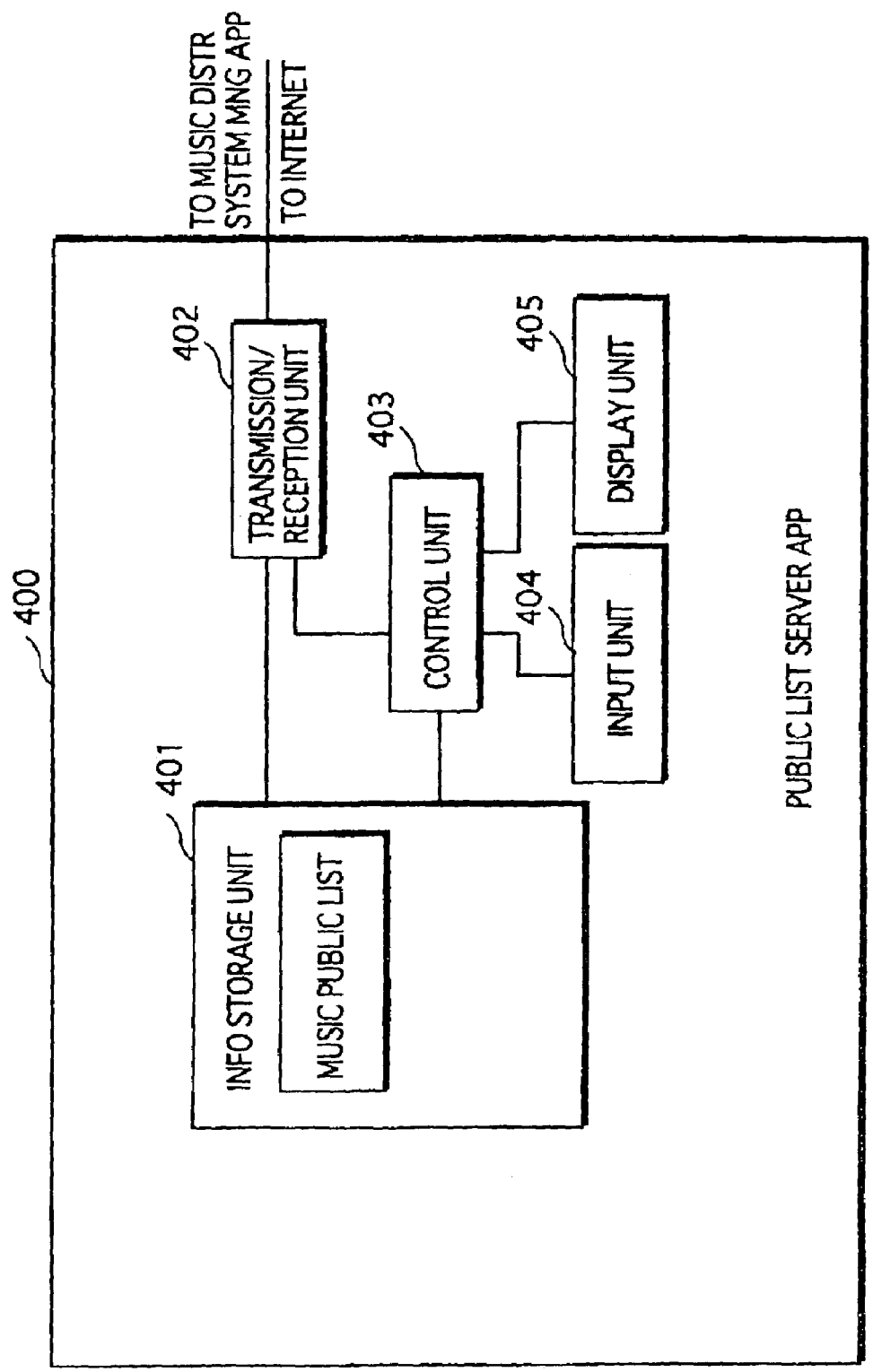
FIG. 9 is a block diagram showing a structure of a public list server apparatus 400.

As shown in FIG. 9, apparatus 400 is structured from an information storage unit 401, a transmission/reception unit 402; a control unit 403, an input unit 404, and a display unit 405.

As with key management apparatus 100, apparatus 400 is a computer system, and functions as a result of a microprocessor operating in accordance with a computer program.

Information storage unit 401 includes an area for storing information.

Transmission/reception unit 402 is connected to music distribution system management apparatus 200 via a communication line, and is also connected to user apparatus 1100 via the Internet 5.

Control unit 403 receives a transmission request relating to the music public list from user apparatus 1100 via the Internet 5. On receipt of the transmission request, unit 403 reads the music public list from information storage unit 401, and sends the read music public list to user apparatus 1100 via the Internet 5.

Input unit 404 receives inputs from a manager of apparatus 400.

Display unit 405 displays various types of information under the control of control unit 403.

1.5 Music Contents Distribution Apparatus 300

Apparatus 300 encrypts a group key using a node key received from music distribution system management apparatus 200, encrypts music information using the group key, and sends the encrypted group key and the encrypted music information to user apparatus 1100.

Figure 10:
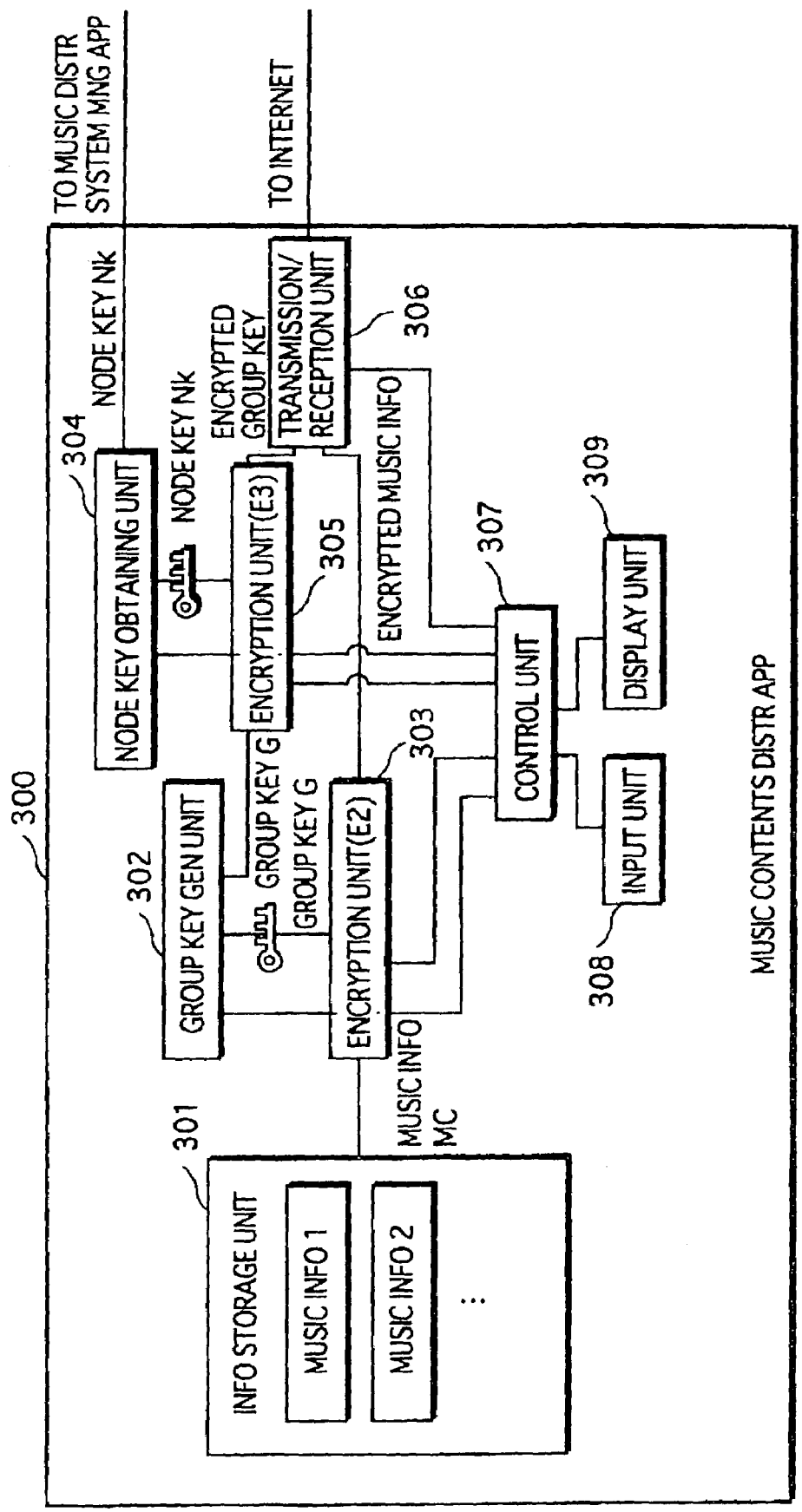
FIG. 10 is a block diagram showing a structure of a music contents distribution apparatus 300.

As shown in FIG. 10, apparatus 300 is structured from an information storage unit 301, a group key generation unit 302, an encryption unit 303, a node key obtaining unit 304, an encryption unit 305, a transmission/reception unit 306, a control unit 307, an input unit 308, and a display unit 309.

In FIG. 10, each block shows an element structuring apparatus 300, and is connected to other blocks by a connection line. Here, each connection line shows a route along which signals and information are transmitted. Of the plurality of connection lines connecting the block showing encryption unit 305, the connection line having a "key" mark attached is a route for transmitting information as a key to encryption unit 305. The same applies for the block showing encryption unit 303, and also for other drawing in which key-marked connection lines appear.

As with key management apparatus 100, apparatus 300 is a computer system, and functions as a result of a microprocessor operating in accordance with a computer program.

(1) Information Storage Unit 301

Unit 301 stores plural pieces of music information in advance.

(2) Node Key Obtaining Unit 304

Unit 304 is connected to music distribution system management apparatus 200 via a communication line, receives a node key from apparatus 200 via the communication line, and outputs the received node key as a node key Nk to encryption unit 305.

(3) Group Key Generation Unit 302

Unit 302 generates a random number, used the random number to generate a group key G, and outputs the group key G to encryption units 305 and 303.

(4) Encryption Unit 305

Unit 305 receives the node key Nk and the group key G from node key obtaining unit 304 and group key generation unit 302, respectively.

Next, unit 305 generates an encrypted group key E3(Nk, G) by using the node key Nk to perform an encryption algorithm E3 on the group key G.

In the given example, the encryption algorithm E3 is based on DES.

Next, unit 305 outputs the encrypted group key E3(Nk,G) to transmission/reception unit 306.

(5) Encryption Unit 303

Unit 303 reads music information MC from information storage unit 301, and receives the group key G from group key generation unit 302.

On receipt of group key G, unit 303 generates encrypted music information E2(G,MC) by using the group key G as a key to perform an encryption algorithm E2 on the music information MC.

In the given example, the encryption algorithm E2 is based on DES.

Next, unit 303 outputs the encrypted music information E2(G,MC) to transmission/reception unit 306.

(6) Transmission/Reception Unit 306

Unit 306 receives the encrypted group key E3(Nk,G) and the encrypted music information E2(G,MC) from encryption units 305 and 303, respectively.

Next, unit 306 sends the encrypted group key E3(Nk,G) and the encrypted music information E2(G,MC) to user apparatus 1100 via the Internet 5 in response to a user request received from user apparatus 1100.

(7) Control Unit 307, Input Unit 308, Display Unit 309

Control unit 307 controls the various structural elements of music contents distribution apparatus 300. Input unit 308 receives inputs from a manager of apparatus 300. Display unit 309 displays various types of information.

1.6 DVD Supply System Management Apparatus 500

Apparatus 500 manages keys used for encryption conducted in DVD supply system 3, and releases a DVD public list (described below) to user 1100 via public list supply apparatus 700.

Figure 11:
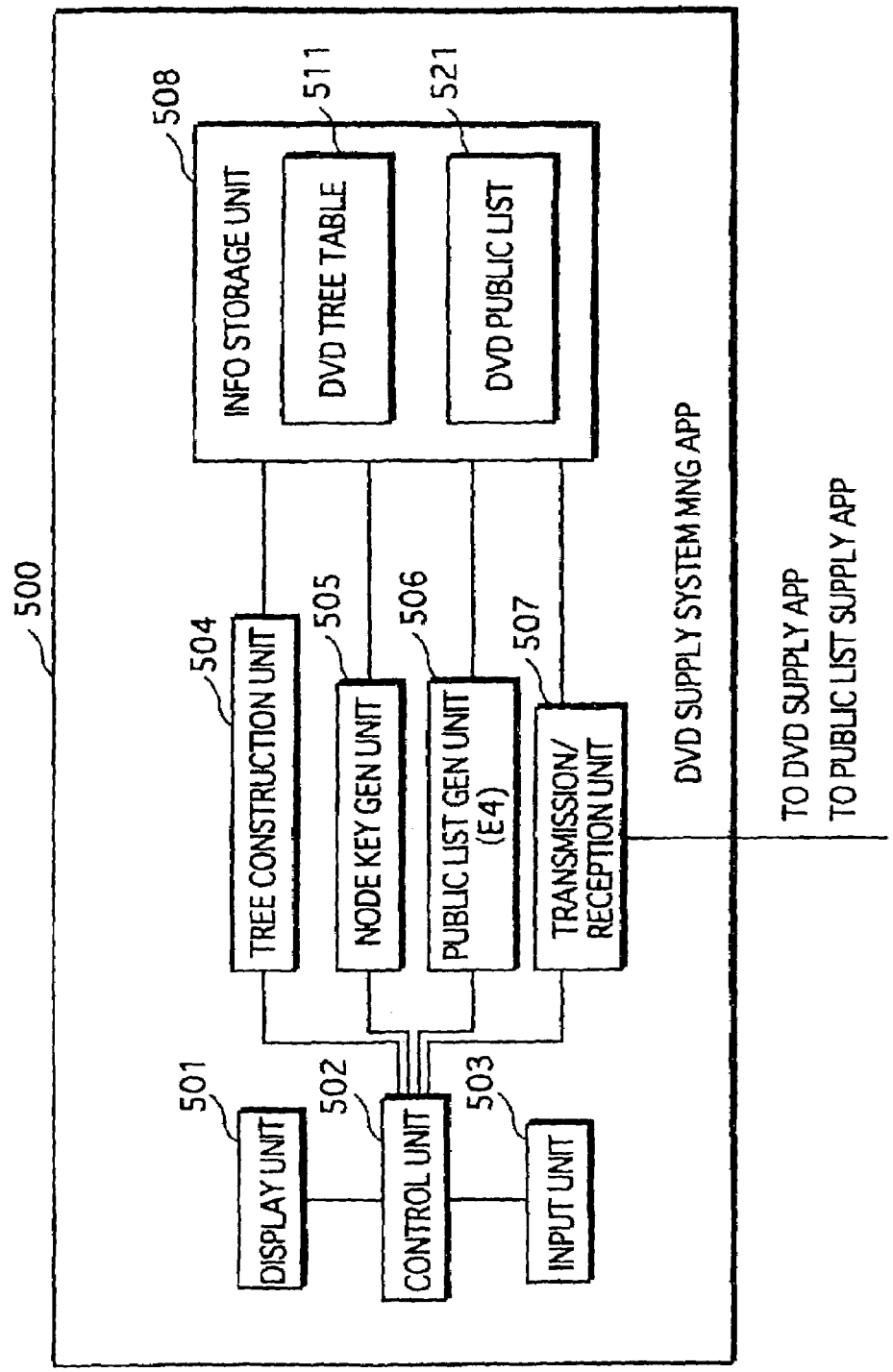
FIG. 11 is a block diagram showing a structure of a DVD supply system management apparatus 500.

As shown in FIG. 11, apparatus 500 is structured to include a display unit 501, a control unit 502, an input unit 503, a tree construction unit 504, a node key generation unit 505, a public list generation unit 506, a transmission/reception unit 507, and an information storage unit 508.

As with key management apparatus 100, apparatus 500 is a computer system, and functions as a result of a microprocessor operating in accordance with a computer program.

(1) Information Storage Unit 508

Unit 508 includes a DVD tree table 511 and a DVD public list 521.

Figure 13:
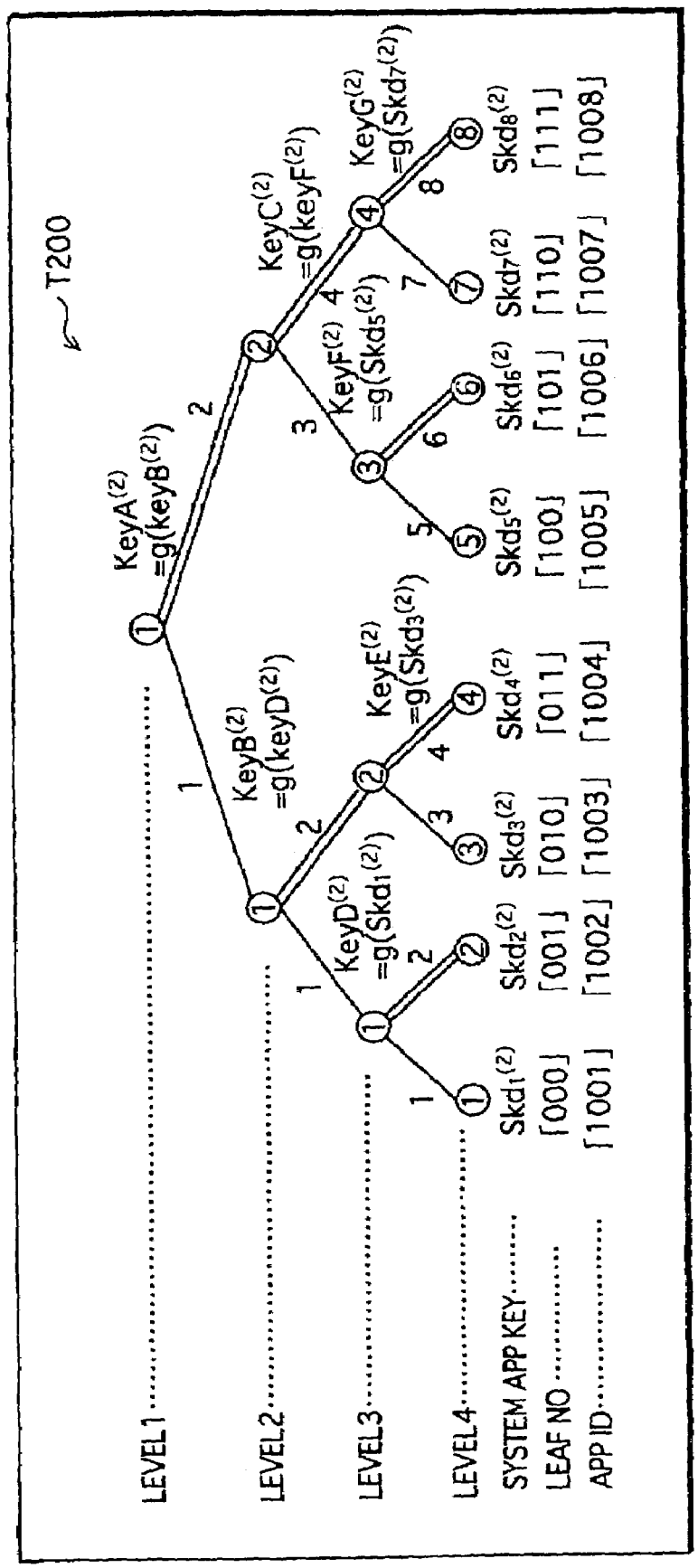
FIG. 13 is a conceptual diagram showing a tree T200.

DVD tree table 511 corresponds to a tree T200, an example of which is given in FIG. 13, and shows a data structure for expressing tree T200.

As described in detail in a later section, the data structure for expressing tree T200 is generated as DVD tree table 511 and written into information storage unit 508 by tree construction unit 504.

Tree T200: As shown in FIG. 13, tree T200 is a binary tree formed from four levels (levels 1-4). Since tree T200 has the same structure as tree T100, a detailed description in omitted here.

DVD tree table 511: As shown in FIG. 12, table 511 is structured to include an equal number of pieces of node information as there are nodes in tree T200, and the pieces of node information correspond one-to-one with the nodes structuring tree T200. Since table 511 has the same data structure as music distribution tree table 211, a detailed description in omitted here.

Node information relating to each node (excluding leaves) includes a level number, a node number and a node key, and node information relating to each leaf includes a level number, a node number, a node key and an apparatus ID. Since level numbers, node numbers, node keys and apparatus IDs are as described above, a detailed description in omitted here.

DVD public list 521: As shown in FIG. 14, list 521 is structured to include a system ID and a predetermined number of pieces of public information.

Each piece of public information includes index information and an encrypted node key.

Here, the "predetermined number" is equal to the number nodes (excluding leaves) included in tree T200. Each node (excluding leaves) in tree T200 corresponds to a piece of public information in list 521.

As described above, a system ID is an identifier for identifying a contents supply system supplying/distributing contents.

Each piece of index information includes a level number and a node number. Here, a level number shows the level to which a node corresponding to a piece of index information belongs. A node number shows a node corresponding to a piece of index information.

An encrypted node key is generated by using a node key allotted to a subordinate node connected to a node as a key to perform an encryption algorithm E4 on a node key allotted to the node.

In the given example, the encryption algorithm E4 is based on DES.

As shown in FIG. 14, an exemplary piece of public information included in table DVD public list 521 is (3,1) and E4(Skd2$^{(2)}$, KeyD$^{(2)}$).

Here, (3,1) shows the level number to be "3" and the node number to be "1". Furthermore, E4(Skd2$^{(2)}$, KeyD$^{(2)}$) shows a ciphertext being obtained by using Skd2$^{(2)}$ as a key to perform the encryption algorithm E4 on KeyD$^{(2)}$. KeyD$^{(2)}$ is a node key allotted to a node shown by the index information (3,1), and Skd2$^{(2)}$ is a node key allotted to a right-hand subordinate node connected to the node.

(2) Tree Construction Unit 504

Unit 504 is the same as tree construction unit 204, and a description is omitted here.

(3) Control Unit 502

Unit 502 is the same as control unit 202, and a description is omitted here.

(4) Node Key Generation Unit 505

Unit 505 generates a node key for each node (excluding leaves) in DVD tree table 511, and writes the generated node key into table 511 so as to correspond to the node.

The generation of node keys by node key generation unit 505 is described in detail in a later section.

(5) Public List Generation Unit 506

Unit 506 generates DVD public list 521, writes the generated public list 521 into information storage unit 508, and also sends the generated public list 521 to public list supply apparatus 700.

The generation of DVD public list 521 by public list generation unit 506 is described in detail in a later section.

(6) Transmission/Reception Unit 507

Unit 507 is connected to DVD supply apparatus 600 and user apparatus 1100 via a communication line and the Internet 5, respectively.

Unit 507 conducts transmission and reception of information between control unit 502 and DVD supply apparatus 600, and also conducts transmission and reception of information between control unit 502 and user apparatus 1100.

(7) Display Unit 501, Input Unit 503

Display unit 501 displays various types of information under the control of control unit 502. Input unit 503 receives input of information from a manager of DVD supply system management apparatus 500.

1.7 Structure of DVD Supply Apparatus 600

Apparatus 600 encrypts a group key using a node key received from DVD supply system management apparatus 500, encrypts movie information using the group key, and writes the encrypted group key and the encrypted movie information onto a DVD. The DVD is then supplied to a user, and the user mounts the DVD in user apparatus 1100.

Apparatus 600 has the same structure as music contents distribution apparatus 300, and a detailed description is omitted here.

1.8 Public List Supply Apparatus 700

Apparatus 700 is connected to DVD supply system management apparatus 500 via a communication line.

Apparatus 700 receives DVD public list 521 from apparatus 500 via the communication line, and writes the received list 521 onto a DVD. The DVD is then supplied to a user, and the user mounts the DVD in user apparatus 1100.

1.9 Movie Broadcast System Management Apparatus 800

Apparatus 800 manages keys used for encryption conducted in movie supply system 4, and releases a movie public list (described later) to user apparatus 1100 by broadcasting the movie public list on radio waves via transmission apparatus 1000 and broadcast satellite 6.

Figure 15:
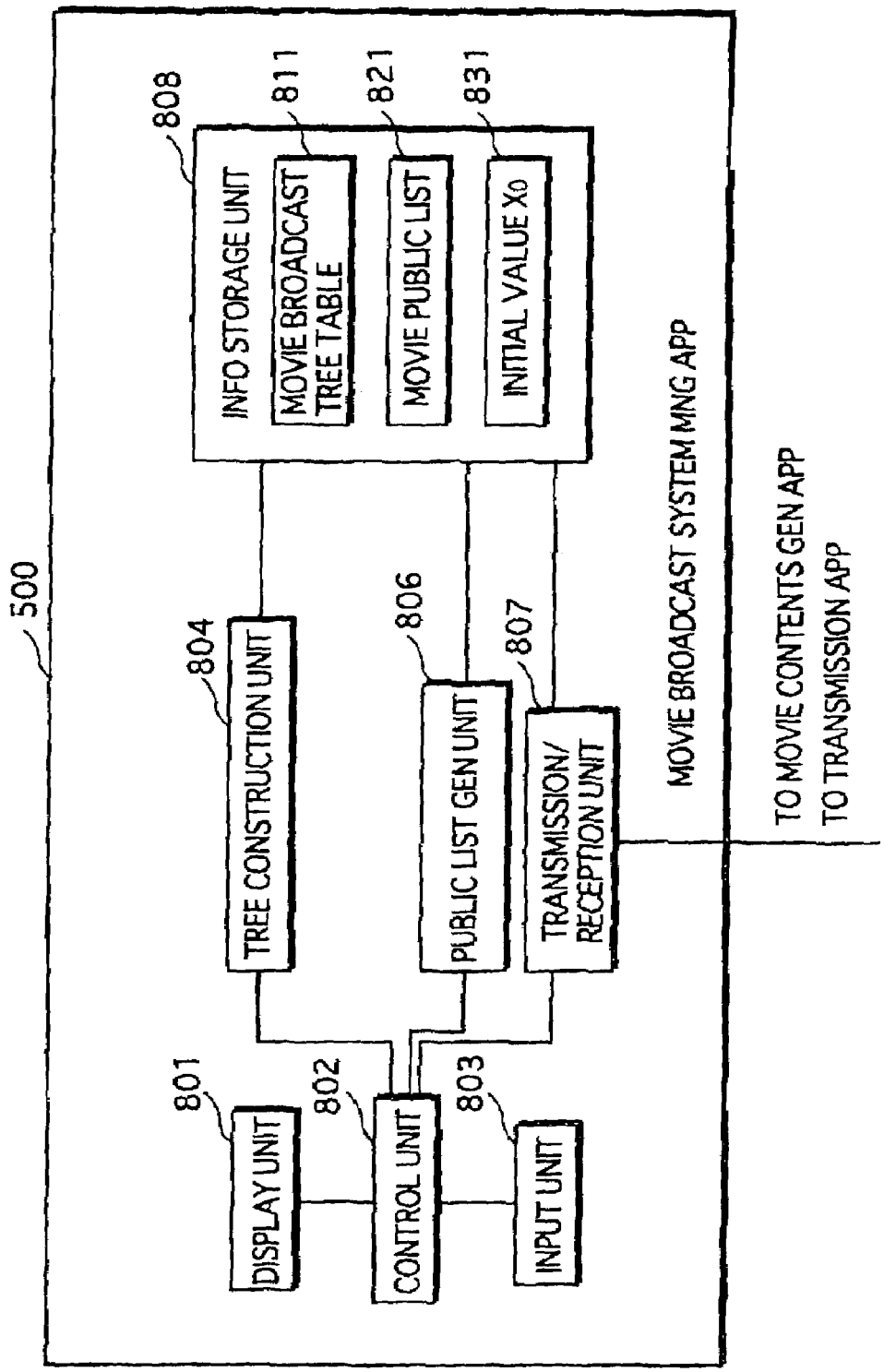
FIG. 15 is a block diagram showing a structure of a movie broadcast system management apparatus 800.

As shown in FIG. 15, apparatus 800 is structured from a display unit 801, a control unit 802, an input unit 803, a tree construction unit 804, a public key generation unit 806, a transmission/reception unit 807, and an information storage unit 808.

As with key management apparatus 100, apparatus 800 is a computer system, and functions as a result of a microprocessor operating in accordance with a computer program.

(1) Information Storage Unit 808

Unit 808 has a movie broadcast tree table 811 and a movie public list 821, and stores an initial value $x_0$ 831 in advance.

Figure 16:
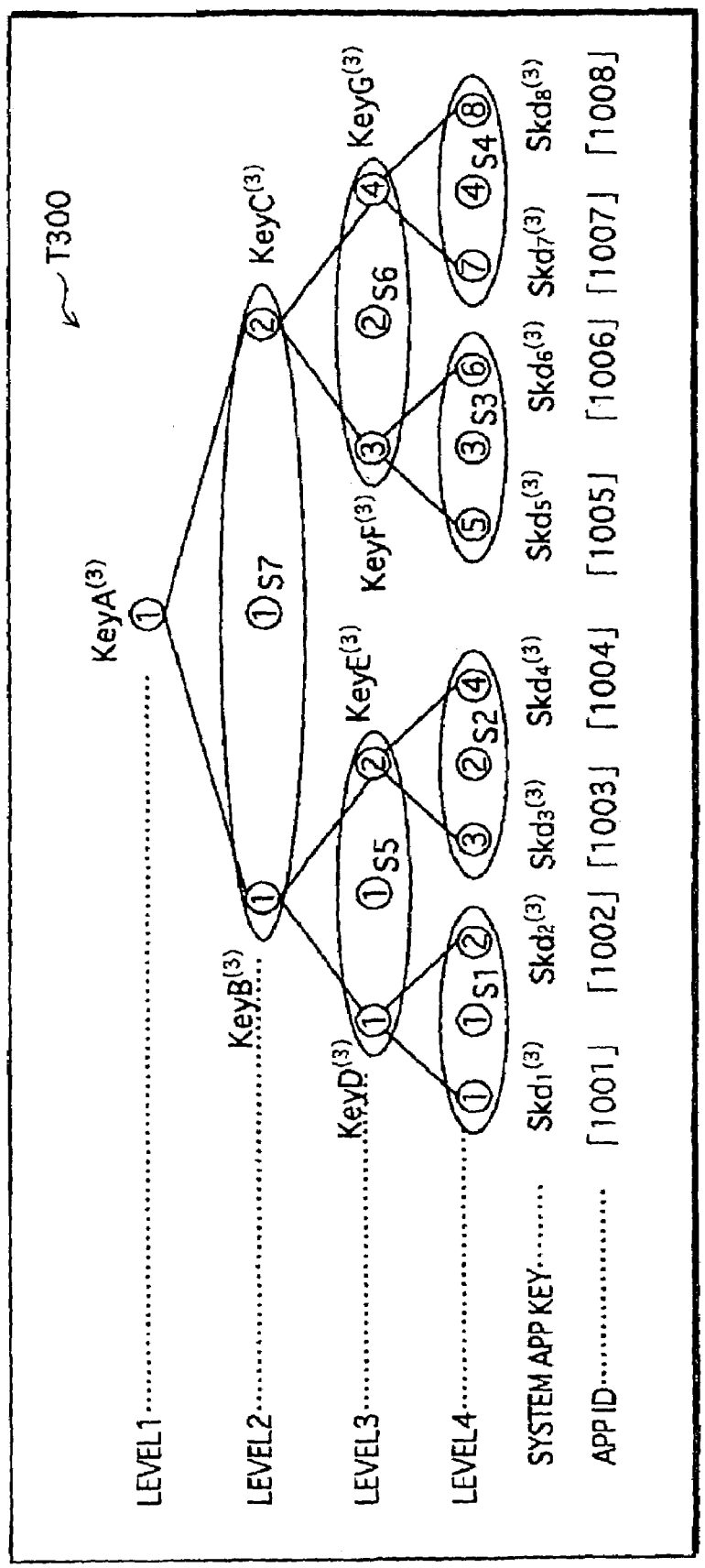
FIG. 16 is a conceptual diagram showing a tree T300.

Table 811 corresponds to a tree T300, an example of which is given in FIG. 16, and shows a data structure for expressing tree T300.

As described below, the data structure for expressing tree T300 is generated as table 811 and written into unit 808 by tree construction unit 804.

Tree T300: As shown in FIG. 16, tree T300 is a binary tree formed from four levels (levels 1-4). Since tree T300 has the same structure as tree T100, a detailed description is omitted here.

Here, there is a plurality of release points that relates to tree T300.

Node keys allotted to two nodes (i.e. at the same level, and subordinate to a shared parent node) in tree T300 are considered as two points in a two-dimensional space (x-y coordinate system), and a release point is a point on a straight line L connecting the two points. The x-coordinate of the release point is predetermined, and has a value equal to the initial value $x_0$.

A release point is thus determined in relation to node keys allotted to two nodes belonging to the same level of tree T300. Specifically, as shown in FIG. 16, at level 2 there exists a single release point s7, at level 3 there exists two release points s5 and s6, and at level 4 there exists four release points s1 to s4.

Here, the relationship between the release points and levels is expressed below as a release point "belonging" to a certain level.

The release points are shown in index information (level number, release point node number). Here, a level number shows the level to which a release point belongs, and a release point node number is an identification number for identifying a release point at the level shown by a level number.

Movie Broadcast Tree Table 811: As shown in FIG. 17, table 811 is structured to include an equal number of pieces of node information as there are nodes in tree T300, and the pieces of node information correspond one-to-one with the nodes structuring tree T300.

Node information relating to each node (excluding leaves) includes a level number, a node number and a node key, and node information relating to each leaf includes a level number, a node number, a node key and an apparatus ID. Since level numbers, node numbers, node keys and apparatus IDs are as described above, a description is omitted here.

Movie Public List 821: As shown in FIG. 20, list 821 is structured to include a system ID, an initial value $x_0$, and a predetermined number of pieces of public information. Each piece of public information includes index information and a release point y-coordinate.

Here, the "predetermined number" is equal to the number of release points existing in relation to tree T300, and the release points correspond one-to-one with the pieces of public information included in list 821.

As described above, a system ID is an identifier for identifying a contents supply system supplying/distributing contents.

Each piece of index information includes a level number and a release point node number. Here, a level number shows the level to which a release point corresponding to a piece of index information belongs. A release point node number identifies a release point at the level shown by a level number.

A release point y-coordinate shows the y-coordinate of a release point.

Initial value $x_0$: Initial value $x_0$ shows the x-coordinate of a release point.

(2) Tree Construction Unit 804

Unit 804 generates movie broadcast tree table 811 and writes the generated table 811 into information storage unit 808. Specifically, unit 804 generates, for each node in tree T300, node information that includes a level number and a node number, and writes the generated node information into table 811. At this stage in the process, the node information does not include a node key or an apparatus ID.

Unit 804 receives an apparatus ID and a system apparatus key $Skdi^{(3)}$ from key management apparatus 100 via control unit 802, and writes the received apparatus ID and system apparatus key $Skdi^{(3)}$ into table 811, so that the system apparatus key Skdi$^{(3)}$ corresponds to a singe leaf. Furthermore, unit 804 outputs a leaf number showing the leaf to control unit 802.

(3) Control Unit 802

Unit 802 repeats the receiving of apparatus IDs and system apparatus keys Skdi$^{(3)}$, the writing into table 811 of the system apparatus keys, and the transmitting of leaf numbers to a user apparatus until the receiving of apparatus IDs and system apparatus keys Skdi$^{(3)}$ has been completed.

Next, control unit 802 receives a system ID and a system apparatus key Skdi$^{(3)}$ from key management apparatus 100 via transmission/reception unit 807, and outputs the received system ID and system apparatus key Skdi$^{(3)}$ to tree construction unit 804.

Furthermore, based on a predetermined reference, unit 802 selects a single node key from table 811. In the given example given, unit 802 selects a node key allotted to the most superordinate node (i.e. the root) out of all the nodes existing on a route connecting a leaf to the root. Next, unit 802 sends the selected node key to movie contents supply apparatus 900.

(4) Public Key Generation Unit 806

Unit 806 generates movie public list 821, writes the generated public list 821 into information storage unit 808, and also sends the generated public list 821 to transmission apparatus 1000. Furthermore, unit 806 generates a node key for each node (excluding leaves) in tree T300, and allots the generated node key to the node.

The following is a detailed description of the generation of movie public list 821 and node keys by unit 806, and the allotment of the node keys to nodes by unit 806.

Unit 806 repeats the following processing operations ① to ⑨ in order from level 3 to level 1, and in order of the nodes at each level.

① Unit 806 reads, from movie broadcast tree table 811, the two pieces of node information corresponding to the two subordinate nodes connected to a targeted node.

Figure 19:
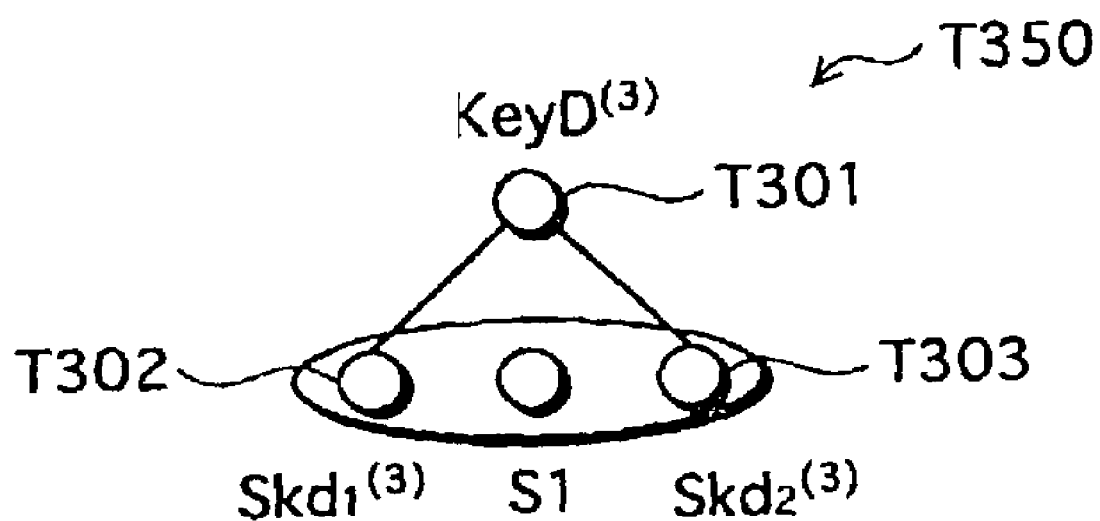
FIG. 19 is a conceptual diagram showing a section of tree T300.

In the given example, the targeted node is node T301 shown by the index information (3,1). A section of tree T300 that includes node T301 is shown in FIG. 19. Unit 806 reads, from movie broadcast tree table 811, the two pieces of node information 812 and 813 corresponding to the two subordinate nodes T302 and T303, respectively, connected to node T301.

② Unit 806 extracts two node keys Nk1 and Nk2 from the two pieces of read node information.

In the given example, unit 806 extracts node keys Skd1$^{(3)}$ and Skd2$^{(3)}$ from the two pieces of read node information 812 and 813, respectively.

③ Unit 806 considers the two node keys Nk1 and Nk2 as two points, and derives a straight line L passing through the two points. Specifically, if node key Nk1 is expressed by 32 bits, the upper 16 bits of which is for an x-coordinate, and the lower 16 bits of which is for a y-coordinate, then node key Nk1 is expressed as a point in a two-dimensional space (x-y coordinate system) by the x-y coordinates. The same applies for node key Nk2.

Figure 18:
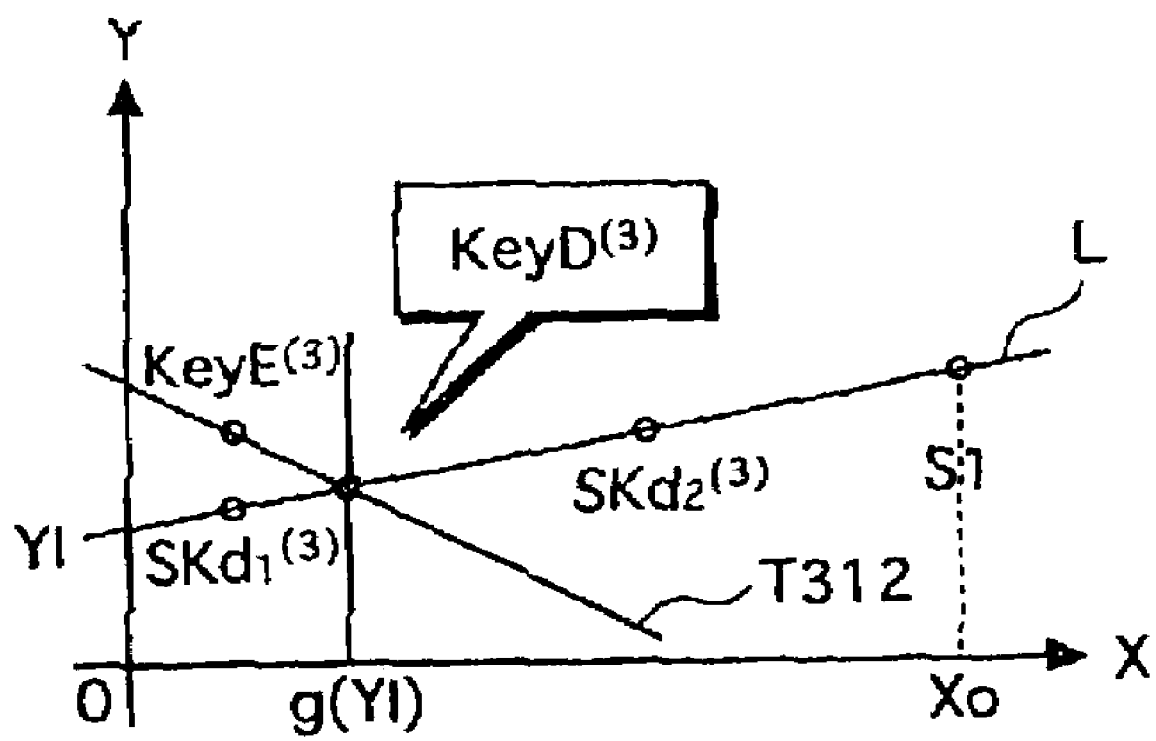
FIG. 18 is a conceptual diagram showing the generation, in an x-y coordinate space, of a public list by a public list generation unit 806.

In the given example, unit 806 derives a straight line L passing though the two points given by node keys Skd1$^{(3)}$ and Skd2$^{(3)}$. In FIG. 18 are shown the two points given by node keys Skd1$^{(3)}$ and Skd2$^{(3)}$ on the x-y coordinate system and the straight line L.

④ Unit 806 derives a point($x_0, s_{(y)}$) on the straight line L.

In the given example, unit 806 derives a point s1($x_0, s_{(y)}$) on the straight line L. As shown in FIG. 18, the point s1 exists on the straight line L passing through the two points given by node keys Skd1$^{(3)}$ and Skd2$^{(3)}$.

⑤ Unit 806 writes a release point y-coordinate into movie public list 821 together with a piece of index information (level number, release point node number).

In the given example, unit 806 writes index information (4,1) and a release point y-coordinate s1$_{(y)}$ into movie public list 821.

⑥ Unit 806 derives a y-intercept YI of the straight line L.

As shown in FIG. 18, YI is the y-coordinate of the intersection between the straight line L and the y-axis.

⑦ Unit 806 calculates g(YI) using a one-way function g.

⑧ Unit 806 derives a y-coordinate YG on the straight line L that has an x-coordinate g(YI).

⑨ Unit 806 sets the derived points (g(YI), YG) as a node key, and writes the node key into movie broadcast tree table 811 so that the node key corresponds to the targeted node.

In the given example, KeyD$^{(3)}$=(g(YI),YG).

By repeating the above processing operations ① to ⑨, node keys are generated and allotted with respect to all nodes (excluding leaves) shown in movie broadcast tree table 811 (example shown in FIG. 17), and a movie public list 821 (example shown in FIG. 20) is generated.

(5) Transmission/Reception Unit 807

Unit 807 is connected to movie contents supply apparatus 900 and transmission apparatus 1000 via a communication line.

Unit 807 conducts transmission and reception between control unit 802 and apparatus 900. Furthermore, unit 807 sends information outputted from control unit 802 to user apparatus 1100 via apparatus 1000, transmission antenna 10, broadcast satellite 6, and reception antenna 9.

(6) Display Unit 801, Input Unit 803

Display unit 801 displays various types of information under the control of control unit 802. Input unit 203 receives input of information from a manager of movie broadcast system management apparatus 800.

1.10 Movie Contents Supply Apparatus 900

Apparatus 900 encrypts a group key using a node key received from movie broadcast system management apparatus 800, encrypts movie information using the group key, and transmits the encrypted group key and the encrypted movie information to user apparatus 1100 via transmission apparatus 1000, transmission antenna 10, broadcast satellite 6, and reception antenna 9.

Apparatus 900 has the same structure as music contents distribution apparatus 300, and a detailed description is omitted here.

1.11 Transmission Apparatus 1000, Broadcast Satellite 16

Apparatus 1000 is connected to movie broadcast system management apparatus 800 and movie contents supply apparatus 900 via a communication line, receives various information from apparatuses 800 and 900, and uses transmission antenna 10 to send the received information to broadcast satellite 6 as radio waves.

1.12 User Apparatus 1100

User apparatus 1100 decrypts, based on an apparatus key kdi (stored by user apparatus 1100) and a music public list, encrypted music contents, and plays back the music contents. User apparatus 1100 also decrypts, based on the apparatus key kdi (stored by user apparatus 1100) and a DVD public list, encrypted movie contents recorded on a DVD, and plays back the movie contents. Furthermore, user apparatus 1100 receives radio waves, extracts encrypted movie contents from the received radio waves, decrypts, based on the apparatus key kdi (stored by user apparatus 1100) and a movie public list, the encrypted movie contents extracted from the radio waves, and plays back the movie contents.

Figure 21:
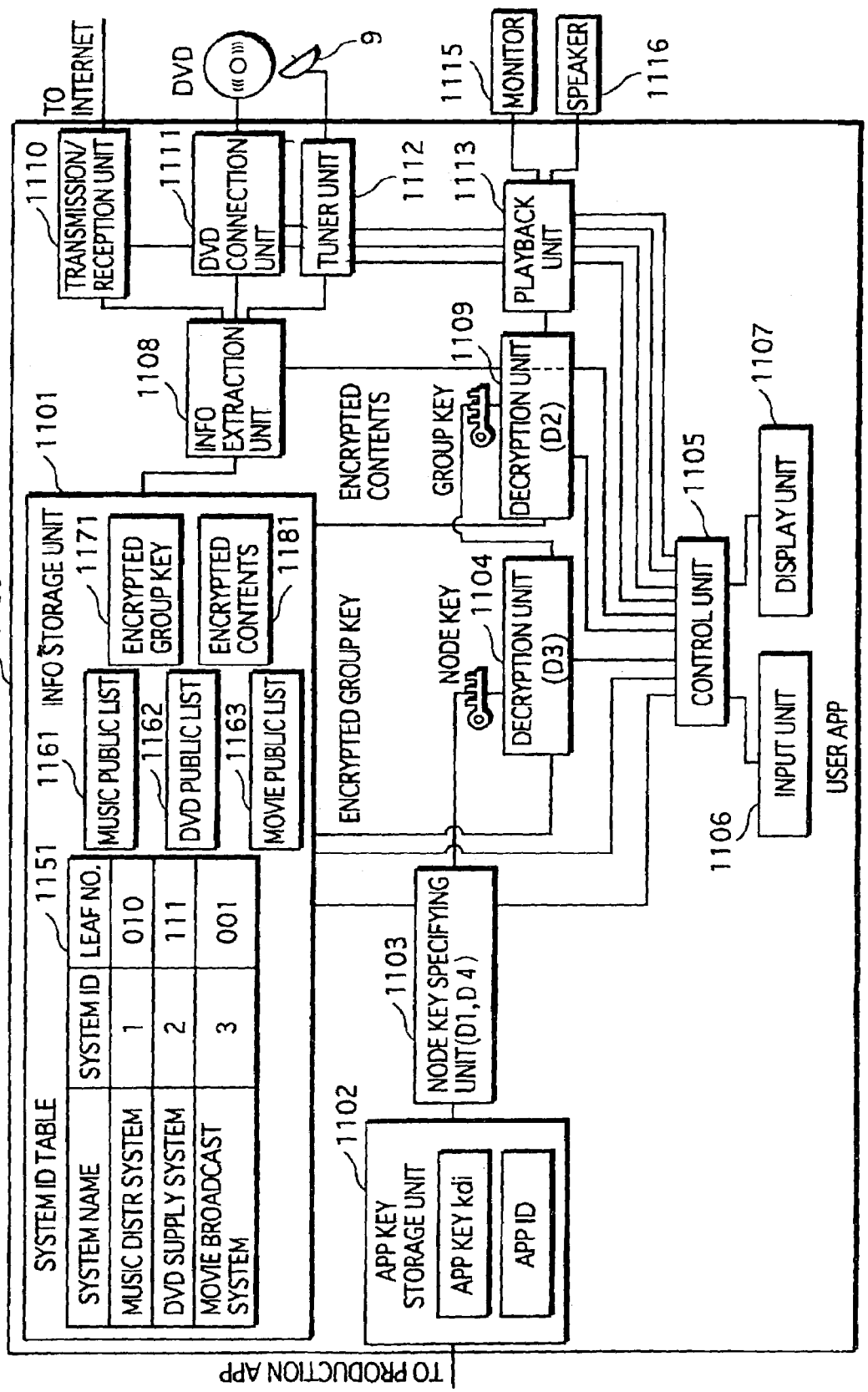
FIG. 21 is a block diagram showing a structure of a user apparatus 1100.

As shown in FIG. 21, user apparatus 1100 is structured from an information storage unit 1101, an apparatus key storage unit 1102, a node key specifying unit 1103, a decryption unit 1104, a control unit 1105, an input unit 1106, a display unit 1107, an information extraction unit 1108, a decryption unit 1109, a transmission/reception unit 1110, a DVD connection unit 1111, a tuner unit 1112, and a playback unit 1113.

A reception antenna 9, a monitor 1115, and a speaker 1116 are connected to user apparatus 1100. Furthermore, user apparatus 1100 is connected to the Internet 5.

The structure of other user apparatuses is the same as that of user apparatus 1100, and a description is omitted here.

(1) Apparatus key Storage Unit 1102

Unit 1102 includes an area for storing apparatus keys kdi and apparatus IDs.

An apparatus key kdi and an apparatus ID are as described above, and a description is omitted here.

(2) Information Storage Unit 1101

Unit 1101 has a system ID table 1151, and includes an area for storing a music public list 1161, a DVD public list 1162, a movie public list 1163, encrypted group keys, and encrypted contents.

Since the various public lists and encrypted group keys/contents are as described above, a description is omitted here.

System ID table 1151 includes an area for storing a plurality of pieces of information, each of which includes a system name, a system ID and a leaf number.

A system name is for specifying a contents supply system, examples of which include music distribution system 2, DVD supply system 3, and movie broadcast system 4.

A system ID is, as described above, an identifier for identifying a contents supply system.

A leaf number shows a leaf allotted to user apparatus 1100 in the corresponding contents supply system.

(3) Transmission/Reception Unit 1110, DVD Connection Unit 1111, Tuner Unit 1112

Transmission/reception unit 1110 is connected to the Internet 5, receives information from an external apparatus, and outputs the received information to information extraction unit 1108. DVD connection unit 1111 reads information from a DVD mounted in user apparatus 1100, and outputs the read information to information extraction unit 1108.

Tuner unit 1112 is connected to reception antenna 9, selectively receives radio waves, and outputs the received radio waves to information extraction unit 1108 as information.

(4) Input Unit 1106

Input unit 1106 receives input of information from a user, and outputs the received information to control unit 1105.

(5) Control Unit 1105

Unit 1105 receives, from the user via input unit 1106, input of a system name for use. On receipt of the input, control unit 1105 obtains a system ID corresponding to the received system name from system ID table 1151 in information storage unit 1101.

Next, unit 1105 judges whether the obtained system ID is one of "1", "2" or "3". If judged that the system ID is "1", unit 1105 controls node key specifying unit 1103 to conduct processing related to a node key specification (1). If judged that the system ID is "2", unit 1105 controls unit 1103 to conduct processing related to a node key specification (2). And if judged that the system ID is "3", unit 1105 controls unit 1103 to conduct processing related to a node key specification (3).

Control unit 1105 judges whether the obtaining, decrypting and playing of contents has been completed, and if judged to be not completed, unit 1105 controls the various structural elements to repeat the obtaining, decrypting and playing of contents. When judged to be completed, unit 1105 ends the obtaining, decrypting and playing of contents by user apparatus 1100.

(6) Information Extraction Unit 1108

Obtaining a System ID and a Leaf Number: Unit 1108 receives a system ID and a leaf number from music distribution system management apparatus 200 via the Internet 5 and transmission/reception unit 1110, corresponds the received system ID and leaf number to the system name "music distribution system", and writes the corresponded system ID and leaf number into system ID table 1151.

Unit 1108 also receives a system ID and a leaf number from DVD supply system management apparatus 500 via the Internet 5 and transmission/reception unit 1110, corresponds the received system ID and leaf number to the system name "DVD supply system", and writes the corresponded system ID and leaf number into system ID table 1151.

Furthermore, unit 1108 receives a system ID and a leaf number from movie broadcast system management apparatus 800 via transmission apparatus 1000, transmission antenna 10, broadcast satellite 6, reception antenna 9 and tuner unit 1112, corresponds the received system ID and leaf number to the system name "movie broadcast system", and writes the corresponded system ID and leaf number into system ID table 1151.

Obtaining a Public List: Unit 1108 receives a music public list from public list server apparatus 400 via the Internet 5 and transmission/reception unit 1110, and writes the received music public list into information storage unit 1101 as a music public list 1161.

Also, when a DVD having a DVD public list recorded thereon by a user is mounted in user apparatus 1100, unit 1108 reads the DVD public list from the mounted DVD via DVD connection unit 1111, and writes the read DVD public list into information storage unit 1101 as a DVD public list 1162.

Furthermore, unit 1108 receives a movie public list from movie broadcast system management apparatus 800 via transmission apparatus 1000, transmission antenna 10, broadcast satellite 6, reception antenna 9 and tuner unit 1112, and writes the received movie public list into information storage unit 1101 as a movie public list 1163.

Obtaining an Encrypted Group Key and an Encrypted Content: Unit 1108 receives an encrypted group key and an encrypted content from music contents distribution apparatus 300 via the Internet 5 and transmission/reception unit 1110, and writes the encrypted group key and the encrypted content into information storage unit 1101 as an encrypted group key 1171 and an encrypted content 1181.

Also, when a DVD having an encrypted group key and an encrypted content recorded thereon by a user is mounted in user apparatus 1100, unit 1108 reads the encrypted group key and the encrypted content from the mounted DVD via DVD connection unit 1111, and writes the encrypted group key and the encrypted content into information storage unit 1101 as an encrypted group key 1171 and an encrypted content 1181.

Furthermore, unit 1108 receives an encrypted group key and an encrypted content from movie contents supply apparatus 900 via transmission apparatus 1000, transmission antenna 10, broadcast satellite 6, reception antenna 9 and tuner unit 1112, and writes the encrypted group key and the encrypted content into information storage unit 1101 as an encrypted group key 1171 and an encrypted content 1181.

(7) Decryption Unit 1104

When the specifying of node keys by node key specifying unit 1103 is completed, unit 1104 reads an encrypted group key from information storage unit 1101, and generates a group key=D3(node key, encrypted group key) by using a specified node key as a key to perform a decryption algorithm D3 on the encrypted group key.

Here, the decryption algorithm D3 corresponds to the encryption algorithm E3, and decrypts a ciphertext generated by the encryption algorithm E3.

(8) Decryption Unit 1109

Unit 1109 reads an encrypted content from information storage unit 1101, and generates a content=D2(group key, encrypted content) by using the generated group key as a key to perform a decryption algorithm D3 on the encrypted content.

Here, the decryption algorithm D2 corresponds to the encryption algorithm E2, and decrypts a ciphertext generated by the encryption algorithm E2.

(9) Playback Unit 1113

Unit 1113 is connected to monitor 1115 and speaker 1116.

Unit 1113 plays back the generated content and outputs the content to monitor 1115 and speaker 1116.

(10) Display Unit 1107

Unit 1107 displays information under the control of control unit 1105.

(11) Node Key Specifying Unit 1103

Unit 1103 executes processing related to one of node key specifications (1), (2) or (3) under the control of control unit 1105.

(a) Node Key Specification (1)

Unit 1103 reads a leaf number corresponding to a system ID from system ID table 1151 in information storage unit 1101, and reads an apparatus key kdi from apparatus key storage unit 1102.

Unit 1103 then specifies a public list corresponding to the system ID. The public list is specified by judging whether the system ID included in the public list matches the system ID obtained by control unit 1105. In the given example, the system ID is "1", and thus music public list 1161 is specified.

Next, unit 1103 generates a system apparatus key $Skdi^{(1)}$ =h(kdi, System ID). Here, "h" is a one-way function. Next, unit 1103 adds "1" to the leaf number, and derives a path number at level 3. For example, if the leaf number is "000", then "001" results from "1" being added to "000". This value matches the number of the path connecting a leaf shown by the leaf number "000". Next, unit 1103 sets the index information=(3, path number), and reads an encrypted node key corresponding to the set index information from music public list 1161. Next, unit 1103 decrypts the encrypted node key using the system apparatus key $Skdi^{(1)}$ as a key:

$R_3 = D1(Skdi^{(1)}, \text{encrypted node key})$

It is thus possible to derive a node key allotted to a superordinate node connected to the leaf shown by the leaf number allotted to user apparatus 1100.

In the same manner as described above, unit 1103 derives a node key allotted to a node at the next level up.

In this way it is possible to determine the node key allotted to each node on the route from the leaf shown by the leaf number to the root.

Next, unit 1103 selects a single node key from among the plurality of derived node keys. In the given example, the node key allotted to the most superordinate node (i.e. the root) is selected.

(b) Node Key Specification (2)

Unit 1103 reads a leaf number corresponding to a system ID from system ID table 1151 in information storage unit 1101, and reads an apparatus key kdi from apparatus key storage unit 1102. Furthermore, unit 1103 specifies a public list corresponding to the system ID in the manner described above. In the given example, the system ID is "2", and thus music public list 1162 is specified.

Next, unit 1103 generates a system apparatus key $Skdi^{(2)}$ =h(kdi, System ID) in the manner described above.

Unit 1103 then determines, based on a value of the least significant bit in the leaf number, whether to take the left path or the right path from level 4 to level 3 of tree T200. The left path is taken if the least significant bit is "0", and the right path is taken if the least significant bit is "1".

Next, unit 1103 uses the value of the second bit of the leaf number when determining whether to take the left path or the right path from level 3 to level 2 of tree T200. The left path is taken if the second bit is "0", and the right path is taken if the second bit is "1".

Unit 1103 then uses the value of the most significant bit of the leaf number when determining whether to take the left path or the right path from level 2 to level 1 of tree T200. The left path is taken if the most significant bit is "0", and the right path is taken if the most significant bit is "1".

The use of the bits in the leaf number to determine whether to take the left path or the right path is thus realized by each bit being predetermined as indicating either the left path or right path.

If the left path is taken from level 4 to level 3, unit 1103 derives a node key $R_3 = g(Skdi^{(2)})$.

If the right path is taken from level 4 to level 3, unit 1103 derives a node number at level 3 from the leaf number, sets the index information=(3, node number), reads an encrypted node key corresponding to the set index information from DVD public list 1162, and decrypts the encrypted node key using $Skdi^{(2)}$ as a key. Node key $R_3 = D4(Skdi^{(2)}, \text{encrypted node key})$ is thus obtained.

By repeating the above processes from the higher levels to the lower levels, unit 1103 derives the node key allotted to each node on the route from the leaf shown by the leaf number to the root.

Next, unit 1103 selects a single node key from among the plurality of derived node keys. In the given example, the node key allotted to the most superordinate node (i.e. the root) is selected.

(c) Node Key Specification (3)

Unit 1103 reads a leaf number corresponding to a system ID from system ID table 1151 in information storage unit 1101, reads an apparatus key kdi from apparatus key storage unit 1102, and specifies a public list corresponding to the system ID. In the given example, the system ID is "3", and thus movie public list 1163 is specified.

Next, unit 1103 generates a system apparatus key $Skdi^{(3)}$= h(kdi, System ID). Furthermore, unit 1103 reads an initial value $x_0$ from movie public list 1163.

Unit 1103 then derives a node number of a release point at level 4 from the leaf number, sets the index information= (4, release point node number), and reads a release point y-coordinate $y_4$ corresponding to the set index information from movie public list 1163. Next, unit 1103 derives a straight line $L_4$ passing through the apparatus key kdi and the release point$(x_0, y_4)$, derives a y-intercept $YI_4$ of the straight line $L_4$, and derives $g(YI_4)$. Next, unit 1103 derives a y-coordinate $YG_4$ of a point on the straight line $L_4$ having an x-coordinate $g(YI_4)$, and sets $R_3=(g(YI_4), YG_4)$. The node key $R_3$ is thus obtained.

By repeating the above processes, unit 1103 derives the node key allotted to each node on the route from the leaf shown by the leaf number to the root.

Next, unit 1103 selects a single node key from among the plurality of derived node keys. In the given example, the node key allotted to the most superordinate node (i.e. the root) is selected.

1.13 Operations Performed by Key Management Apparatus 100

Figure 22:
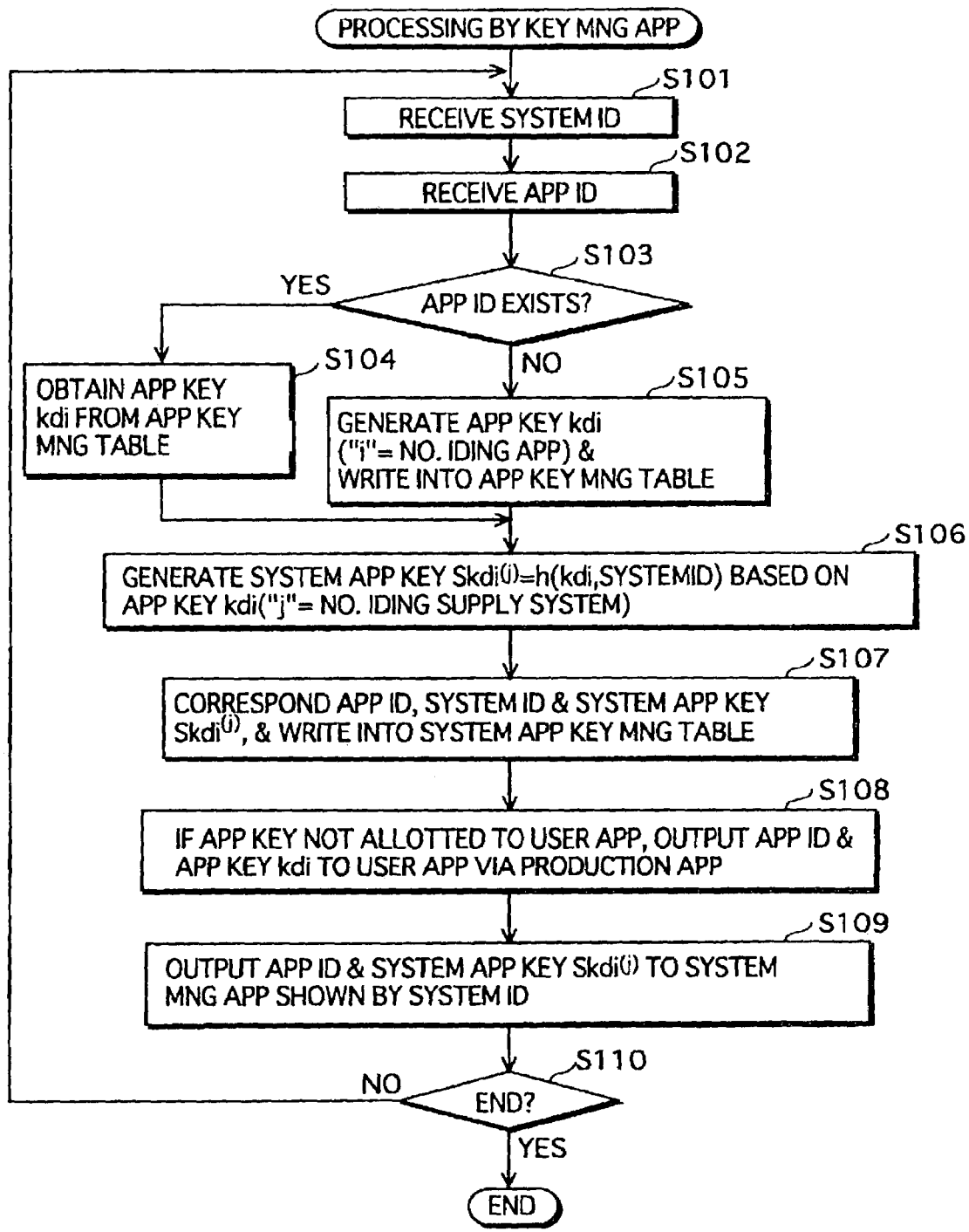
FIG. 22 is a flowchart showing operations performed by key management apparatus 100.

The operations performed by key management apparatus 100 will now be described using the flowchart shown in FIG. 22.

Control unit 102 receives input of a system ID from a key manager via input unit 101 (step S101), and receives input of an apparatus ID via input unit 101 (step S102).

Next, control unit 102 judges whether the received apparatus ID is stored in apparatus key management table 111 (step S103). If judged that the received apparatus ID is not stored in table 111 (step S103=No), control unit 102 outputs the apparatus ID to apparatus generation unit 104 and instructs unit 104 to newly generate an apparatus key, in response to which unit 104 newly generates an apparatus key kdi, outputs the apparatus ID and the apparatus key kdi to apparatus key output unit 106, outputs the apparatus key kdi to system apparatus key generation unit 105, and writes apparatus information structured from the apparatus ID and the apparatus key kdi into apparatus key management table 111 (step S105).

If judged that the received apparatus ID is stored in table 111 (step S103=Yes), control unit 102 reads apparatus information that includes the apparatus ID from table 111, reads an apparatus key kdi from the read apparatus information, and outputs the apparatus key kdi to system apparatus key generation unit 105 (step S104).

System apparatus key generation unit 105 receives the apparatus key kdi from apparatus generation unit 104, receives the system ID from control unit 102, generates a system apparatus key $Skdi^{(j)}$=h(kdi,system ID) by performing a one-way function h on the received apparatus key kdi and system ID, and outputs the system ID and the generated system apparatus key $Skdi^{(j)}$ to system apparatus key transmission unit 108 (step S106).

Next, unit 105 corresponds the apparatus ID, the system ID and the system apparatus key $Skdi^{(j)}$ to form system information, and writes the system information into system apparatus key management table 121 (step S107).

Next, if the user apparatus has not been allotted an apparatus key, apparatus key output unit 106 outputs the apparatus ID and the apparatus key kdi to the user apparatus via production unit 1200 (step S108).

Next, system apparatus key transmission unit 108 sends the apparatus ID and the system apparatus key $Skdi^{(j)}$ to the system management apparatus shown by the system ID (step S109).

Next, if the generation of apparatus keys and system apparatus keys is completed (step S110=Yes), key management apparatus 100 ends the processing. On the other hand, if the generation of apparatus keys and system apparatus keys is not completed (step S110=No), apparatus 100 returns to step S101 and repeats the processing.

1.14 Operations Performed by Music Distribution System Management Apparatus 200

(1) Main Operations Performed by Apparatus 200

Figure 23:
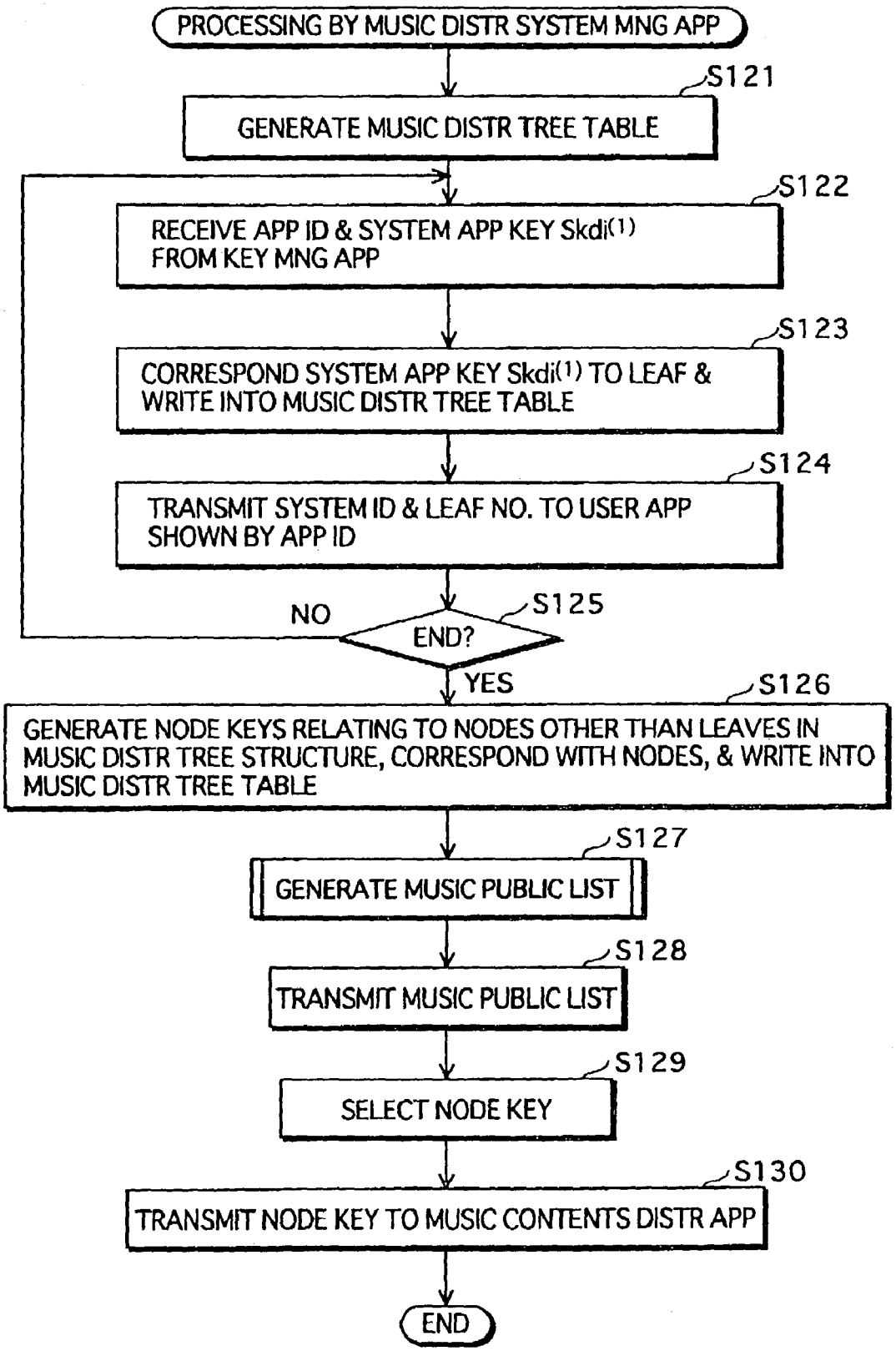
FIG. 23 is a flowchart showing operations performed by music distribution system management apparatus 200.

The main operations performed by music distribution system management apparatus 200 will now be described using the flowchart shown in FIG. 23.

Tree construction unit 204 generates a music distribution tree table 211 and writes the generated table 211 into information storage unit 208 (step S121).

Next, control unit 202 receives an apparatus ID and a system apparatus key $Skdi^{(1)}$ from key management apparatus 100 via transmission/reception unit 207, and outputs the received apparatus ID and system apparatus key $Skdi^{(1)}$ to tree construction unit 204 (step S122). Unit 204 writes the apparatus ID and the system apparatus key $Skdi^{(1)}$ into music distribution tree table 211, so that the system apparatus key $Skdi^{(1)}$ corresponds to a single leaf (step S123). Control unit 202 sends the system ID (=1) and the leaf number to the user apparatus shown by the received apparatus ID via transmission/reception unit 207 and the Internet 5 (step S124).

Next, control unit 202 judges whether the reception of apparatus IDs and system apparatus keys $Skdi^{(1)}$ is completed (step S125), and if judged to be not completed (step S125=No), control unit 202 returns to step S122 and repeats the processing.

On the other hand, if judged by control unit 202 that reception of apparatus IDs and system apparatus keys $Skdi^{(1)}$ has been completed (step S125=Yes), node key generation unit 205 generates a node key for each node (excluding leaves) in music distribution tree table 211, and writes the generated node keys into table 211, so that the node keys correspond to the nodes (step S126).

Next, public list generation unit 206 generates a music public list 221, writes the generated public list 221 into information storage unit 208 (step S127), and sends the generated public list 221 to public list server apparatus 400 (step S128). Control unit 202 selects a single node key from music distribution tree table 211 (step S129), and sends the selected node key to music contents distribution apparatus 300 (step S130).

(2) Generation of a Music Public List

Figure 24:
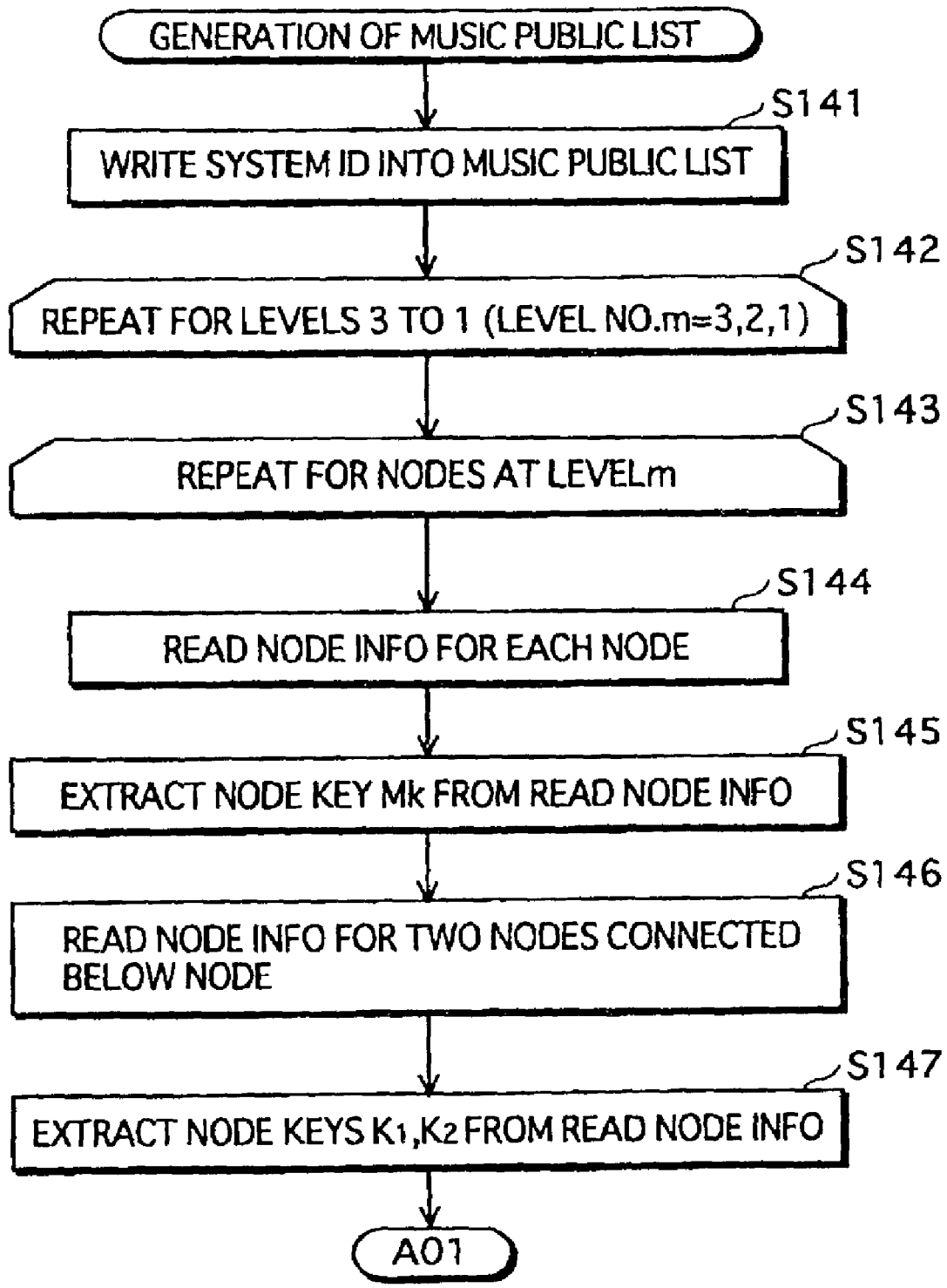
FIG. 24 is a flowchart showing operations relating to the generation of a music public list by a public list generation unit 206 (continued in FIG. 25)
Figure 25:
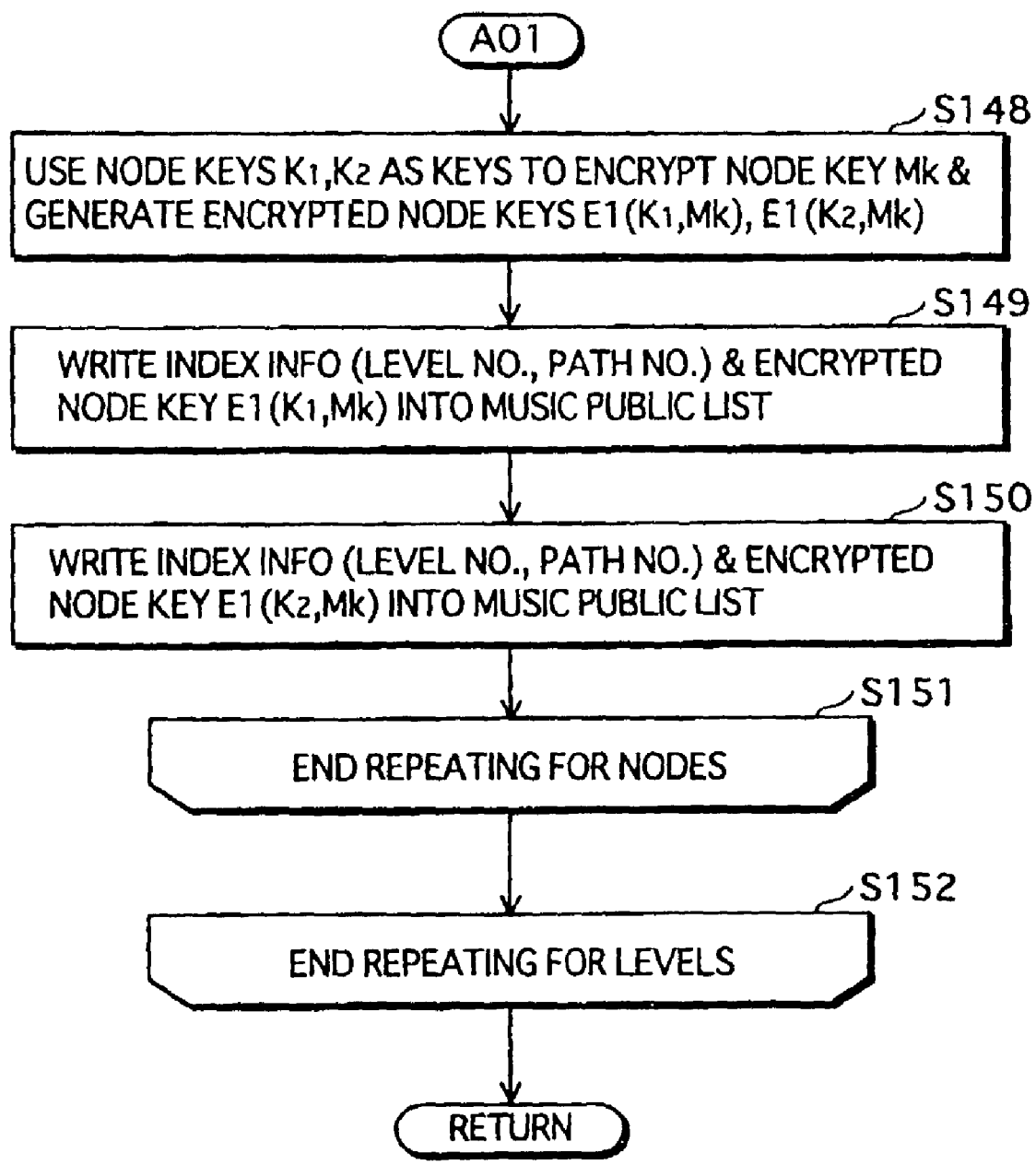
FIG. 25 is a flowchart showing the operations relating to the generation of the music public list by unit 206 (cont. from FIG. 24)

Next, the operations performed to generate a music public list will now be described using the flowchart shown in FIGS. 24 and 25. The generation of a music public list is a detailed description of step S127 in the FIG. 23 flowchart.

Public list generation unit 206 writes a system ID (here, "1") into music public list 221 (step S141). In steps S142 to S152, unit 206 repeats steps S143 to S151 in order from level 3 to level 1 (level number m=3,2,1).

In steps S143 to S151, unit 206 repeats the following steps S144 to S150 in order for each node at the level shown by the level number m.

Unit 206 reads node information corresponding to a targeted node from music distribution tree table 211 (step S144), and extracts a node key Mk from the read node information (step S145). Unit 206 then reads, from table 211, the node information relating to the two subordinate nodes connected to the targeted node (step S146), and extracts node keys k1 and k2 from the read two pieces of node information (step S147). Furthermore, unit 206 generates encrypted node keys E1(k1,Mk) and E1(k2,Mk) by using the extracted node keys k1 and k2 as keys to perform an encryption algorithm E1 on the node key Mk (step S148), writes the encrypted node key E1(k1,Mk) and index information (level number, path number) corresponding to the path from the targeted node to the left-hand subordinate node into music public list 221 as public information (step S149), and writes the encrypted node key E1(k2,Mk) and index information (level number, path number) corresponding to the path from the targeted node to the right-hand subordinate node into music public list 221 as public information (step S150).

1.15 Operations Performed by Music Contents Distribution Apparatus 300

Figure 26:
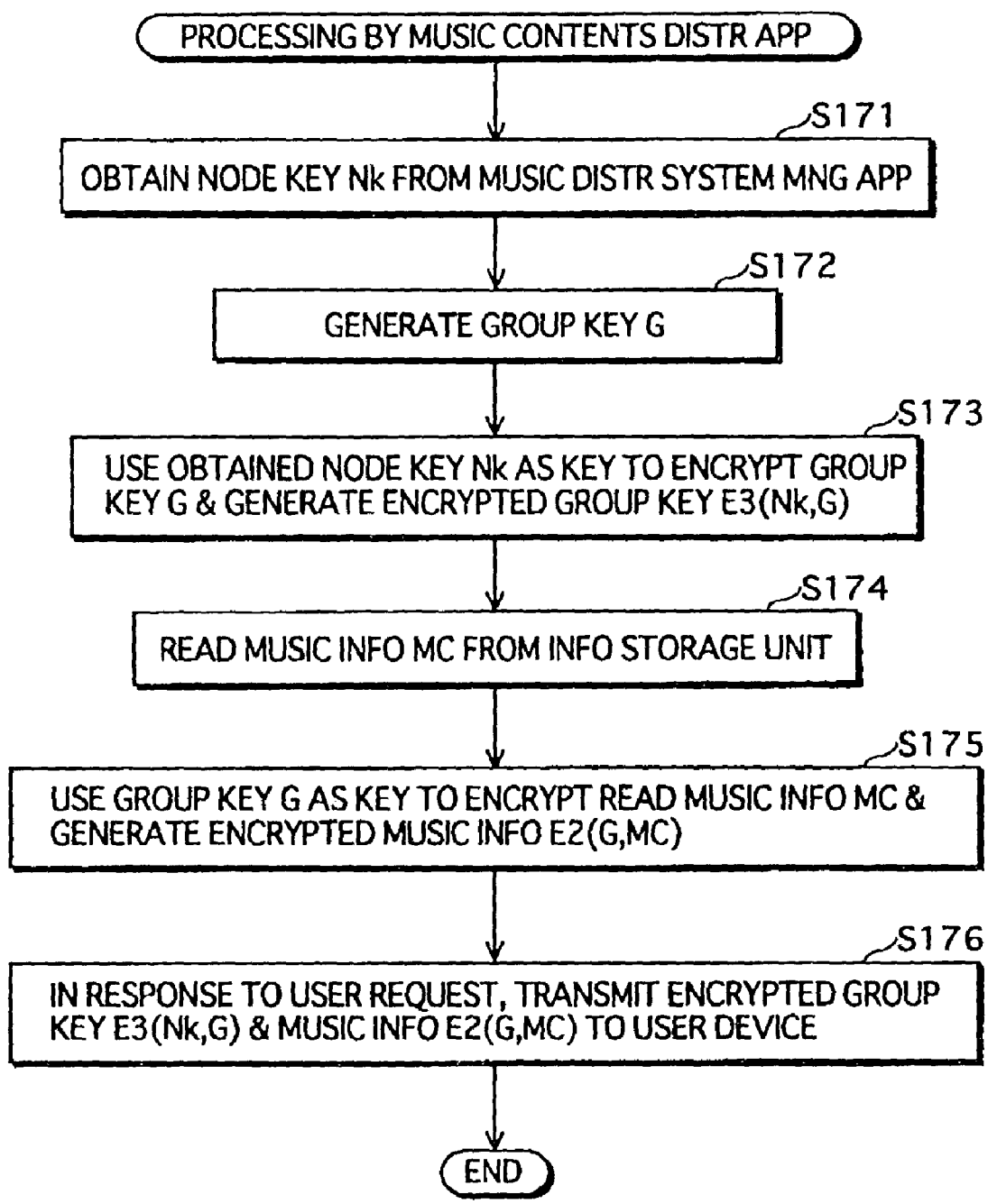
FIG. 26 is a flowchart showing operations performed by music contents distribution apparatus 300.

The operations performed by apparatus 300 will now be described using the flowchart shown in FIG. 26.

Node key obtaining unit 304 receives a node key Nk from music distribution system management apparatus 200 via a communication line, and outputs the received node key Nk to encryption unit 305 (step S171). Group key generation unit 302 then generates a random number, uses the random number to generate a group key G, and outputs the group key G to encryption units 305 and 303 (step S172). Encryption unit 305 then generates an encrypted group key E3(Nk,G) by using the received node key Nk to perform an encryption algorithm E3 on the received group key G, and outputs the encrypted group key E3(Nk,G) to transmission/reception unit 306 (step S173).

Next, encryption unit 303 reads music information MC from information storage unit 301 (step S174), receives group key G from group key generation unit 302, generates encrypted music information E2(G,MC) by using the received group key G as a key to perform an encryption algorithm E2 on the read music information, and outputs the generates encrypted music information E2(G,MC) to transmission/reception unit 306 (step S175).

Next, transmission/reception unit 306 receives the encrypted group key E3(Nk,G) and the encrypted music information E2(G,MC), and sends the encrypted group key E3(Nk,G) and the encrypted music information E2(G,MC) to user apparatus 1100 in response to a user request (step S176).

1.16 Operations Performed by DVD Supply System Management Apparatus 500

Figure 27:
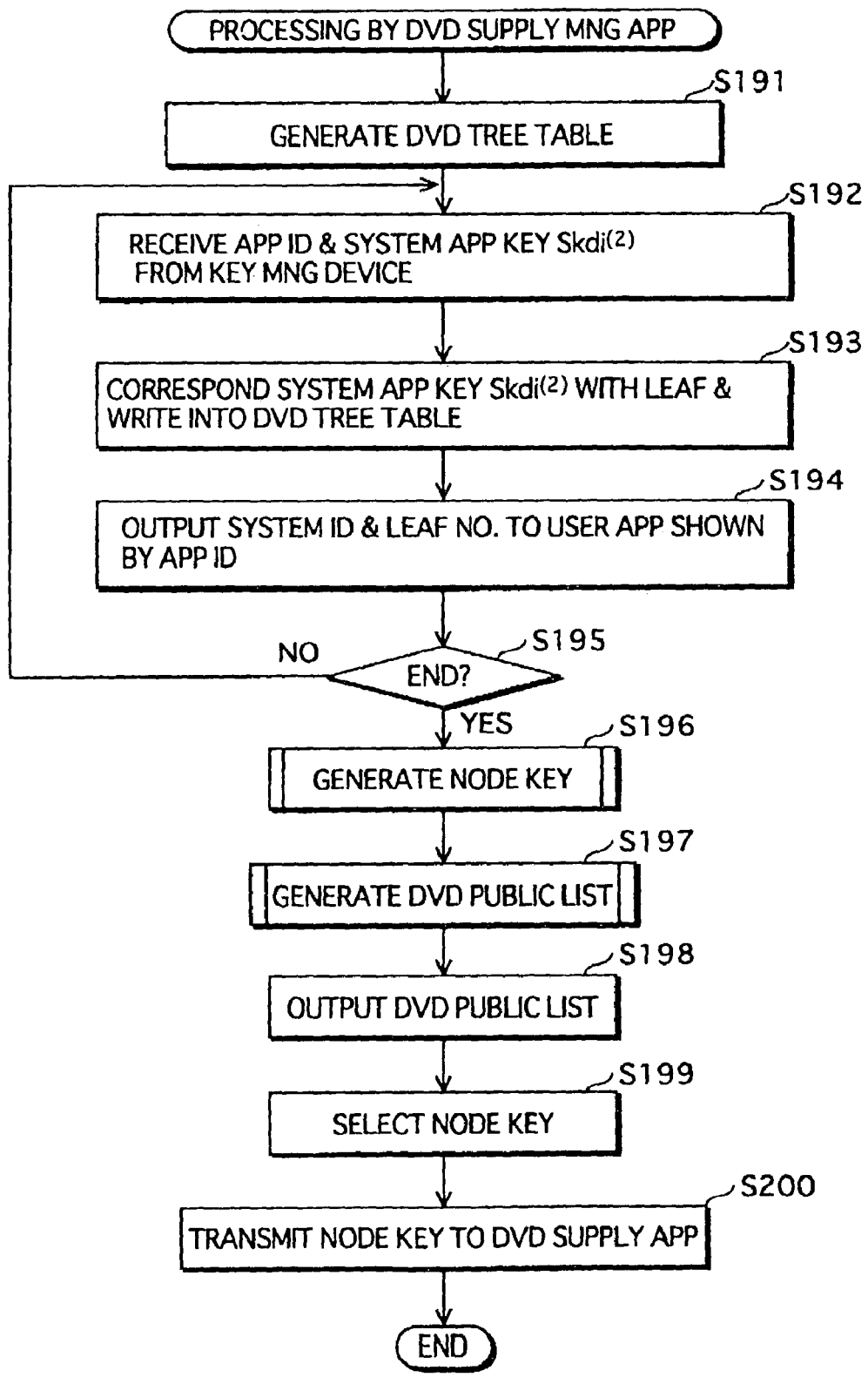
FIG. 27 is a flowchart showing the main operations preformed by DVD supply system management apparatus 500.

The operations performed by apparatus 500 will now be described using the flowchart shown in FIG. 27.

Tree construction unit 504 generates a DVD tree table 511 and writes the generated table 511 into information storage unit 508 (step S191).

Control unit 502 receives an apparatus ID and a system apparatus key Skdi$^{(2)}$ from key management apparatus 100 via transmission/reception unit 507, and outputs the received apparatus ID and system apparatus key Skdi$^{(2)}$ to tree construction unit 504 (step S192). Unit 504 then writes the apparatus ID and the system apparatus key Skdi$^{(2)}$ into DVD tree table 511, so that the system apparatus key Skdi$^{(2)}$ corresponds to a single leaf (step S193). Control unit 502 then sends the system ID (=2) and the leaf number to the user apparatus shown by the received apparatus ID via transmission/reception unit 507 and the Internet 5 (step S194).

Next, control unit 502 judges whether the receiving of apparatus IDs and system apparatus keys Skdi$^{(2)}$ is completed (step S195), and if judged to be not completed (step S195=No), the processing returns to step S192 and is repeated.

On the other hand, if judged by control unit 502 that the receiving of apparatus IDs and system apparatus keys Skdi$^{(2)}$ has been completed (step S195=Yes), node key generation unit 505 generates a node key (step S196).

Next, public list generation unit 506 generates a DVD public list 521 and writes the generated DVD public list 521 into information storage unit 508 (step S197), and sends the generated DVD public list 521 to public list supply apparatus 700 (step S198). Control unit 502 selects a single node key from DVD tree table 511 (step S199), and sends the selected node key to DVD supply apparatus 600 (step S200).

(2) Generation of a Node Key

Figure 28:
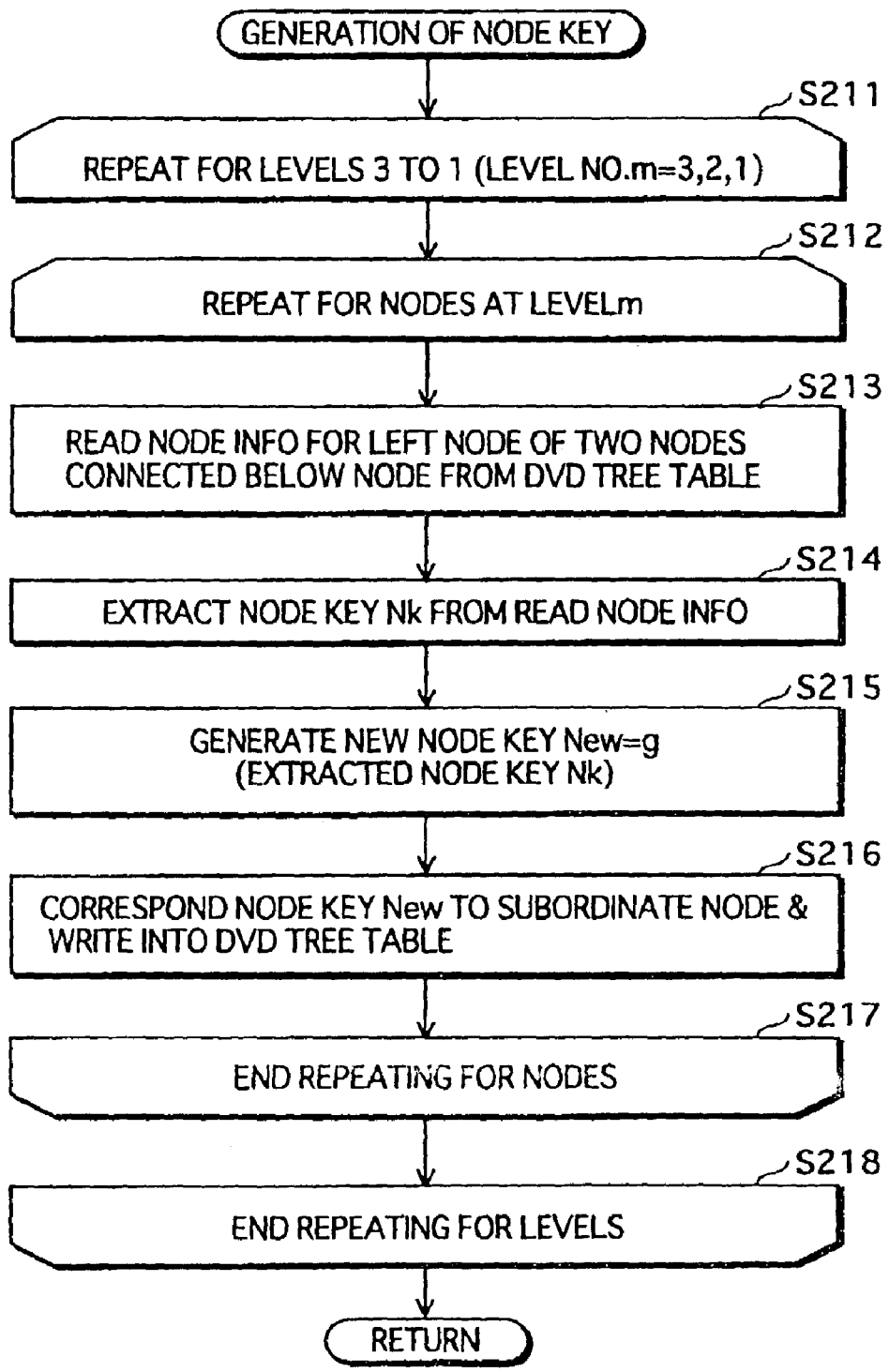
FIG. 28 is a flowchart showing operations relating to the generation of a node key by a node key generation unit 505.

Next, the processing performed by node key generation unit 505 to generate a node key will be described using the flowchart shown in FIG. 28. The generation of a node key is a detailed description of step S196 in the FIG. 27 flowchart.

In steps S211 to S218, node key generation unit 505 repeats steps S212 to S217 in order from level 3 to level 1 (level number m=3,2,1).

In steps S212 to S217, unit 505 repeats the following steps S213 to S216 in order for each node at the level shown by the level number m.

Unit 505 reads, from DVD tree table 511, node information relating to the left-hand subordinate node connected to a targeted node (step S213).

Next, unit 505 extracts a node key from the read node information as a node key Nk (step S214), generates a new node key New=g(node key Nk) by performing a one-way function g on the extracted node key Nk (step S215), and writes the generated node key New into DVD tree table 511, so that node key New corresponds to the left-hand subordinate node (step S216).

(3) Generation of a DVD Public List

Figure 29:
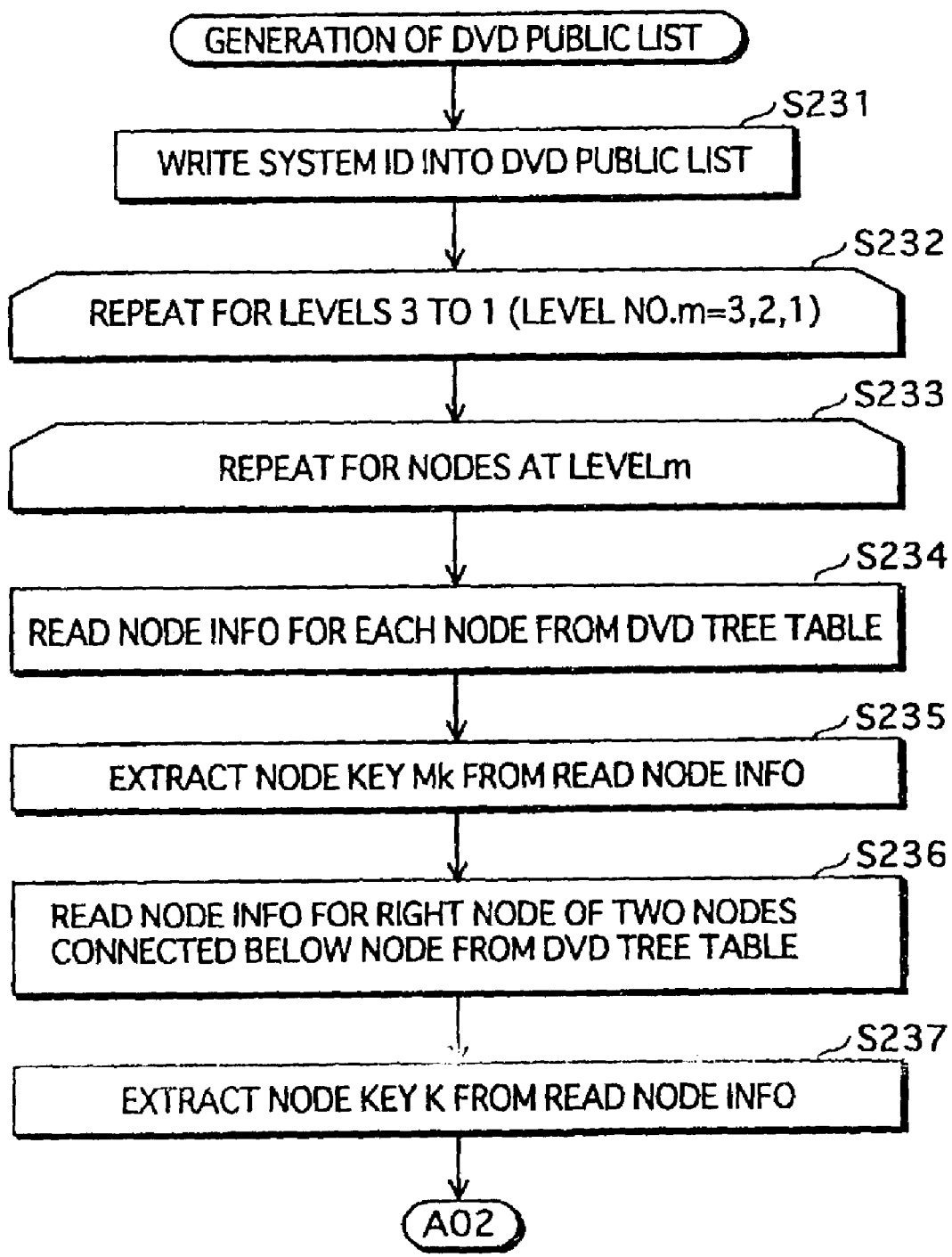
FIG. 29 is a flowchart showing operations relating to the generation of a DVD public list by a public list generation unit 506 (cont.
Figure 30:
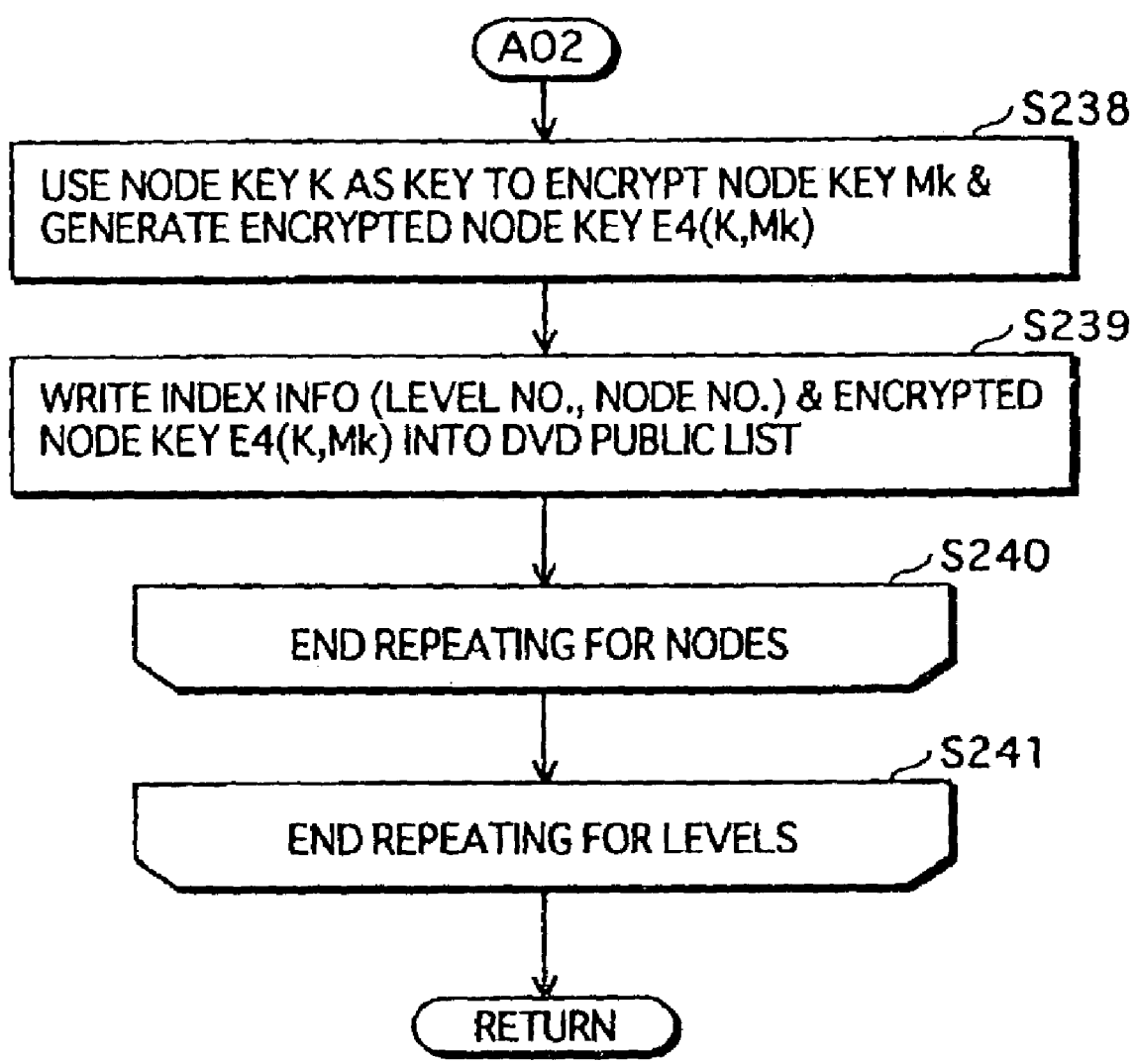
in FIG. 30)

Next, the processing performed by public list generation unit 506 to generate a DVD public list will be described using the flowchart shown in FIGS. 29 and 30. The generation of a DVD public list is a detailed description of step S197 in the FIG. 27 flowchart.

Public list generation unit 506 writes a system ID (here, "2") into DVD public list 521 (step S231). In steps S232 to S241, unit 506 repeats steps S233 to S240 in order from level 3 to level 1 (level number m=3,2,1).

In steps S233 to S240, unit 506 repeats the following steps S234 to S239 in order for each node at the level shown by the level number m.

Unit 506 reads node information corresponding to a targeted node from DVD tree table 511 (step S234), and extracts a node key Mk from the read node information (step S235). Next, unit 506 reads, from table 511, node information relating to the right-hand subordinate node connected to the targeted node (step S236), and extracts a node key k from the read node information (step S237). Furthermore, unit 506 generates an encrypted node key E4(k,Mk) by using the extracted node key k to as a key to perform an encryption algorithm E4 on the node key Mk (step S238), and writes the encrypted node key E4(k,Mk) and index information (level number, node number) corresponding to the targeted node into DVD public list 521 as public information (step S239).

1.17 Operations Preformed by Movie Broadcast System Management Apparatus 860

Figure 31:
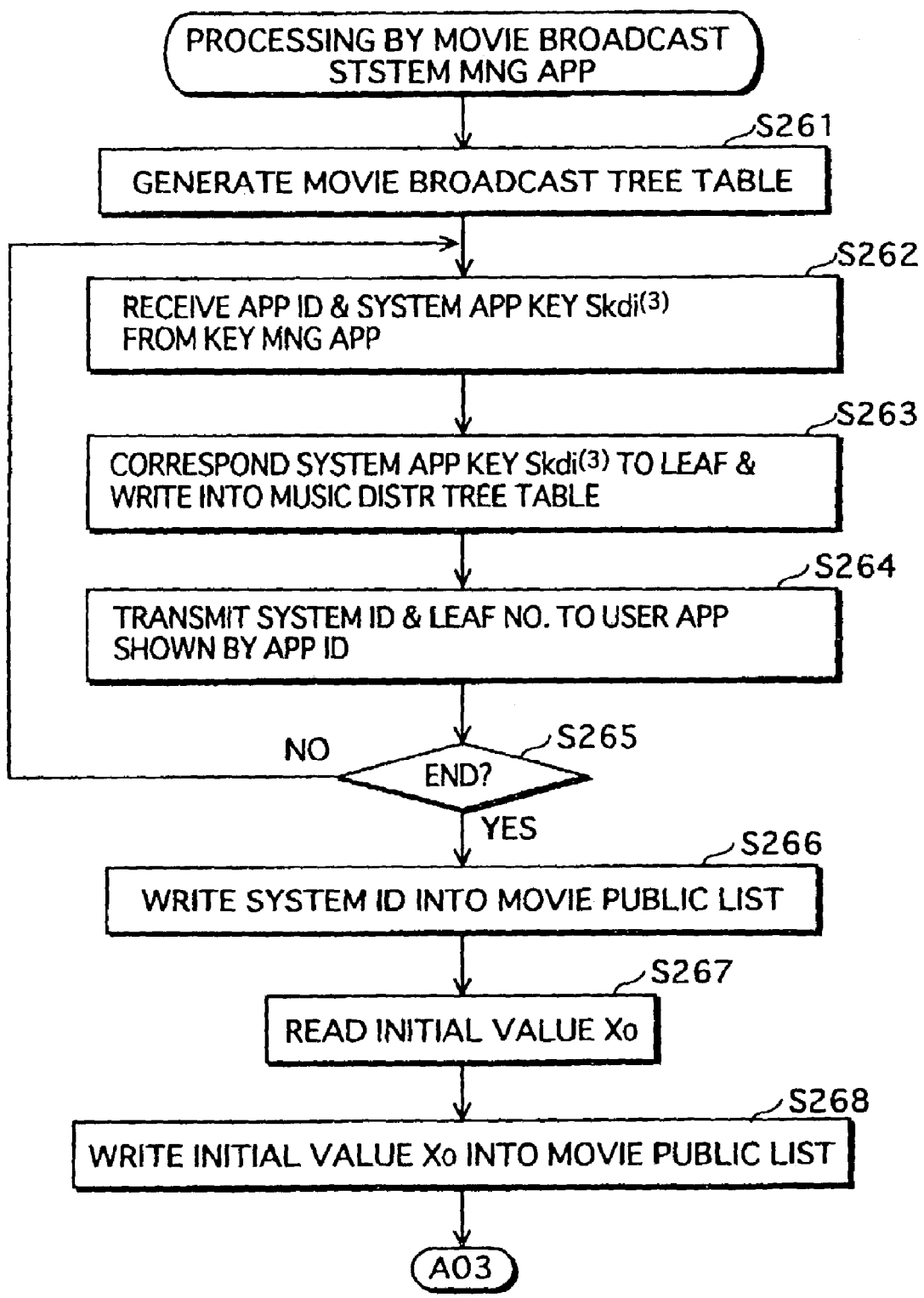
FIG. 31 is a flowchart showing operations performed by movie broadcast system management apparatus 800 (cont.
Figure 32:
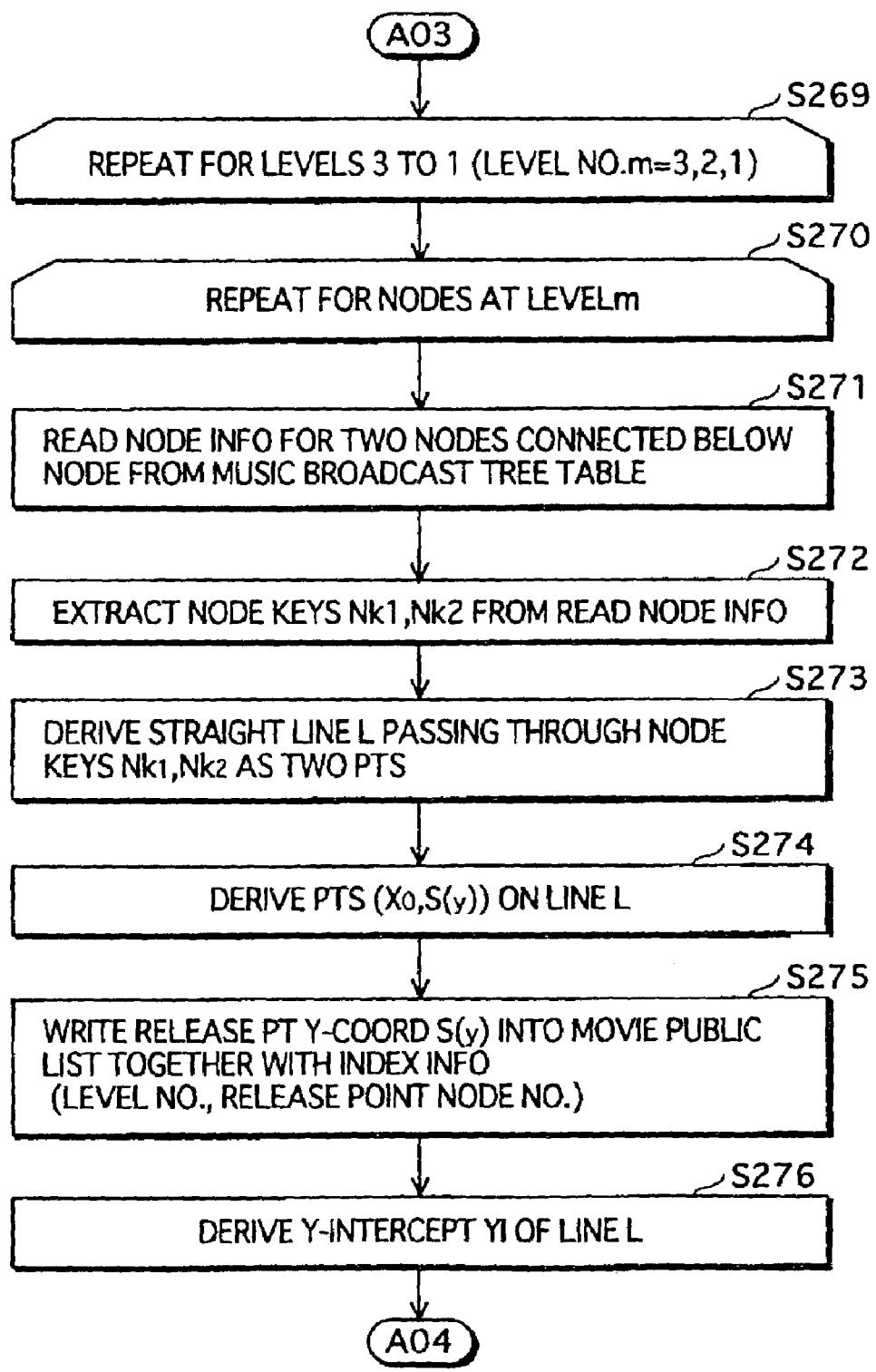
in FIG. 32)
Figure 33:
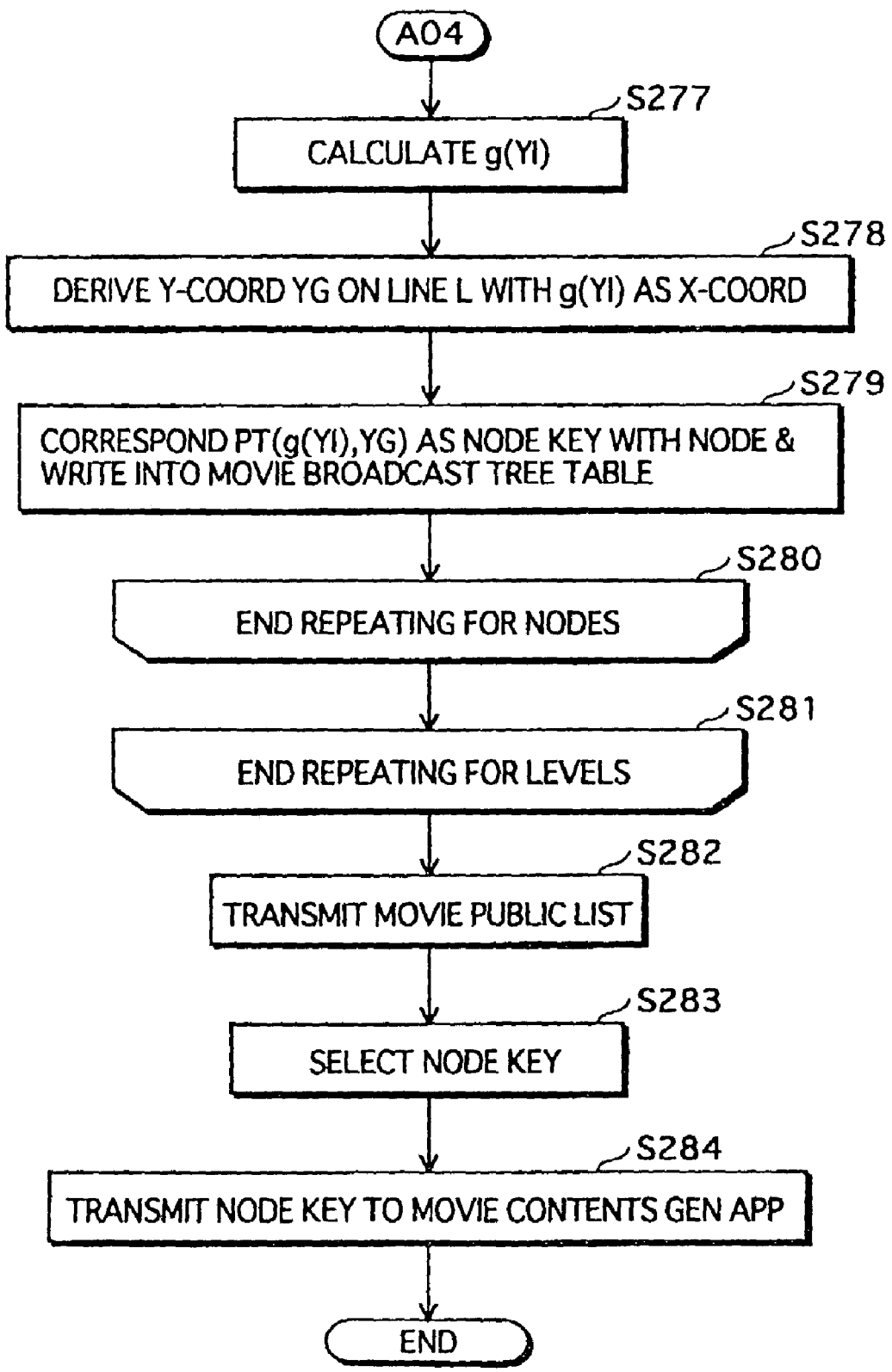
in FIG. 33)

The operations performed by movie broadcast system management apparatus 800 will now be described using the flowchart shown in FIGS. 31 to 33.

Tree construction unit 804 generates a movie broadcast tree table 811 and writes the generated table 811 into information storage unit 808 (step S261).

Next, control unit 802 receives an apparatus ID and a system apparatus key Skdi$^{(3)}$ from key management apparatus 100 via transmission/reception unit 807, and outputs the received apparatus ID and system apparatus key Skdi$^{(3)}$ to tree construction unit 804 (step S262). Unit 804 then writes the apparatus ID and the system apparatus key Skdi$^{(3)}$ into movie broadcast tree table 811, so that the system apparatus key Skdi$^{(3)}$ corresponds to a single leaf (step S263). Control unit 802 then sends the system ID (=3) and the leaf number to the user apparatus shown by the received apparatus ID via transmission/reception unit 807 and the Internet 5 (step S264).

Next, control unit 802 judges whether the receiving of apparatus IDs and system apparatus keys Skdi$^{(3)}$ is completed (step S265), and it judged to be not completed (step S265=No), control unit 802 returns to step S262 and repeats the processing.

On the other hand, if judged by control unit 802 that the receiving of apparatus IDs and system apparatus keys Skdi$^{(3)}$ has been completed (step S265=Yes), public list generation unit 806 writes the system ID (here, "3") into movie public list 821 (step S266), reads an initial value $x_0$ from information storage unit 808 (step S267), and writes the read initial value $x_0$ into movie public list 821 (step S268).

Next, in steps S269 to S281, public list generation unit 806 repeats steps S270 to S280 in order from level 3 to level 1 (level number m=3,2,1).

In steps S270 to S280, unit 806 repeats the following steps S271 to S279 in order for each node at the level shown by the level number m.

Unit 806 reads, from table movie broadcast tree table 811, node information relating to the two subordinate nodes connected to a targeted node (step S271), and extracts node keys Nk1 and Nk2 from the read two pieces of node information (step S272). Next, unit 806 considers the two node keys Nk1 and Nk2 as two points, derives a straight line L passing through the two points (step S273), derives a point($x_0, s_{(y)}$) on the straight line L (step S274), and writes a release point y-coordinate $s_{(y)}$ into movie public list 821 (step S275). Next, unit 806 derives a y-intercept YI of the straight line L (step S276), calculates g(YI) using a one-way function g (step S277), derives a y-coordinate YG of a point on the straight line L having an x-coordinate g(YI) (step S278), sets the derived point(g(YI),YG) as a node key, and writes the node key into movie broadcast tree table 811, so that the node key corresponds to the targeted node (step S279).

When the processing in steps S269 to S281 has been repeated for each of the levels, control unit 802 sends the generated movie public list 821 to transmission apparatus 1000 via transmission/reception unit 807, and transmission apparatus 1000 broadcasts movie public list 821 over radio waves via broadcast satellite 6 (step S282).

Control unit 202 selects a single node key from movie broadcast tree table 811 (step S283), and transmits the selected node key to movie contents supply apparatus 900 (step S284).

1.18 Operations Preformed by User Apparatus 1100

(1) Main Operations Preformed by User Apparatus 1100

Figure 34:
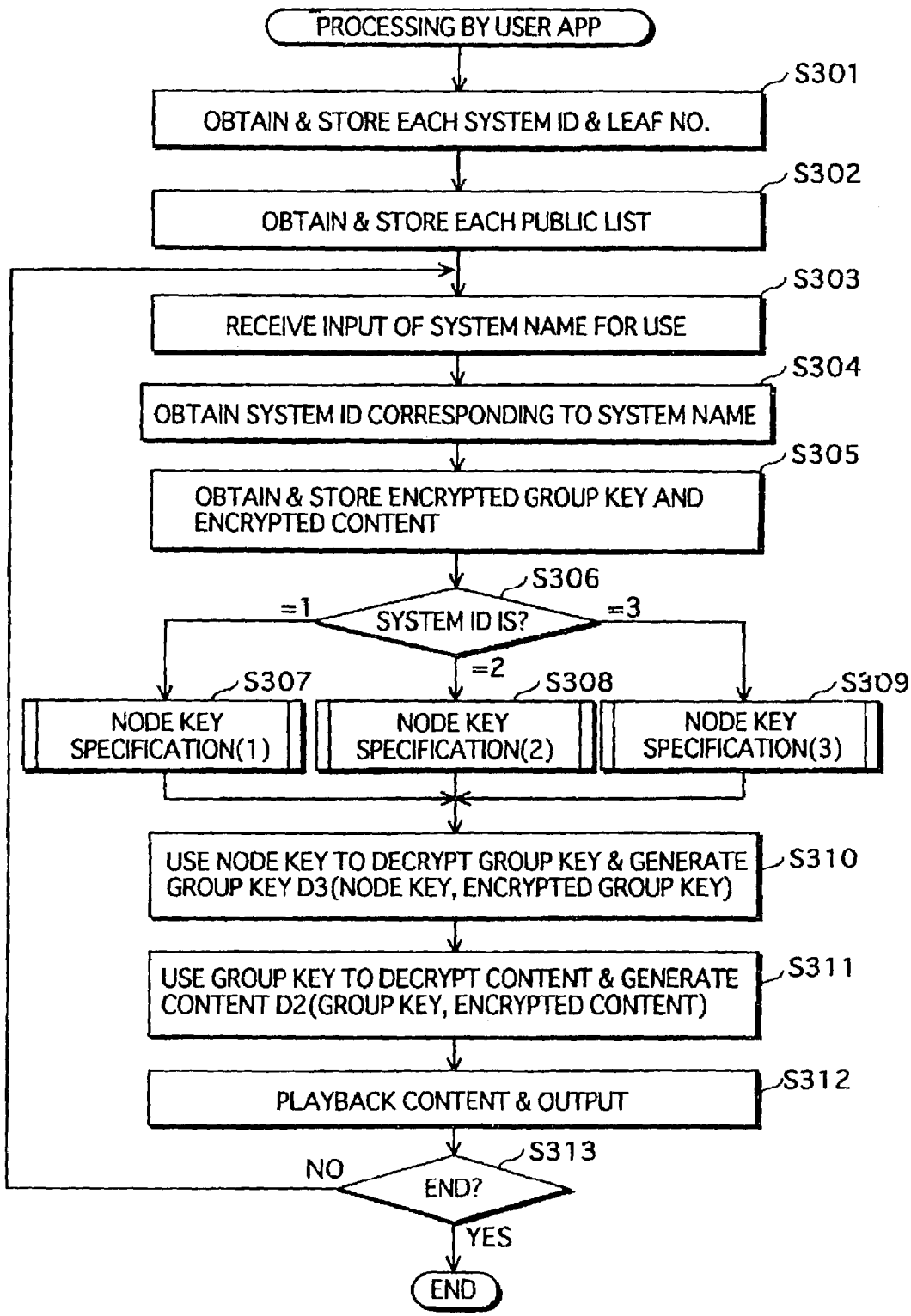
FIG. 34 is a flowchart showing the main operations performed by user apparatus 1100.

The main operations performed by user apparatus 1100 will now be described using the flowchart shown in FIG. 34.

Information extraction unit 1108 receives a system ID and a leaf number from music distribution system management apparatus 200 via the Internet 5 and transmission/reception unit 1110, and writes the received system ID and leaf number into system ID table 1151, so that the system ID and the leaf number correspond to a system name "music distribution system". Also, unit 1108 receives a system ID and a leaf number from DVD supply system management apparatus 500 via the Internet 5 and transmission/reception unit 1110, and writes the received system ID and leaf number into system ID table 1151, so that the system ID and the leaf number correspond to a system name "DVD supply system". Furthermore, unit 1108 receives a system ID and a leaf number from movie broadcast system management apparatus 800 via transmission apparatus 1000, transmission antenna 10, broadcast satellite 6, reception antenna 9 and tuner unit 1112, and writes the received system ID and leaf number into system ID table 1151, so that the system ID and the leaf number correspond to a system name "movie broadcast system" (step S301).

Next, unit 1108 receives a music public list from public list server apparatus 400 via the Internet 5 and transmission/reception unit 1110, and writes the received music public list into information storage unit 1101 as a music public list 1161. Also, when a DVD, having a DVD public list recorded thereon by a user, is mounted in user apparatus 1100, unit 1108 reads the DVD public list from the mounted DVD, and writes the read DVD public list into information storage unit 1101 as a DVD public list 1162. Furthermore, unit 1108 receives a movie public list from movie broadcast system management apparatus 800 via transmission apparatus 1000, transmission antenna 10, broadcast satellite 6, reception antenna 9 and tuner unit 1112, and writes the received movie public list into information storage unit 1101 as a movie public list 1163 (step S302).

Next, control unit 1105 receives, from a user via input unit 1106, input of a system name for use (step S303), and obtains a system ID corresponding to the received system name from system ID table 1151 in information storage unit 1101 (step S304).

Next, information extraction unit 1108 receives an encrypted group key and an encrypted content from music contents distribution apparatus 300 via the Internet 5 and transmission/reception unit 1110, and writes the encrypted group key and the encrypted content into information storage unit 1101 as an encrypted group key 1171 and an encrypted content 1181. Also, when a DVD, having an encrypted group key and an encrypted content recorded thereon by a user, is mounted in user apparatus 1100, unit 1108 reads the encrypted group key and the encrypted content from the mounted DVD via DVD connection unit 1111, and writes the encrypted group key and the encrypted content into information storage unit 1101 as an encrypted group key 1171 and an encrypted content 1181. Furthermore, unit 1108 receives an encrypted group key and an encrypted content from movie contents supply apparatus 900 via transmission apparatus 1000, transmission antenna 10, broadcast satellite 6, reception antenna 9 and tuner unit 1112, and writes the encrypted group key and the encrypted content into information storage unit 1101 as an encrypted group key 1171 and an encrypted content 1181 (step S305).

Next, control unit 1105 judges whether the obtained system ID is one of "1", "2" or "3" (step S306). If judged that the system ID is "1" (step S306=1), node key specifying unit 1103 conducts processing related to node key specification (1) (step S307). If judged that the system ID is "2" (step S306=2), unit 1103 conducts processing related to node key specification (2) (step S308). And if judged that the system ID is "3" (step S306=3), unit 1103 conducts processing related to node key specification (3) (step S309).

When the specifying of node keys by node key specifying unit 1103 is completed, decryption unit 1104 reads an encrypted group key from information storage unit 1101, and generates a group key D3 (node key, encrypted group key) by decrypting the encrypted group key using a specified node key as a key (step S310).

Next, decryption unit 1109 reads an encrypted content from information storage unit 1101, and generates a content=D2(group key, encrypted content) by decrypting the encrypted content using the generated group key as a key (step S311).

Next, playback unit 1113 plays back and outputs the generated content (step S312).

Next, control unit 1105 judges whether the obtaining, decrypting and playing of contents is completed (step S313), and if judged to be not completed (step S313=No), control unit 1105 returns to step S303 and repeats the processing. On the other hand, if judged to be completed (step S313=Yes), unit 1105 ends the decrypting and playing back of content by user apparatus 1100.

(2) Node key Specification (1) Processing

Figure 35:
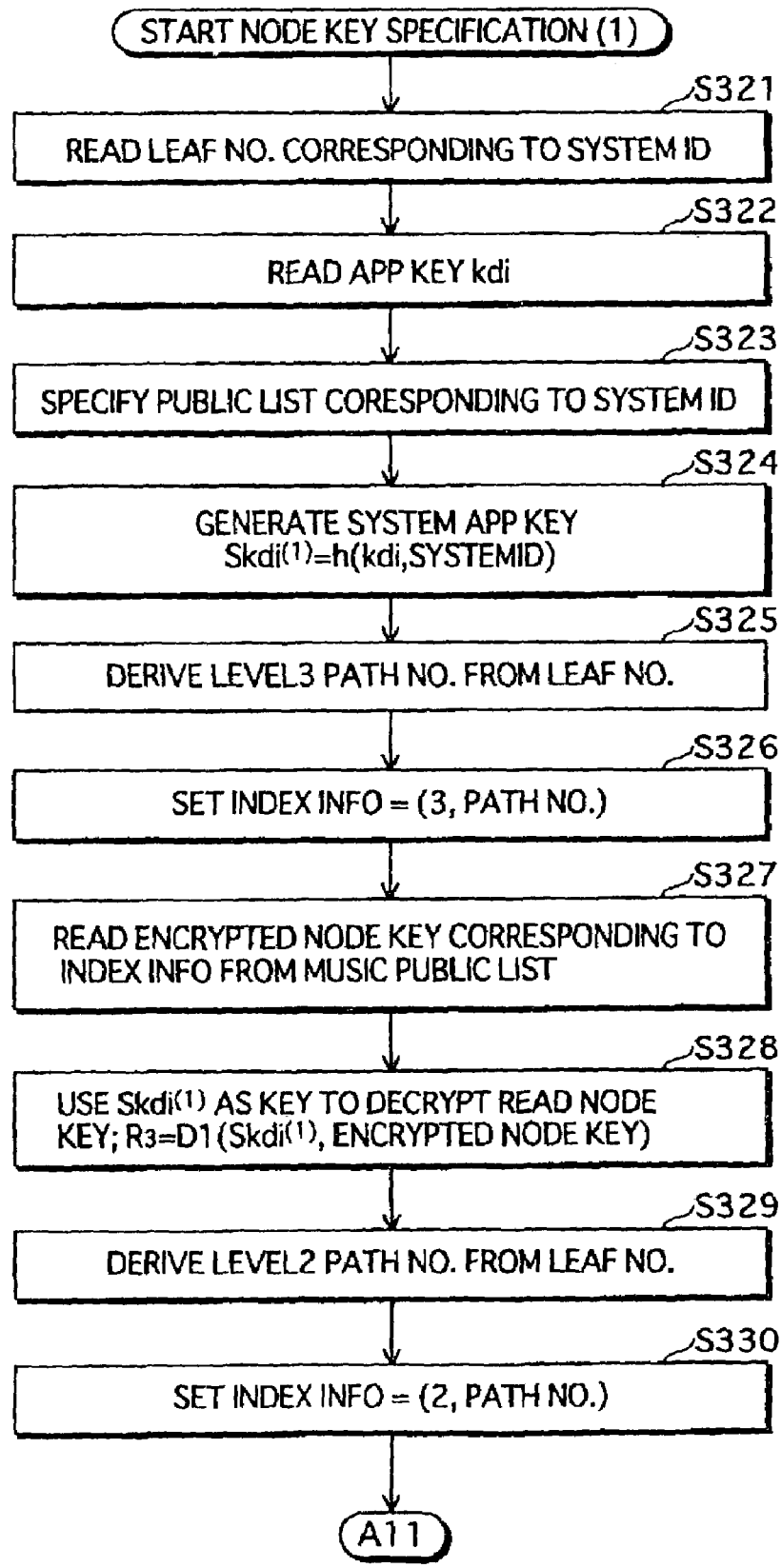
FIG. 35 is a flowchart showing operations relating to a node key specification (1) by a node key specifying unit 1103 (cont.
Figure 36:
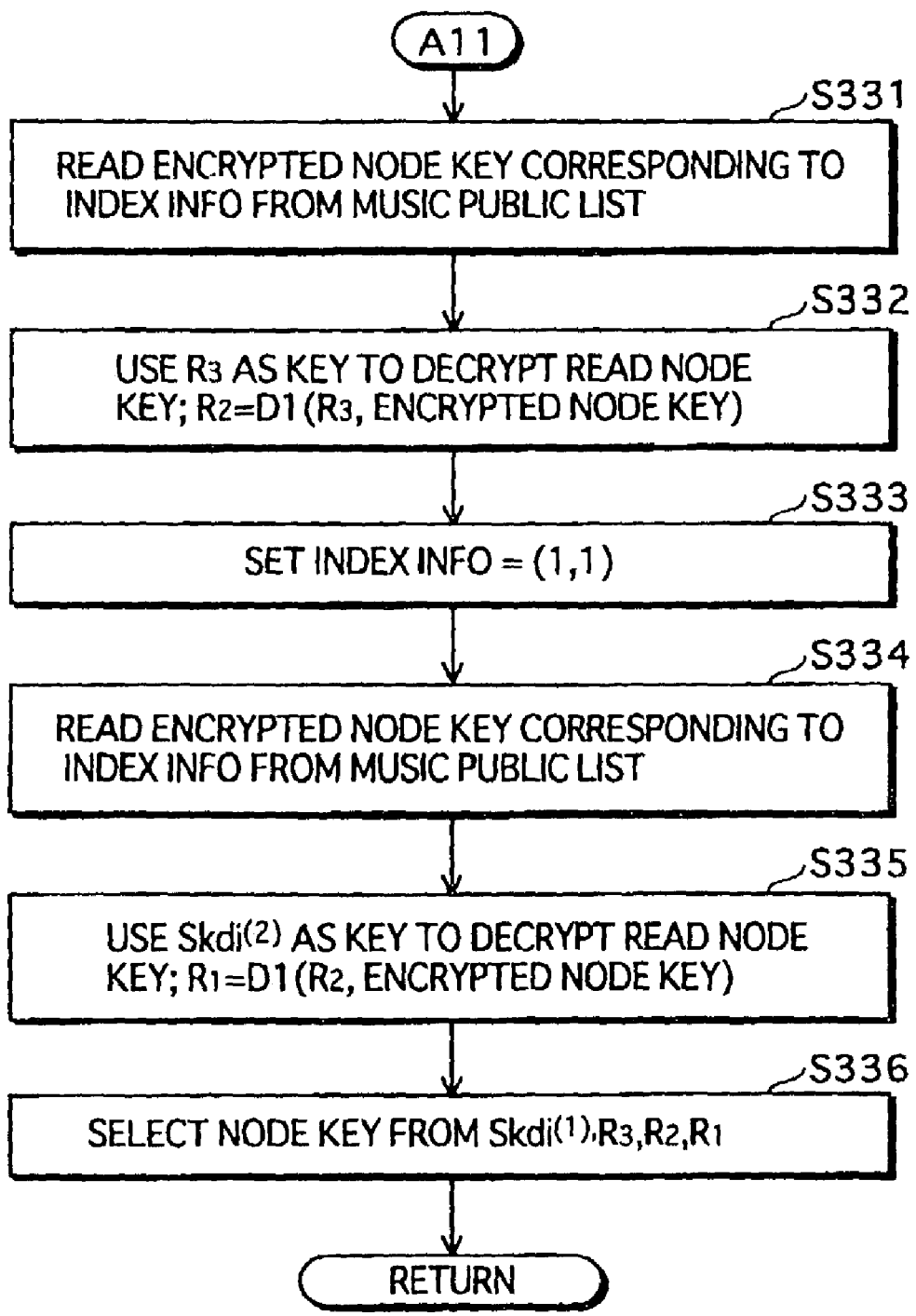
in FIG. 36)
Figure 37:
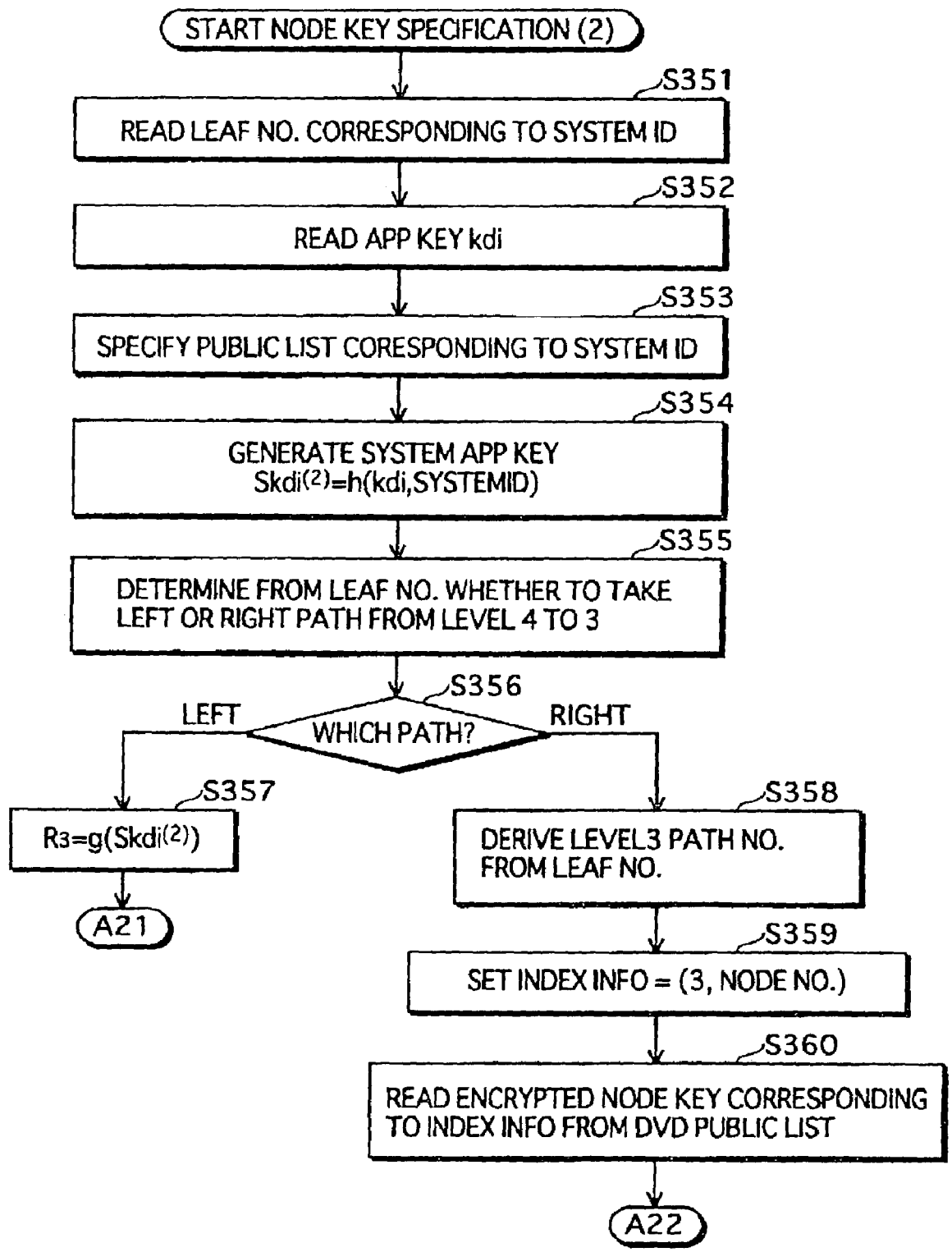
FIG. 37 is a flowchart showing operations relating to a node key specification (2) by node key specifying unit 1103 (cont.
Figure 38:
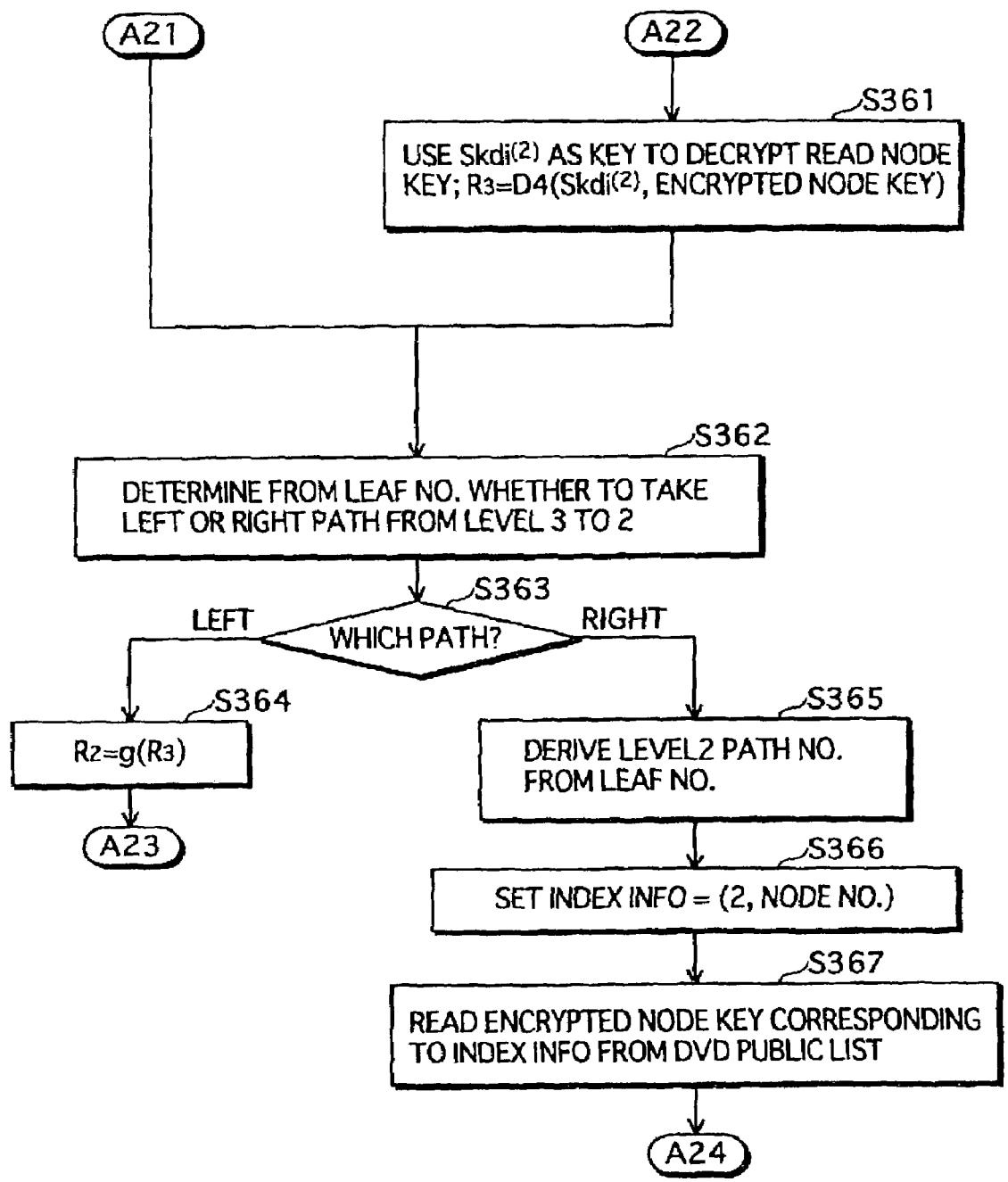
in FIG. 38)
Figure 39:
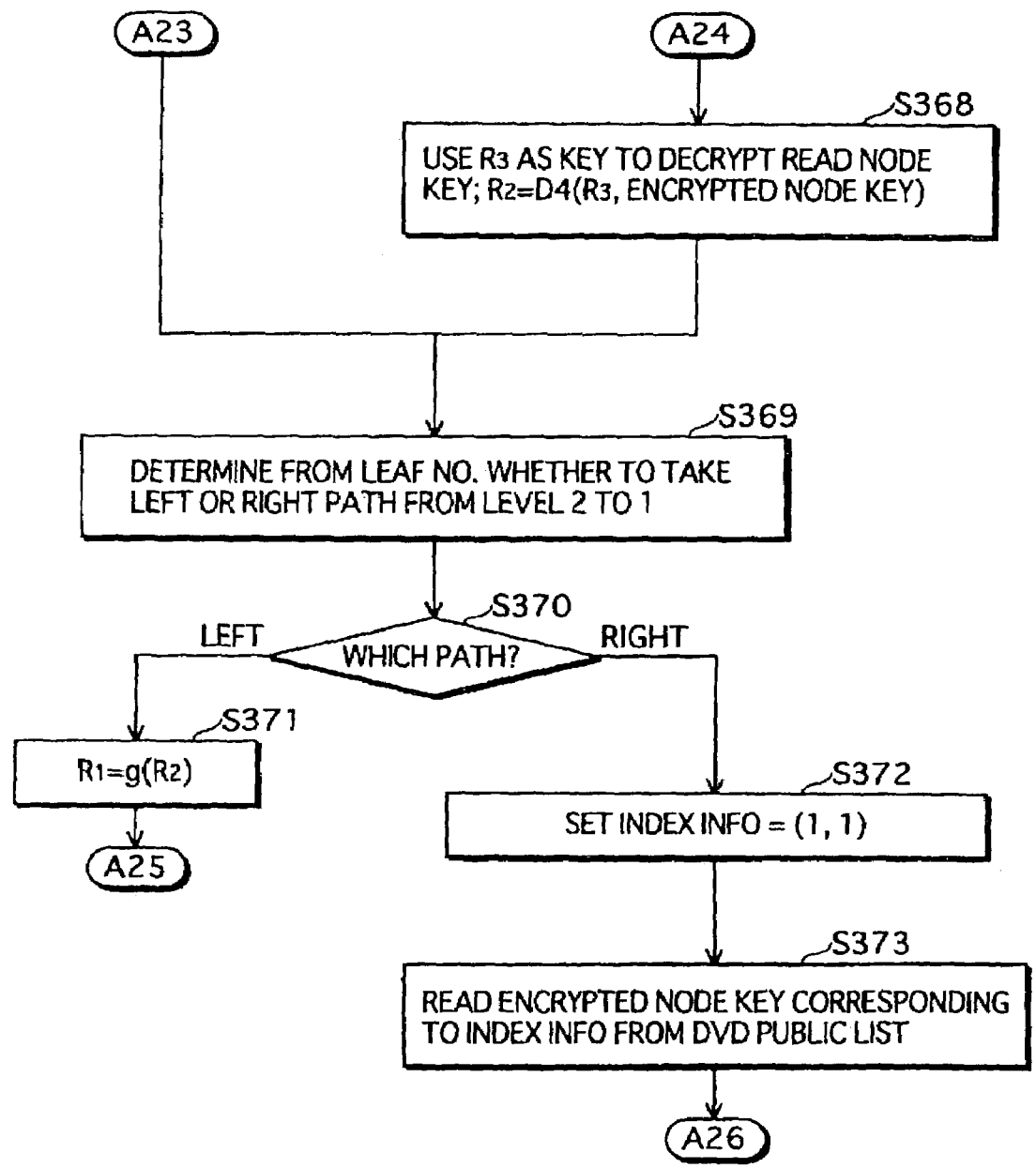
in FIG. 39)
Figure 40:
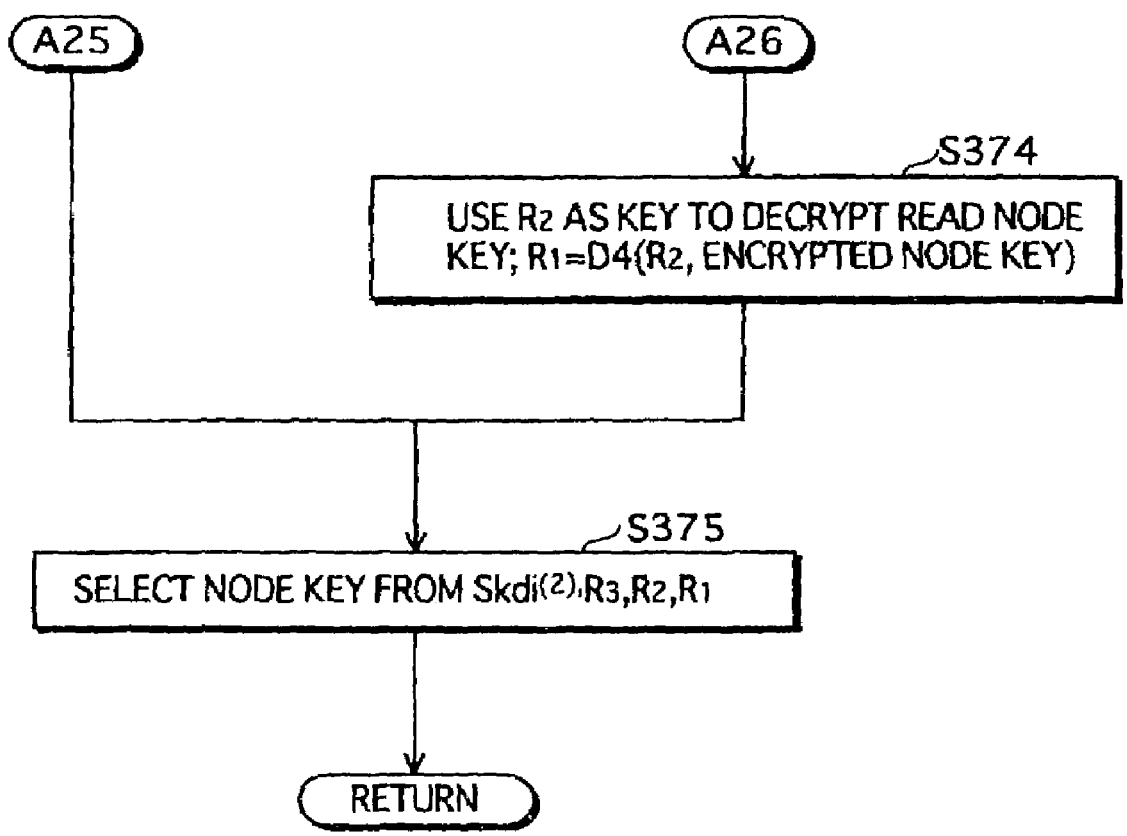
in FIG. 40)

Node key specification (1) processing performed by node key specifying unit 1103 will now be described using the flowchart shown in FIGS. 35 to 36. The following is a detailed description of the processing conducted in step S307 of the FIG. 34 flowchart.

Node key specifying unit 1103 reads a leaf number corresponding to a system ID from system ID table 1151 in information storage unit 1101 (step S321), reads an apparatus key kdi from apparatus key storage unit 1102 (step S322), and specifies a public list corresponding to the system ID. Here, since the system ID is "1", music public list 1161 is specified (step S323).

Next, unit 1103 generates a system apparatus key $Skdi^{(1)} = h(kdi, \text{system ID})$ (step S324), derives a path number at level 3 from the leaf number (step S325), sets the index information=(3, path number) (step S326), and reads an encrypted node key corresponding to the set index information from music public list 1161 (step S327). Unit 1103 then decrypts the encrypted node key using the system apparatus key $Skdi^{(1)}$ as a key. $R_3=D1(Skdi^{(1)}, \text{encrypted node key})$ (step S328).

Next, unit 1103 derives a path number at level 2 from the leaf number (step S329), sets the index information=(2, path number) (step S330), reads an encrypted node key corresponding to the set index information from music public list 1161 (step S331), and decrypts the encrypted node key using $R_3$ as a key. $R_2=D1(R_3, \text{encrypted node key})$ (step S332).

Next, unit 1103 sets the index information=(1,1) (step S333), reads an encrypted node key corresponding to the set index information from music public list 1161 (step S334), and decrypts the encrypted node key using $R_2$ as a key. $R_1=D1(R_2, \text{encrypted node key})$ (step S335).

Next, unit 1103 selects a node key from among $Skdi^{(1)}$, $R_3$, $R_2$ and $R_1$ (step S336).

(3) Node Key Specification (2) Processing

Node key specification (2) processing performed by node key specifying unit 1103 will now be described using the flowchart shown in FIGS. 37 to 40. The following is a detailed description of the processing conducted in step S308 of the FIG. 34 flowchart.

Node key specifying unit 1103 reads a leaf number corresponding to a system ID from system ID table 1151 in information storage unit 1101 (step S351), reads an apparatus key kdi from apparatus key storage unit 1102 (step S352), and specifies a public list corresponding to the system ID. Here, since the system ID is "2", music public list 1162 is specified (step S353).

Next, unit 1103 generates a system apparatus key $Skdi^{(2)} = h(kdi, \text{System ID})$ (step S354).

Next, unit 1103 determines, based on the leaf number, whether to take the left path or the right path from level 4 to level 3 of tree T200 (step S355), and if the left path is taken (step S356=Left), unit 1103 derives $g(Skdi^{(2)})$. On the other hand, if the right path is taken (step S356=Right), unit 1103 derives a node number at level 3 from the leaf number, sets the index information=(3, node number) (step S359), reads an encrypted node key corresponding to the set index information from DVD public list 1162 (step S360), and decrypts the encrypted node key using $Skdi^{(2)}$ as a key. $R_3=D4(Skdi^{(2)}, \text{encrypted node key})$ (step S361).

Next, unit 1103 determines, based on the leaf number, whether to take the left path or the right path from level 3 to level 2 of tree T200 (step S362).

If the left path is taken (step S363=Left), unit 1103 derives $R_2=g(R_3)$ (step S364). On the other hand, if the right path is taken (step S363=Right), unit 1103 derives a node number at level 2 from the leaf number (step S365), sets the index information=(2, node number) (step S366), reads an encrypted node key corresponding to the set index information from DVD public list 1162 (step S367), and decrypts the encrypted node key using $R_3$ as a key. $R_2=D4(R_3, \text{encrypted node key})$ (step S368).

Next, unit 1103 determines, based on the leaf number, whether to take the left path or the right path from level 2 to level 1 of tree T200 (step S369).

If the left path is taken (step S370=Left), unit 1103 derives $R_1=g(R_2)$ (step S371). On the other hand, if the right path is taken (step S370=Right), unit 1103 sets the index information=(1,1) (step S372), reads an encrypted node key corresponding to the set index information from DVD public list 1162 (step S373), and decrypts the encrypted node key using $R_2$ as a key. $R_1=D4(R_2, \text{encrypted node key})$ (step S374).

Next, unit 1103 selects a single node key from among $Skdi^{(2)}$, $R_3$, $R_2$ and $R_1$ (step S375).

(4) Node Key Specification (3) Processing

Figure 41:
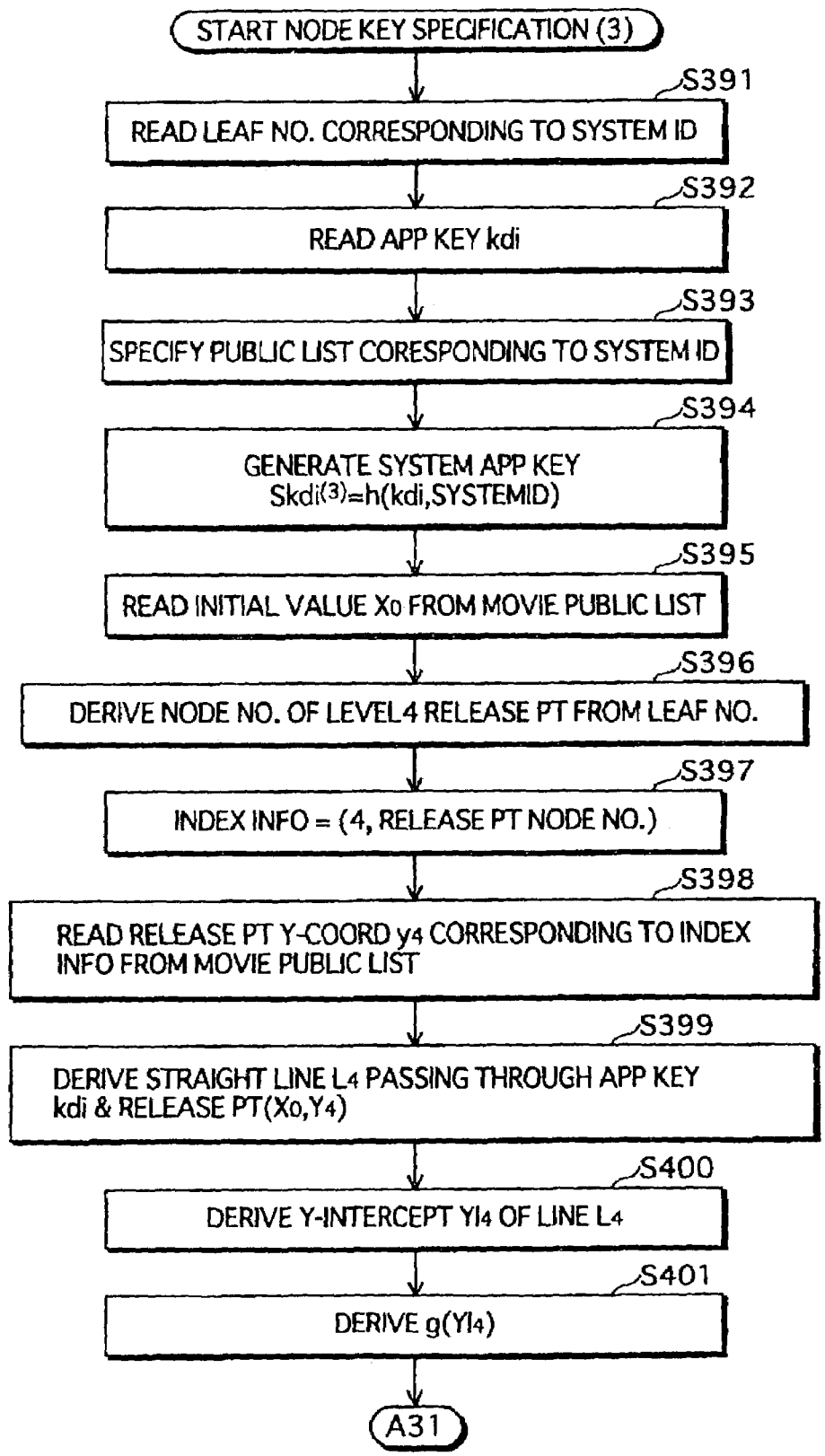
FIG. 41 is a flowchart showing operations relating to a node key specification (3) by node key specifying unit 1103 (cont.
Figure 42:
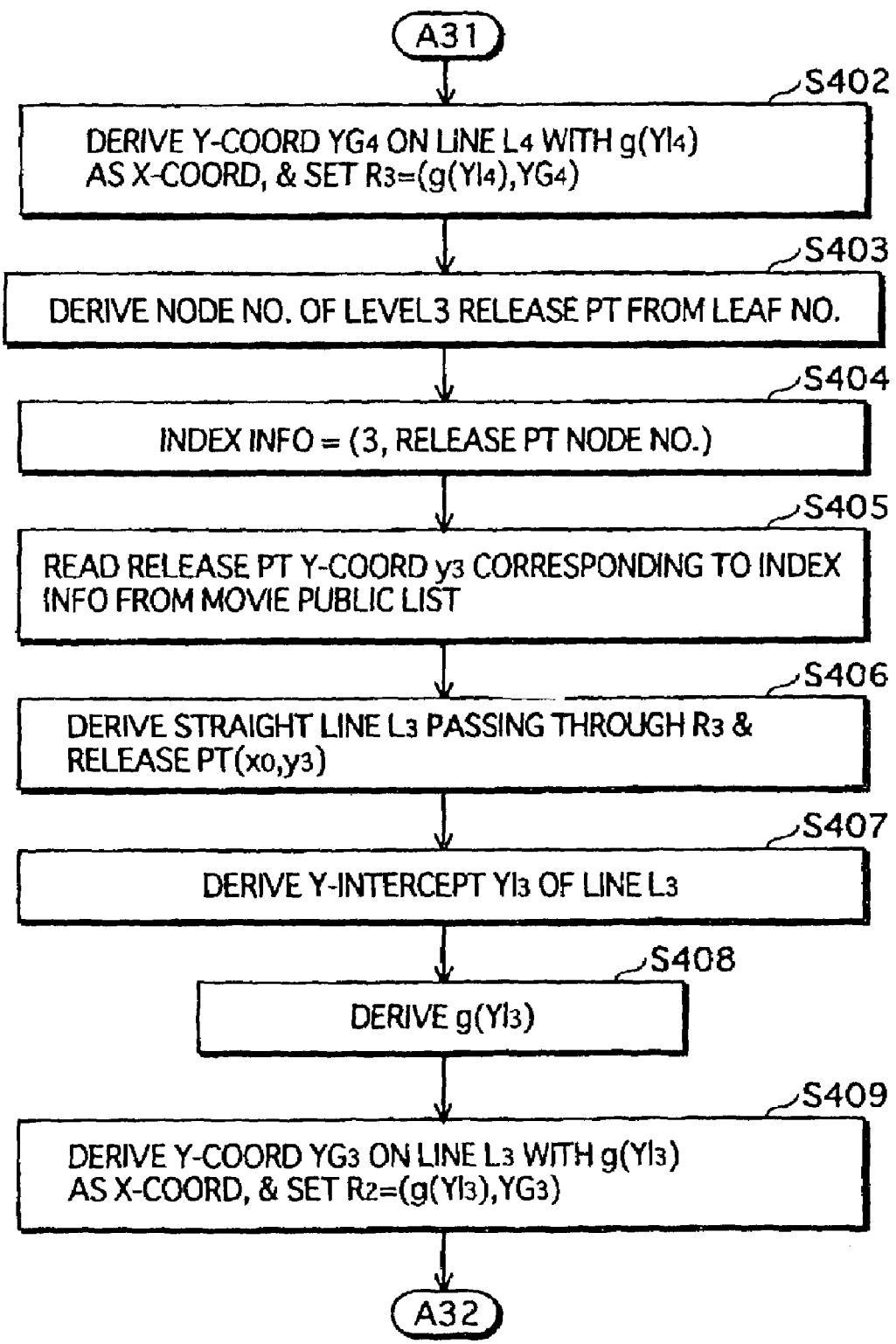
in FIG. 42)
Figure 43:
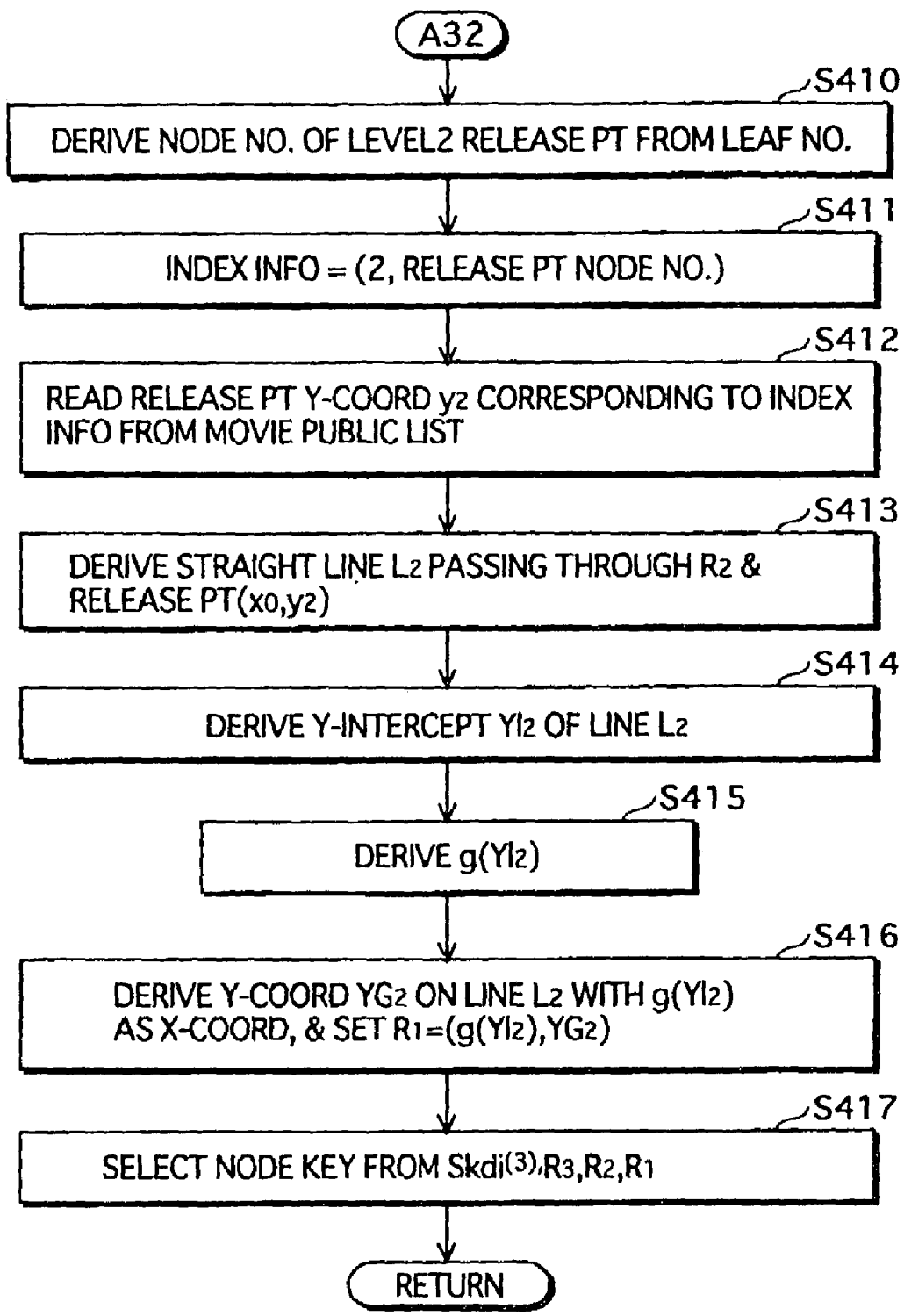
in FIG. 43)

Node key Specification (3) processing performed by node key specifying unit 1103 will now be described using the flowchart shown in FIGS. 41 to 43. The following is a detailed description of the processing conducted in step S309 of the FIG. 34 flowchart.

Node key specifying unit 1103 reads a leaf number corresponding to a system ID from system ID table 1151 in information storage unit 1101 (step S391), reads an apparatus key kdi from apparatus key storage unit 1102 (step S392), and specifies a public list corresponding to the system ID. Here, since the system ID is "3", movie public list 1163 is specified (step S393).

Next, unit 1103 generates a system apparatus key $Skdi^{(3)}$ =h(kdi, System ID) (step S394), and reads an initial value $x_0$ from movie public list 1163 (step S395).

Next, unit 1103 derives a node number of a release point at level 4 from the leaf number (step S396), sets the index information=(4, release point-node number) (step S397), reads a release point y-coordinate $y_4$ corresponding to the set index information from movie public list 1163 (step S398), derives a straight line $L_4$ passing through the apparatus key kdi and the release point$(x_0,y_4)$ (step S399), derives a y-intercept $YI_4$ of the straight line $L_4$ (step S400), derives $g(YI_4)$ (step S401), derives a y-coordinate $YG_4$ of a point on the straight line $L_4$ having an x-coordinate $g(YI_4)$, and sets $R_3=(g(YI_4),YG_4)$ (step S402).

Next, unit 1103 derives a node number of a release point at level 3 from the leaf number (step S403), sets the index information=(3, release point node number) (step S404), reads a release point y-coordinate $y_3$ corresponding to the set index information from movie public list 1163 (step S405), derives a straight line $L_3$ passing through $R_3$ and the release point$(x_0,y_3)$ (step S406), derives a y-intercept $YI_3$ of the straight line $L_3$ (step S407), derives $g(YI_3)$ (step S408), derives a y-coordinate $YG_3$ of a point on the straight line $L_3$ having an x-coordinate $g(YI_3)$, and sets $R_2=(g(YI_3), YG_3)$ (step S409).

Next, unit 1103 derives a node number of a release point at level 2 from the leaf number (step 5410), sets the index information=(2, release point node number) (step S411), reads a release point y-coordinate $y_2$ corresponding to the set index information from movie public list 1163 (step S412), derives a straight line $L_2$ passing through $R_2$ and the release point$(x_0,y_2)$ (step S413), derives a y-intercept $YI_2$ of the straight line $L_2$ (step S414), derives $g(YI_2)$ (step S415), derives a y-coordinate $YG_2$ of a point on the straight line $L_2$ having an x-coordinate $g(YI_2)$, and sets $R_1=(g(YI_2),YG_2)$ (step S416).

Next, unit 1103 selects a single node key from among $Skdi^{(3)}$, $R_3$, $R_2$ and $R_1$ (step S417).

2. Variations

The following description relates to a music distribution system management apparatus 200*b* and a user apparatus 1100*b* (not depicted in drawings), which are variations of music distribution system management apparatus 200 and user apparatus 1100, respectively.

2.1 Structure of Music Distribution System Management Apparatus 200*b*

As with apparatus 200, apparatus 200*b* manages keys used for encryption conducted in music distribution system 2, outputs node keys used for encryption to music contents distribution apparatus 300, and releases a music public list to user apparatus key 1100*b* via public list server apparatus 400. However, apparatus 200*b* differs from apparatus 200 in the method of managing the keys for encryption and in the method of generating a music public list.

As with apparatus 200, apparatus 200*b* is structured from a display unit 201*b*, a control unit 202*b*, an input unit 203*b*, a tree construction unit 204*b*, a node key generation unit 205*b*, a public list generation unit 206*b*, a transmission/reception unit 207*b*, and an information storage unit 208*b*.

As with apparatus 200, apparatus 200*b* is a computer system, and functions as a result of a microprocessor operating in accordance with a computer program.

(1) Information Storage Unit 208*b*

Unit 208*b* includes a music distribution tree table 211*b* and a music public list 221*b*.

Figure 44:
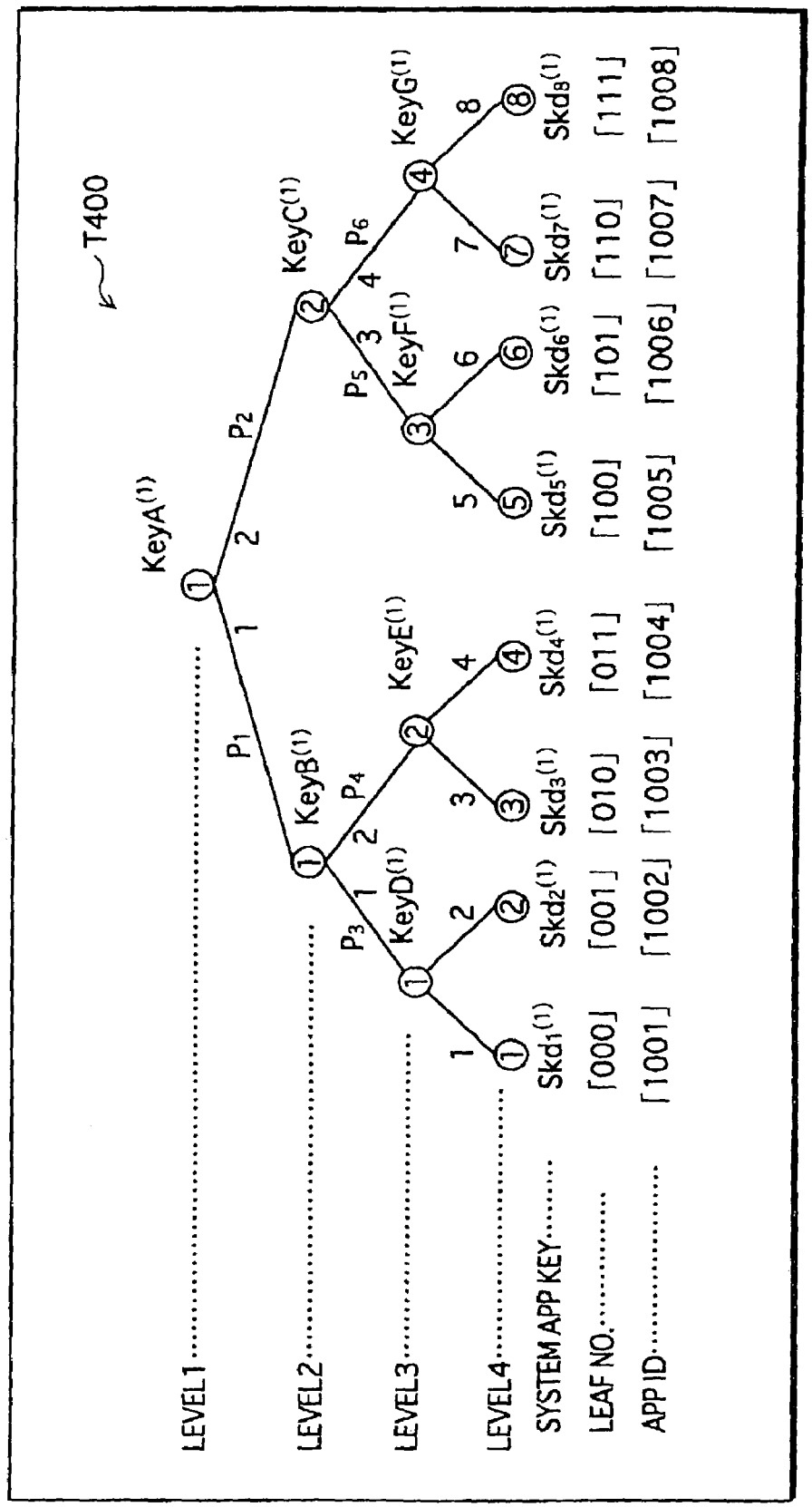
FIG. 44 is a conceptual diagram showing a tree T400.
Figure 47:
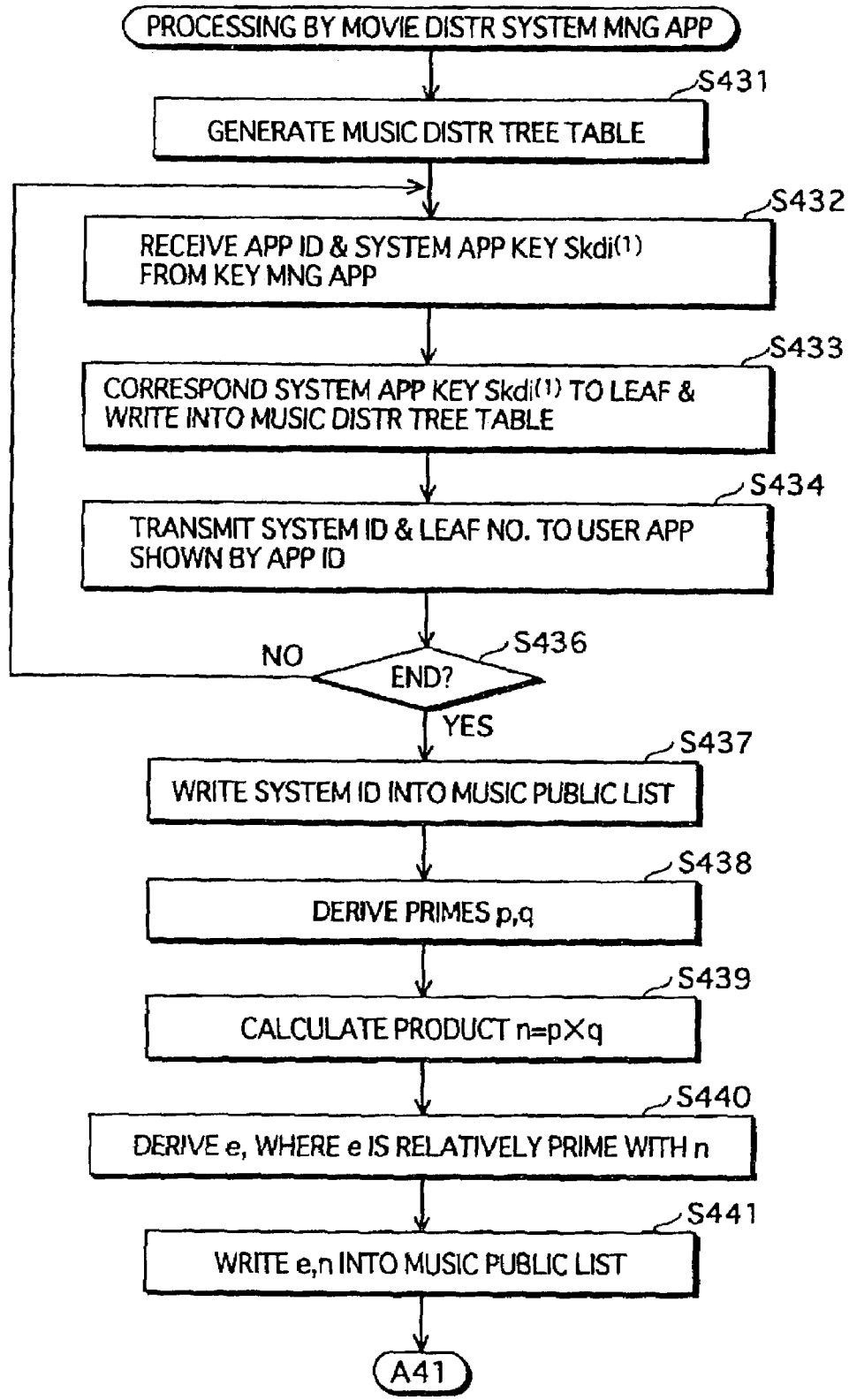
FIG. 47 is a flowchart showing operations performed by a music distribution system management apparatus 200$b$ (cont.
Figure 48:
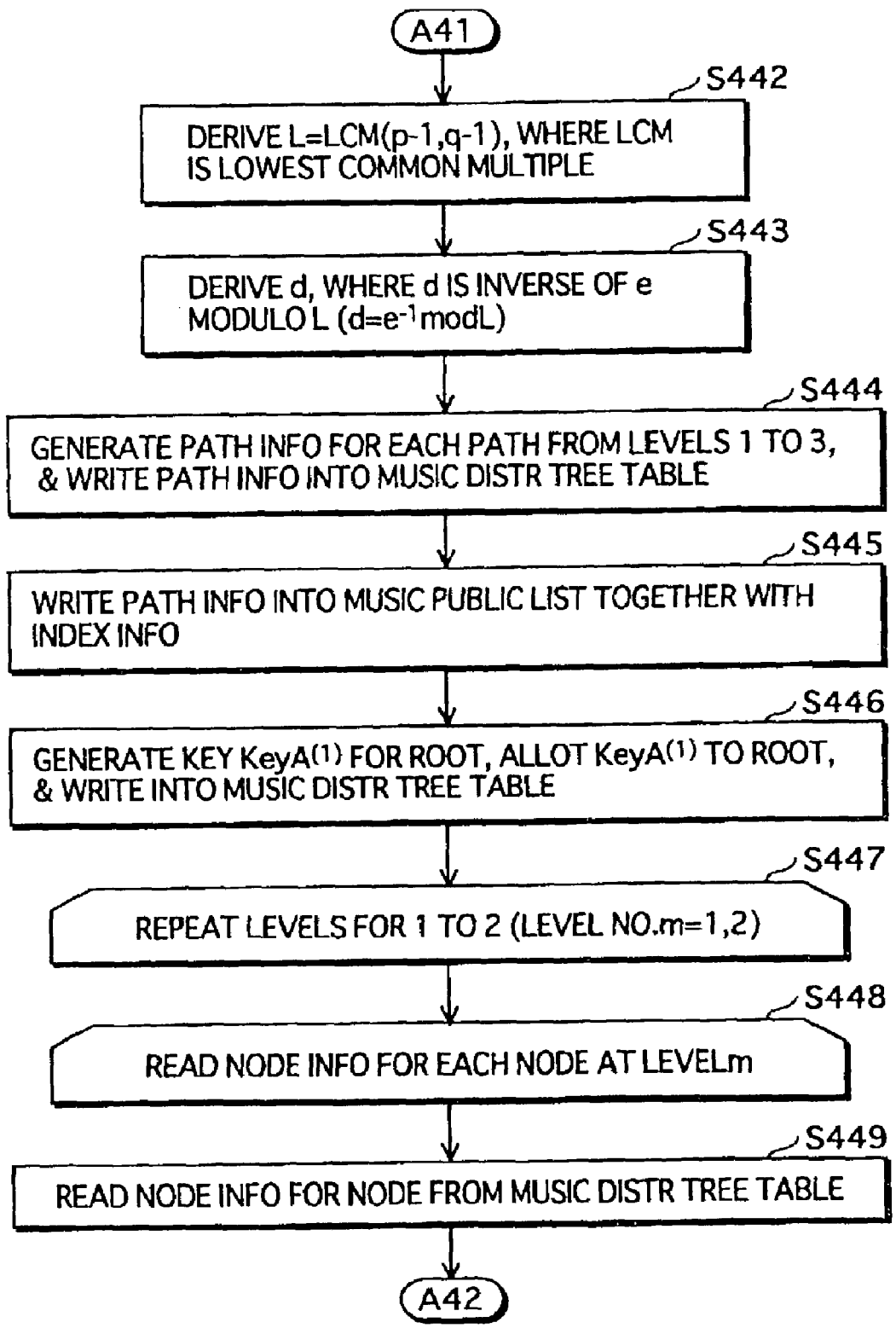
in FIG. 48)
Figure 49:
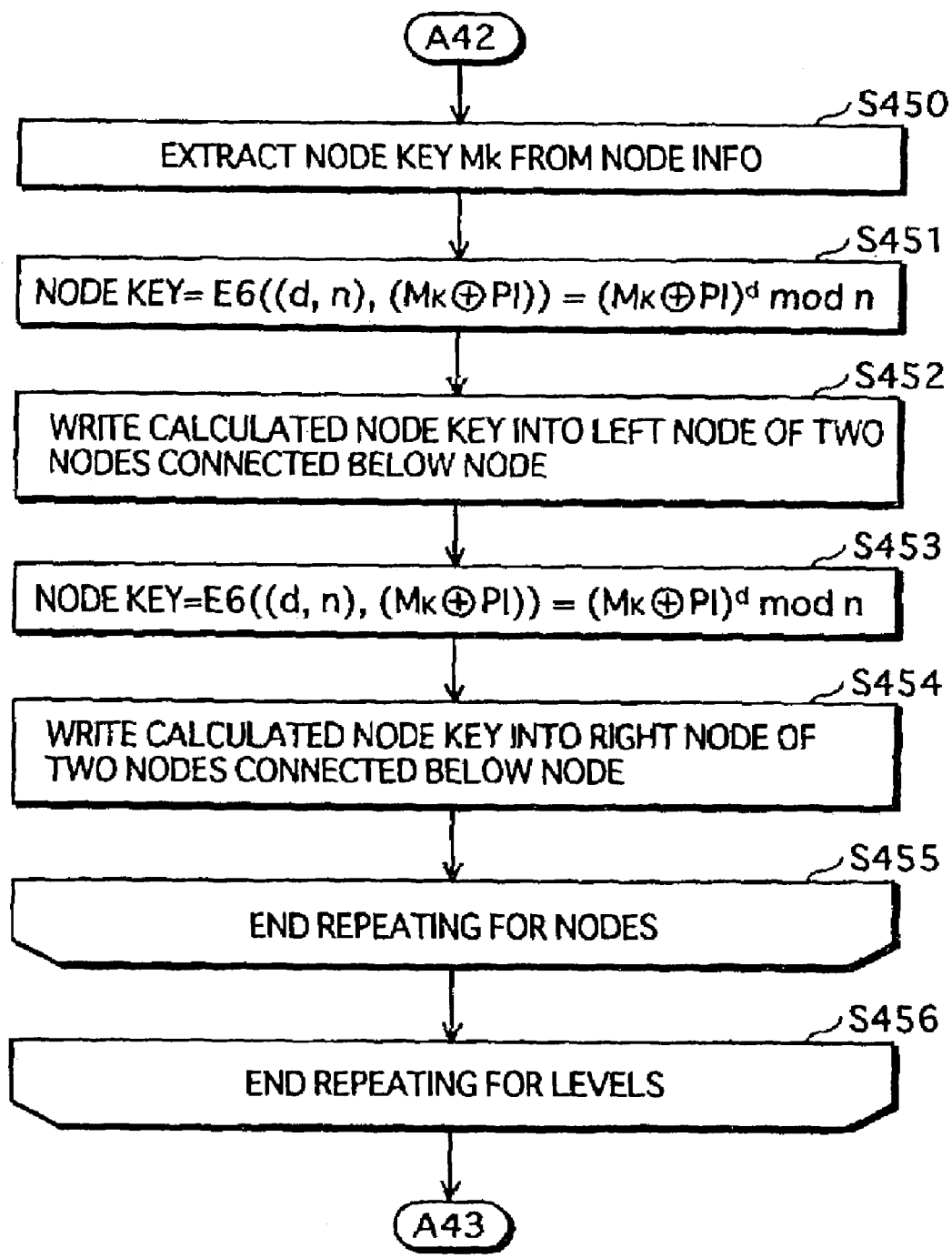
in FIG. 49)
Figure 50:
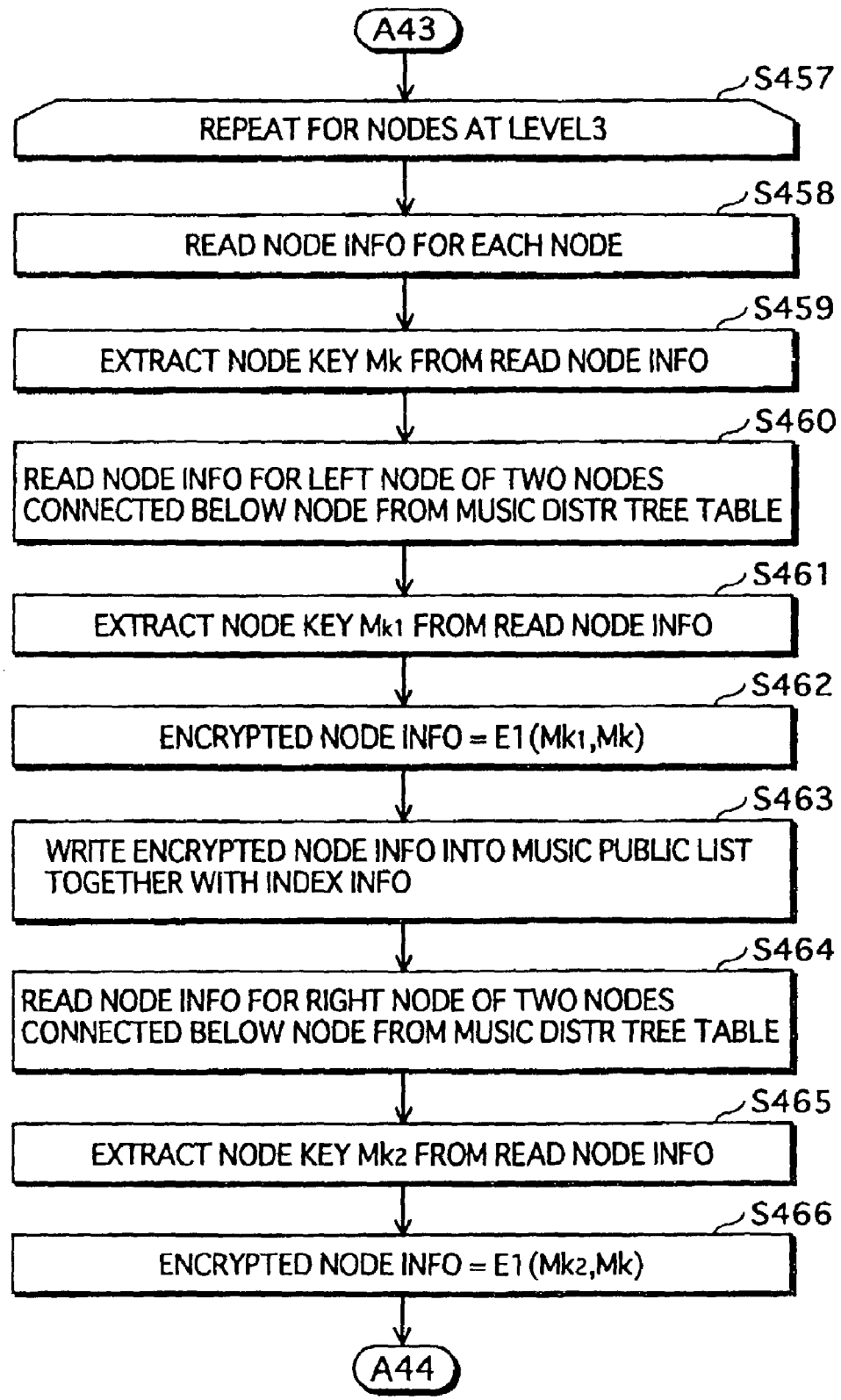
in FIG. 50)
Figure 51:
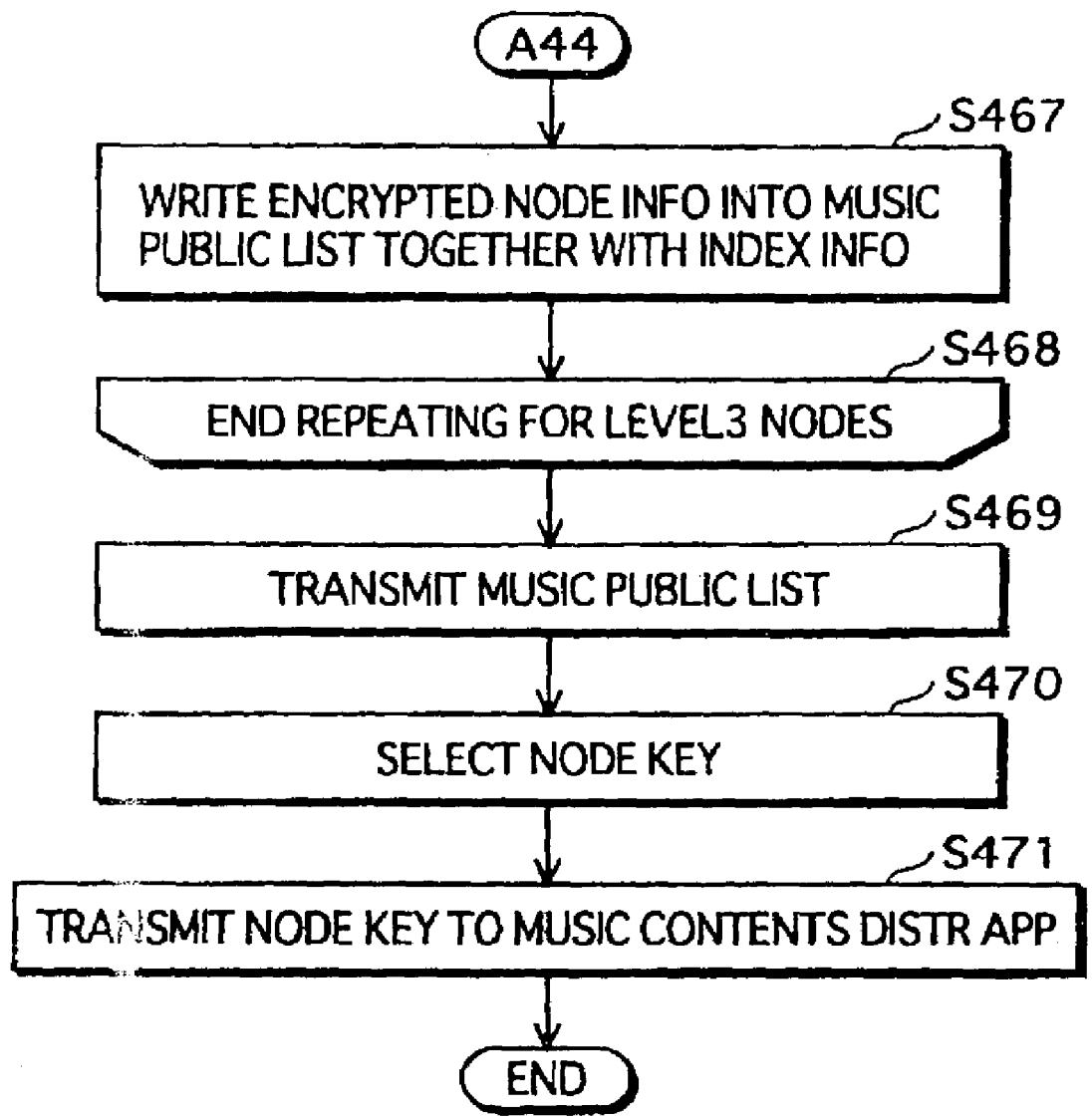
in FIG. 51)

Table 211*b* corresponds to a tree T400, an example of which is given in FIG. 44, and shows a data structure for expressing tree T400.

As described in detail in a later section, the data structure for expressing tree T400 is generated as table 211*b* by tree construction unit 204*b*, and written into unit 208*b*.

Tree T400: As shown in FIG. 44, tree T400 is a binary tree formed from four levels (levels 1-4). Since the structure of tree T400 is the same as that of tree T100, a detailed description is omitted here.

Music Distribution Tree Table 211*b*: As shown in FIG. 45, table 211*b* is structured to include an equal number of pieces of node information as there are nodes in tree T400, and the pieces of node information correspond one-to-one with the nodes structuring tree T400.

Node information corresponding to the root includes a level number, a node number, and a node key. Node information corresponding to nodes other than the root or leaves includes a level number, a node number, a node key, and path information. Furthermore, node information corresponding to the leaves includes a level number, a node number, a node key, and an apparatus ID.

Level numbers, node numbers, node keys and apparatus IDs are as described above, and a description is omitted here.

Each piece of path information is information allotted uniquely to a path from a node shown by a corresponding level number and node number to a superordinate node, and is generated using a random number. Here, the "corresponding level number and node number" refers to a level number and a node number included in a piece of node information that includes the piece of path information. Moreover, the path information may be a number (i.e. "path number") allotted uniquely to a path.

Music Public List 221*b*: As show in FIG. 46, public list 221*b* is structured to include a system ID, a public key, a first predetermined number of pieces of path public information, and a second predetermined number of pieces of node key public information.

As described above, a system ID is an identifier for identifying a contents supply system that supplies/distributes contents.

A public key is generated based on an RSA public key encryption system, and includes an integer e and an integer n. Integers e and n are described in detail in a later section.

The "first predetermined number" is equal to the number of paths from each node (excluding leaves) in tree T400 to a superordinate node.

Each piece of path public information includes index information and path information, and each piece of index information includes a level number and a path number. Level numbers, path numbers and path information are as described above, and a description is omitted here.

The "second predetermined number" is equal to the number of paths from each leaf in tree T400 to a superordinate node.

Each piece of node key public information includes index information and an encrypted node key, and each piece of index information includes a level number and a path number. Level numbers and path numbers are as described above, and a description is omitted here. An encrypted node key is generated by performing an encryption algorithm on a node key allotted to the targeted node, using a node key allotted to a subordinate node connected to a targeted node (i.e. node shown in a corresponding piece of node key public information) by a path shown by a corresponding path number, as a key.

As shown in FIG. 46, an exemplary piece of path public information in music public list 221b includes (1,1) and $P_1$. Here, "(1,1)" shows a level number of "1" and a path number of "1". "$P_1$" is a piece of path information.

Furthermore, as shown in FIG. 46, an exemplary piece of node key public information in music public list 221b includes (3,1) and E1(Skdi$^{(1)}$,KeyD$^{(1)}$). Here, "(3,1)" shows a level number of "3" and a path number of "1". "E1(Skdi$^{(1)}$, KeyD$^{(1)}$)" shows a ciphertext obtained by using Skdi$^{(1)}$ as a key to perform an encryption algorithm E1 on KeyD$^{(1)}$.

(2) Tree Construction Unit 204b

Tree construction unit 204b generates music distribution tree table 211b and writes the generated table 211b into information storage unit 208b. Specifically, unit 204b generates, for each node in tree T400, a piece of node information that includes a level number and a node number, and writes the generated node information into table 211b. At this stage of the process, the node information does not include a node key, an apparatus ID, or path information.

Also, unit 204b receives an apparatus ID and a system apparatus key Skdi$^{(1)}$ from key management apparatus 100 via control unit 202b, and writes the received apparatus ID and system apparatus key Skdi$^{(1)}$ into table 211b, so that the system apparatus key Skdi$^{(1)}$ corresponds to a single leaf. Furthermore, unit 204b outputs a leaf number showing the leaf to control unit 202b.

(3) Control Unit 202b

Unit 202b controls the receiving of apparatus IDs and system apparatus keys Skdi$^{(1)}$, the writing of system apparatus keys into music distribution tree table 211b, and the transmitting of leaf numbers to user apparatuses to be repeated until the receiving of apparatus IDs and system apparatus keys Skdi$^{(1)}$ is completed.

Next, unit 202b receives an apparatus ID and a system apparatus key Skdi$^{(1)}$ from key management apparatus 100 via transmission/reception unit 207b, and outputs the received apparatus ID and system apparatus key Skdi$^{(1)}$ to tree construction unit 204b.

Furthermore, control unit 202b receives a leaf number from tree construction unit 204b, and transmits, via transmission/reception unit 207b and the Internet 5, a system ID (=1) and the received leaf number to the user apparatus shown by the received apparatus ID.

Furthermore, unit 202b selects, from music distribution tree table 211b, a node key based on a predetermined reference. In the given example, unit 202b selects, out of all the nodes existing on the route from the leaf to the root, the node key allotted to the most superordinate node (i.e. the root). Next, control unit 202b sends the selected node key to music contents distribution apparatus 300.

(4) Public List Generation Unit 206b

When judged by control unit 202b that the receiving of apparatus IDs and system apparatus keys Skdi$^{(1)}$ has been completed, unit 206b writes a system ID into music public list 221b.

Next, unit 206b derives primes p and q, derives an integer n by calculating a product n=p×q, derives an integer e that is relatively prime with n, and writes integers n and e into music public list 221b as a public key.

Next, unit 206b derives an integer L=LMC(p-1,q-1), where LMC is a lowest common multiple. Next, unit 206b derives an inverse d of integer e modulus L.

$$d = e^{-1} \bmod L$$

Here, integers n and d form a secret key.

Next, unit 206b generates a random number for each path at levels 1 to 3, uses the random number to generate path information, and writes the generated path information into music distribution tree table 211b, so that the path information corresponds to a level number and a node number. Furthermore, unit 206b writes the generated path information into music public list 221b, so that the path information corresponds to a piece of index information (level number, path number).

Next, unit 206b generates a random number, and, based on the random number, generates a key KeyA$^{(1)}$ to be allotted to the root. Next, in order to allot the generated KeyA$^{(1)}$ to the root, unit 206b writes KeyA$^{(1)}$ into music distribution tree table 211b as a node key.

Next, unit 206b repeats the following processing (a-1) to (a-5) in order from levels 1 to 2, and in the order of the nodes at each of these levels.

(a-1):unit 206b reads node information relating to a targeted node from music distribution tree table 211b, and extracts a node key from the read node information as a node key Mk.

(a-2):unit 206b calculates:

$$\text{new node key} = E6((d, n), (Mk(+)PI_a))$$
$$= ((Mk(+)PI_a))^d \bmod n$$

Here, $PI_a$ is path information corresponding to a path from the targeted node to a left-hand subordinate node connected to the targeted node. Furthermore, the operation (+) shows an exclusive-OR operation (i.e. "exclusive-OR" or simple "XOR").

(a-3):unit 206b writes the newly calculated node key into node information (in music distribution tree table 211b) relating to the left-hand subordinate node connected to the targeted node.

(a-4):unit 206b calculates:

$$\text{new node key} = E6((d, n), (Mk(+)PI_b))$$
$$= ((Mk(+)PI_b))^d \bmod n$$

Here, $PI_a$ is path information corresponding to a path from the targeted node to a right-hand subordinate node connected to the targeted node.

(a-5):unit 206b writes the-newly calculated node key into node information (in music distribution tree table 211b) relating to the right-hand subordinate node connected to the targeted node.

Next, unit 206b, repeats the following processing (b-1) to (b-7) in order for the nodes at level 3.

(b-1):unit 206b reads node information relating to a targeted node from music distribution tree table 211b, and extracts a node key from the read node information as a node key Mk.

(b-2):next, unit 206b reads node information relating to the left-hand subordinate node connected to the targeted node from music distribution tree table 211b, and extracts a node key from the read node information as a node key Mk1.

(b-3):next, unit 206b calculates:

encrypted node information=E1(Mk1,Mk)

(b-4):unit 206b writes the encrypted node information into music public list 221b together with index information.

(b-5):unit 206b reads node information relating to the right-hand subordinate node connected to the targeted node from music distribution tree table 211b, and extracts a node key from the read node information as a node key Mk2.

(b-6):unit 206b calculates:

encrypted node information=E1(Mk2,Mk)

(b-7):unit 206b writes the encrypted node information into music public list 221b together with index information.

Next, unit 206b sends the generated music public list 221b to public list server apparatus 400.

(5) Transmission/Reception Unit 207b

Unit 207b is connected to music contents distribution apparatus 300 and user apparatus 1100b via a communication line and the Internet 5, respectively.

Unit 207b conducts transmission and reception of information between control unit 202b and apparatus 300, and conducts transmission and reception of information between control unit 202b and user apparatus 1100b.

(6) Display Unit 201b, Input Unit 203b

Display unit 201b displays various types of information under the control of control unit 202b. Input unit 203b receives input of information from a manager of music distribution system management apparatus 200b.

2.2 User Apparatus 1100b

As with user apparatus 1100, user apparatus 1100b decrypts, based on an apparatus key kdi (stored by user apparatus 1100b) and a music public list, encrypted music contents, and plays back the music contents. User apparatus 1100b also decrypts, based on the apparatus key kdi (stored by user apparatus 1100b) and a DVD public list, encrypted movie contents recorded on a DVD, and plays back the movie contents. Furthermore, user apparatus 1100b receives radio waves, extracts encrypted movie contents from the received radio waves, decrypts, based on the apparatus key kdi (stored by user apparatus 1100b) and a movie public list, the encrypted movie contents extracted from the radio waves, and plays back the movie contents. However, user apparatus 1100b differs from user apparatus 1100 in the method of specifying a key allotted to user apparatus 1100b based on the apparatus key kdi (stored by user apparatus 1100b) and a music public list.

User apparatus 1100b has the same structure as user apparatus 1100. The following description focuses on the differences with user apparatus 1100.

(1) Node Key Specifying Unit 1103b

Unit 1103b reads a leaf number corresponding to a system ID from system ID table 1151 in information storage unit 1101, and reads an apparatus key kdi from apparatus key storage unit 1102. Furthermore, unit 1103b specifies a public list corresponding to the system ID. Here, since the system ID is "1", music public list 1161 is specified.

Next, unit 1103b generates a system apparatus key Skdi$^{(1)}$= h(kdi, System ID). A system apparatus key Skdi$^{(1)}$ allotted to a node at level 4 is thus derived.

Next, unit 1103b obtains a node key allotted to a node at level 3 in the following manner. Unit 1103b derives a path number at level 3 from the leaf number, sets the index information=(3, path number), and reads an encrypted node key corresponding to the set index information from music public list 1161. Next, unit 1103b decrypts the encrypted node key using the system apparatus key Skdi$^{(1)}$ as a key. $R_3$=D1(Skdi$^{(1)}$, encrypted node key). A node key $R_3$ allotted to a node at level 3 is thus derived.

Next, unit 1103b obtains a node key allotted to a node at each of levels 2 and 1 in the following manner.

Unit 1103b reads public key e,n from music public list 1161, and calculates $R_2$=D6((e,n),$R_3$)=($R_3$)$^e$ mod n. Next, unit 1103b derives a path number at level 2 from the leaf number, sets the index information=(2, path number), reads, from music public list 1161, path information corresponding to the set index information as path information PI, and calculates $R_2$=$R_2$(+)PI. A node key $R_2$ allotted to a node at level 2 is thus derived.

Next, unit 1103b calculates $R_1$=D6((e,n),$R_2$)=($R_2$)$^e$ mod n. Next, unit 1103b derives a path number at level 1 from the leaf number, sets the index information=(1, path number), reads, from music public list 1161, path information corresponding to the set index information as path information PI, and calculates $R_1$=$R_1$(+)PI. A node key $R_1$ allotted to a node at level 1 is thus derived.

Next, unit 1103b selects a node key from among Skdi$^{(1)}$, $R_3$, $R_2$ and $R_1$.

2.3 Operations Performed by Music Distribution System Management Apparatus 200b

The operations performed by music distribution system management apparatus 200b will now be described using the flowchart shown in FIGS. 47 to 51.

Tree construction unit 204b generates a music distribution tree table 211b and writes the generated table 211b into information storage unit 208b (step S431).

Next, control unit 202b receives an apparatus ID and a system apparatus key Skdi$^{(1)}$ from key management apparatus 100 via transmission/reception unit 207b, and outputs the received apparatus ID and system apparatus key Skdi$^{(1)}$ to tree construction unit 204b (step S432). Unit 204b then writes the apparatus ID and the system apparatus key Skdi$^{(1)}$ into music distribution tree table 211b, so that the system apparatus key Skdi$^{(1)}$ corresponds to a single leaf (step S433). Control unit 202b then sends the system ID (=1) and the leaf number to the user apparatus shown by the received apparatus ID via transmission/reception unit 207b and the Internet 5 (step S434).

Next, control unit 202b judges whether the receiving of apparatus IDs and system apparatus keys Skdi$^{(1)}$ is completed (step S436), and if judged to be not completed (step S436=No), control unit 202b returns to step S432 and repeats the processing.

On the other hand, if judged by control unit 202b that the receiving of apparatus IDs and system apparatus keys Skdi$^{(1)}$ is completed (step S436=Yes), public list generation unit 206b writes the system ID into music public list 221b (step S437).

Next, unit 206b derives primes p and q (step S438), derives an integer n by calculating a product n=p×q (step S439), derives an integer e that is relatively prime with n (step S440), and writes integers n and e into music public list 221b as a public key (step S441). Next, unit 206b derives an integer L=LMC(p-1,q-1), where LMC is a lowest common multiple (step S442). Next, unit 206b derives an inverse d of integer e modulus L. d=e$^{-1}$ mod L (step S443).

Next, unit 206b generates path information for each path at levels 1 to 3, writes the generated path information into music distribution tree table 211b, so that the path information corresponds to a level number and a node number (step S444), and writes the generated path information into music public list 221b, so that the path information corresponds to a piece of index information (level number, path number) (step S445).

Next, unit 206b generates a random number, and, based on the random number, generates a key KeyA$^{(1)}$ to be allotted to the root, and in order to allot the generated KeyA$^{(1)}$ to the root, unit 206b writes KeyA$^{(1)}$ into music distribution tree table 211b as a node key (step S446).

Next, in steps S447 to S456, unit 206b repeats steps S448 to S455 in order from level 2 to level 1 (level number m=2,1).

Next, in steps S448 to S455, unit 206b repeats the following steps S449 to S454 in order for each node at the level shown by the level number m.

Unit 206b reads node information relating to a targeted node from music distribution tree table 211b (step S449), and extracts a node key from the read node information as a node key Mk (step S450). Next, unit 206b calculates a new node key=E6((d,n),(Mk(+)PI$_a$))=((Mk(+)PI$_a$))$^d$ mod n (step S451), writes the newly calculated node key into node information (in music distribution tree table 211b) relating to the left-hand subordinate node connected to the targeted node (step S452). Furthermore, unit 206b calculates a new node key=E6((d,n), (Mk(+)PI$_b$))=((Mk(+)PI$_b$))$^d$ mod n (step S453), and writes the newly calculated node key into node information (in music distribution tree table 211b) relating to the right-hand subordinate node connected to the targeted node (step S454).

Next, in steps S457 to S468, unit 206b repeats the following steps S458 to S467 in order for each of the nodes at level 3.

Unit 206b reads node information relating to a targeted node from music distribution tree table 211b (step S458), and extracts a node key from the read node information as a node key Mk (step S459).

Next, unit 206b reads node information relating to the left-hand subordinate node connected to the targeted node from music distribution tree table 211b (step S460), extracts a node key from the read node information as a node key Mk1 (step S461), calculates encrypted node information=E1(Mk1,Mk), and writes the encrypted node information into music public list 221b together with index information (step S463).

Next, unit 206b reads node information relating to the right-hand subordinate node connected to the targeted node from music distribution tree table 211b (step S464), extracts a node key from the read node information as a node key Mk2 (step S465), calculates encrypted node information=E1(Mk2,Mk) (step S466), and writes the encrypted node information into music public list 221b together with index information (step S467).

Next, unit 206b sends the generated music public list 221b to public list server apparatus 400 (step S469), and control unit 202b selects a single node key from music distribution tree table 211b (step S470), and sends the selected node key to music contents distribution apparatus 300 (step S471).

2.4 Operations Preformed by User Apparatus 1100b

Figure 52:
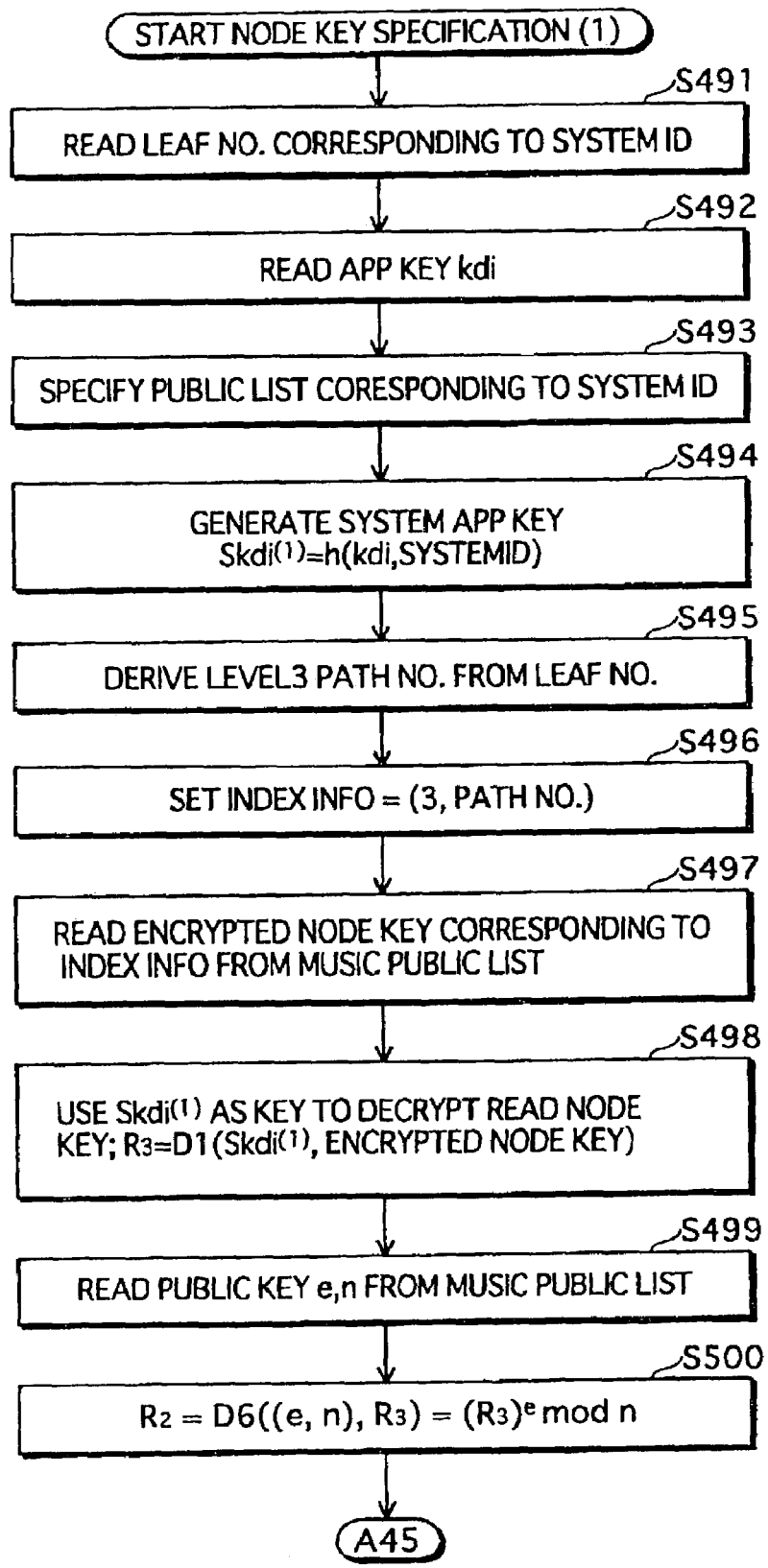
FIG. 52 is a flowchart showing operations relating to a node key specification (1) by node key specifying unit 1103$b$, these being part of the operations performed by a user apparatus 1100$b$ (cont.
Figure 53:
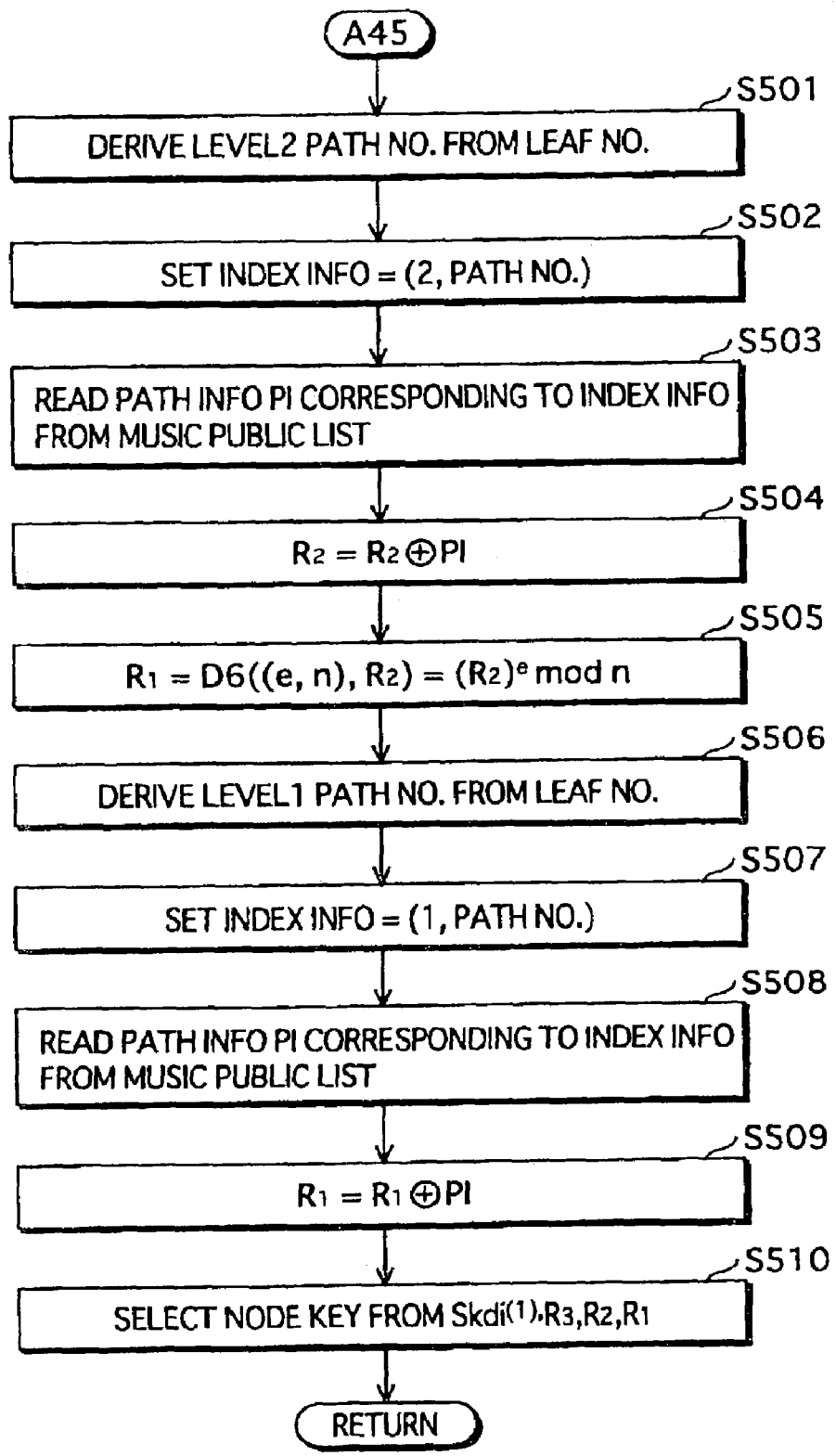
in FIG. 53)
Figure 54:
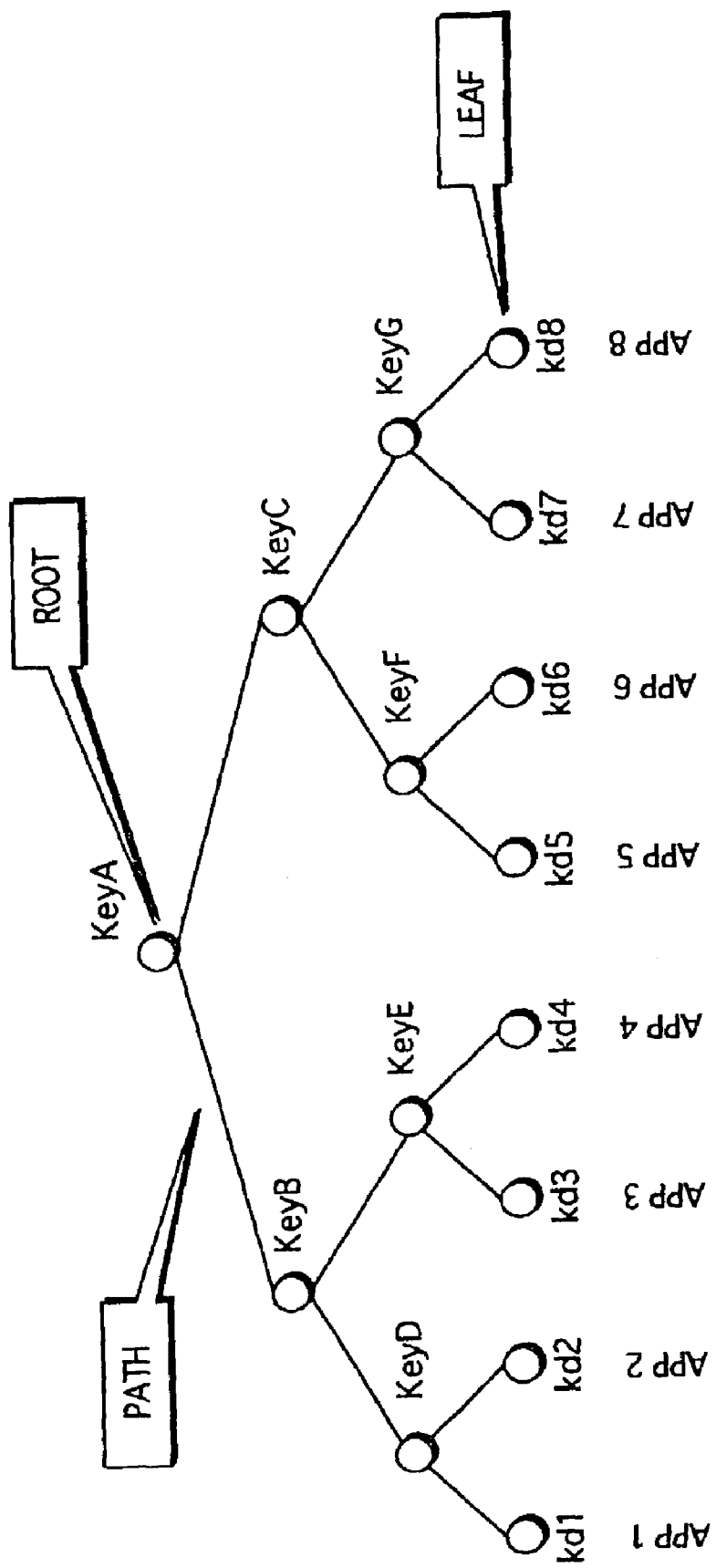
FIG. 54 is a conceptual diagram showing a tree structure according to a tree division method disclosed in a reference 1.

Of the operations performed by user apparatus 110b, the following description relates to node key specification (1) processing, with reference to FIGS. 52 and 53. The following is a detailed description of the processing conducted in step S307 of the FIG. 34 flowchart.

Node key specifying unit 1103b reads a leaf number corresponding to a system ID from system ID table 1151 in information storage unit 1101b (step S491), reads an apparatus key kdi from apparatus key storage unit 1102b (step S492), and specifies a public list corresponding to the system ID. Here, since the system ID is "1", music public list 1161 is specified (step S493).

Next, unit 1103b generates a system apparatus key Skdi$^{(1)}$=h(kdi, system ID) (step S494), derives a path number at level 3 from the leaf number (step S495), sets the index information=(3, path number) (step S496), and reads an encrypted node key corresponding to the set index information from music public list 1161 (step S497). Unit 1103b then decrypts the encrypted node key using the system apparatus key Skdi$_{(1)}$ as a key. R$_3$=D1(Skdi$^{(1)}$, encrypted node key) (step S498).

Next, unit 1103b reads public key e,n from music public list 1161 (step S499), and calculates R$_2$=D6((e,n),R$_3$)=(R$_3$)$^e$ mod n (step S500).

Next, unit 1103b derives a path number at level 2 from the leaf number (step S501), sets the index information=(2, path number) (step S502), reads, from music public list 1161, path information corresponding to the set index information as path information PI (step S503), calculates R$_2$=R$_2$(+)PI (step S504), and calculates R$_1$=D6((e,n),R$_2$)=(R$_2$)$^e$ mod n (step S505).

Next, unit 1103b derives a path number at level 1 from the leaf number (step S506), sets the index information=(1, path number) (step S507), reads, from music public list 1161, path information corresponding to the set index information as path information PI (step S508), and calculates R$_1$=R$_1$(+)PI (step S509).

Next, unit 1103b selects a node key from among Skdi$^{(1)}$, R$_3$, R$_2$ and R$_1$ (step S510).

3. Concluding Remarks 3.1 Summary of the Present Invention

As described above, the present invention relates to an encrypted data distribution system capable of using flexible and independent tree structures to manage a group key for each contents supply system, in the case of a single user apparatus being connected to a plurality of distinct contents supply systems and receiving distribution services provided by the contents supply systems.

A user apparatus stores an apparatus key corresponding to a leaf of a tree, uses the apparatus key and a public list released (i.e. made public) by a corresponding contents supply system to reconstruct the tree sequentially from the leaf upwards, derives a node key corresponding to the user apparatus, and decrypts an encrypted content based on the derived node key. A web server, a package media (e.g. DVD or the like), or a digital broadcast is used to release the public list to the user apparatus.

A key management apparatus, which is managed and administered by a key management organization, securely stores an apparatus key, and distributes the apparatus key to a corresponding user apparatus. Furthermore, the key management apparatus distributes a system apparatus key to a system manager of each contents supply apparatus. Here, a system apparatus key is an apparatus key converted for use by the contents supply system.

A system management apparatus in each contents supply system uses a system apparatus key to construct a tree and generate a public list, and manages the generated tree and public list. Furthermore, the system management apparatus indicates to a contents supplier in the contents supply system, a node key to be used for encrypting a group key.

A contents supply apparatus in each contents supply system provides to a user apparatus, a contents service that is unique to the contents supply system. The contents supply apparatus generates a group key that corresponds to a content, generates encrypted information (i.e. key information that allows a specified user apparatus to determine the group key) by encrypting the group key using a node key received from the system management apparatus, and distributes the encrypted information to a user apparatus together with the content encrypted using the group key.

Each user apparatus has a fixed and unique apparatus key that is distributed in advance by the key management apparatus, uses the apparatus key to generate a system apparatus key for use by each contents supply system to which the user apparatus is associated, and receives encrypted information and encrypted content distributed by a contents supply apparatus. Here, the following assumptions are made with regard to each user apparatus.

(a): An apparatus key possessed by a user apparatus cannot be altered. Here, an apparatus key is, for example, embedded in the user apparatus at the point of manufacture.

(b): A user apparatus may be associated with a plurality of distinct contents supply systems, and is capable of receiving contents services provided by each of the contents supply systems.

(c): A user apparatus is capable of accessing a public list that is released using a digital broadcast, a homepage, package media, or the like.

3.2 Working Example

A working example of the present invention will now be described.

<1> Point of Manufacture of a User Apparatus

Here, let an ID of a user apparatus be "i".

The key management apparatus generates an apparatus key kdi for a corresponding user apparatus i, and, via a manufacture, embeds the apparatus key kdi in user apparatus i when the user apparatus i is manufactured.

<2> Point of Establishing a Contents Supply System

Here, let an ID of a contents supply system be "ID1".

(1) The key management apparatus uses the apparatus key kdi and the ID of the contents supply system to determine a key h(kdi,ID1) for use in the contents supply system (i.e. "system apparatus key"), where "h" is a common one-way function. Because a system apparatus key is generated by performing a one-way function, a contents manager of a contents supply system cannot use the system apparatus key to determine an apparatus key kdi of an apparatus, nor can the contents manager use the system apparatus key to determine the apparatus keys of other contents supply systems.

(2) The key management apparatus secretly makes available, to a system management apparatus that is managed/administered by the system manager of the contents supply system, the generated system apparatus key of the user apparatus associated with the contents supply system.

(3) The system management apparatus constructs a tree for managing a group key, and uses a system apparatus key to generate a public list.

(4) The system management apparatus uses, for example, a digital broadcast, a web server, package media or the like to release the generated public list to a user apparatus.

<3> Point of Distributing Contents (1) The system management apparatus manages a user apparatus to which a content will be made available, and chooses, from a tree structure, a node key that the encryption of the content is based on. The system management apparatus distributes the chosen node key (also referred to as a "device key") to the contents supply apparatus. The content is encrypted based on the chosen node key (i.e. the device key) Here, although the system management apparatus is described as performing the selection of a node key that the encryption of a content is based on, the contents supply apparatus may perform this function.

(2) The contents supply apparatus generates a group key, encrypts the generated group key using a node key specified by the system management apparatus, and uses the Internet, package media (e.g. DVD) or the like to supply the resulting encrypted key information to a user apparatus together with a content encrypted using the group key.

(3) A user apparatus uses an apparatus key kdi (possessed by the user apparatus) and the ID of the contents supply system to determine an apparatus key h(kdi,ID1) for use by the contents supply system.

(4) The user apparatus uses the derived system apparatus key and a public list to sequentially determine node keys in the tree of the contents supply system that relate to the user apparatus.

(5) The user apparatus chooses a ciphertext corresponding to the user apparatus from the encrypted key information supplied by the contents supply apparatus, derives the group key by decrypting the corresponding ciphertext using a node key, and derives the content using the group key.

Although the above description relates to only a single contents supply system, the establishment and operation is the same as described above, even when additional contents supply systems are included. In this case, user apparatus i need only use a common one-way function and a system ID to internally generate a new apparatus key for the contents supply system, and it is not necessary, for example, to use a different method (e.g. IC card) to additionally generate secret keys and the like for the user apparatus.

The following description relates to four examples of the above method for generating a public list, and the above method for using an apparatus key of a user apparatus to determine a node key required for decrypting a content.

In the given example, a contents supply system generates a public list corresponding to a tree division method for a tree structure having 3 levels. Each user apparatus i stores only an apparatus key, and derives a system apparatus key $Skdi^{(1)}$ $(=h(kdi,ID1))$ by using the apparatus key as a key to perform a one-way function. Furthermore, a user apparatus i uses a public list to determine a corresponding node key in the tree. Here, h and g are common one-way functions.

<4> Example 1: Method Using Shared Key Encryption

Example 1 corresponds to the description given in relation to music distribution system 2.

(1) Determination of Tree Structure by System Management Apparatus

The system management apparatus allots, to leaves in the tree shown in FIG. 6, system apparatus keys $Skd1^{(1)}$ to $Skd8^{(1)}$ of user apparatuses associated with the contents supply system, and derives each of the node keys in the tree.

(2) Generation of Public List by System Management Apparatus

The system management apparatus generates ciphertexts that correspond one-to-one with the paths in the tree. With respect to a path from a leaf of a user apparatus 1 to a node allotted a $KeyD^{(1)}$, for example, the system management apparatus derives a ciphertext $E1(Skd1^{(1)},KeyD^{(1)})$ by encrypting $KeyD^{(1)}$ using a system apparatus key $Skd1^{(1)}$. In the given example, an encryption algorithm E1 is based on shared key encryption such as Des or AES, and a corresponding decryption algorithm D1 is released (i.e. made public).

Furthermore, with respect to a path from a leaf of a user apparatus 2 to the node allotted $KeyD^{(1)}$, the system management apparatus derives $E1(Skd2^{(1)},KeyD^{(1)})$. By repeating this process for each of the nodes in the tree, the system management apparatus releases the ciphertexts (i.e. encrypted node keys) in the public list shown in FIG. 8.

In addition to the ciphertexts, the public list includes index information showing the paths to which the ciphertexts correspond.

As an example of index information, it is possible to use numbers for the levels in the tree, and numbers incrementing from the left to the right for the nodes at each level. For example, (3,1) can be given as the index information of ciphertext $E1(Skd2^{(1)}, KeyD^{(1)})$, showing that the corresponding path is the path on the far left of the third level from the top of the tree. The same applies for the index information relating to other ciphertexts in the music public list.

(3) Calculation of Node Key by User Apparatus

A user apparatus derives node keys from the system apparatus key, while using the above public list to move sequentially up the tree structure. For example, user apparatus 1 having an apparatus ID "1001" firstly derives system apparatus key $Skd1^{(1)}$ by using the apparatus key 1 (i.e. of user apparatus 1) and the ID of system 1 as inputs in a one-way function h. User apparatus 1 then extracts $E1(Skd1^{(1)}, KeyD^{(1)})$ from the public list, decrypts the extracted ciphertext in order to determine the node key $KeyD^{(1)}$ on the next level above. User apparatus 1 then decrypts $E1(KeyD^{(1)}, KeyB^{(1)})$ in order to determine the node key $KeyB^{(1)}$ on the next level above. Finally, user apparatus 1 decrypts $E1(KeyB^{(1)}, KeyA^{(1)})$ in order to determine $KeyA^{(1)}$ of the root. Here, index information and position information (pre-embedded in the apparatus) relating to the position of the user apparatus in the tree, is used to extract a desired ciphertext from a public list. Furthermore, encrypted key information, supplied in appended form with a content, is used, as in the-prior art, to determine which of the node keys obtained by the user apparatus are to be used to decrypt contents supplied by a contents supplier.

<5> Example 2: Method Using One-way Function

Example 2 corresponds to the description given in relation to DVD supply system 3. Example 2 involves the reduction of the data volume of a public list by performing a one-way function with respect to the left path of the nodes in example 1.

(1) Determination of Tree Structure by System Management Apparatus

The system management apparatus allots, to leaves in the tree shown in FIG. 13, system apparatus keys $Skd1^{(2)}$ to $Skd8^{(2)}$ of user apparatuses associated with the contents supply system.

(2) Generation of Public List by System Management Apparatus

The system management apparatus determines $g(Skd1^{(2)})$, $g(Skd3^{(2)})$, $g(Skd5^{(2)})$ and $g(Skd7^{(2)})$ using a one-way function g, and sets the derived $g(Skd1^{(2)})$, $g(Skd3^{(2)})$, $g(Skd5^{(2)})$ and $g(Skd7^{(2)})$ as the node keys $KeyD^{(2)}$, $KeyE^{(2)}$, $KeyF^{(2)}$ and $KeyG^{(2)}$ (i.e. at the level above the leaf), respectively.

The system management apparatus writes $E4(Skd2^{(2)}, KeyD^{(2)})$, $E4(Skd4^{(2)}, KeyE^{(2)})$, $E4(Skd6^{(2)}, KeyF^{(2)})$, and $E4(Skd8^{(2)}, KeyG^{(2)})$ into the public list. Here, $E4(Skd2^{(2)}, KeyD^{(2)})$, for example, is a ciphertext generated by using $Skd2^{(2)}$ as a key to perform shared key encryption on node key $KeyD^{(2)}$.

According to this same method, the one-way function g is performed on the node keys of left-hand paths so as to generate the node keys of the nodes on the level above for each level of the tree, and ciphertexts for the right paths are written into the public list. As a result, the public list shown in FIG. 14 is generated, and released.

(3) Calculation of Node Key by User Apparatus

A user apparatus storing an apparatus key that corresponds to a leaf firstly determines a system apparatus key using a one-way function h. Next, the user apparatus sequentially derives the node keys from a leaf to the root by performing the one-way function g when the left-hand path of the tree is taken to the upper levels (shown by the single lines in FIG. 13), and by decrypting a corresponding ciphertext in the public list when the right-hand path is taken to the upper levels (shown by the double lines in FIG. 13).

For example, user apparatus 3 having an apparatus ID "1003" firstly determines $KeyE^{(2)}$ using the one-way function g, and then decrypts $E4(KeyE^{(2)}, KeyB^{(2)})$ from the public list to determine $KeyB^{(2)}$. User apparatus 3 then uses g to determine $KeyA^{(2)}$.

Here, although in the given example a one-way function is used when the left path is taken, it is possible to vary the paths in which the one-way function will be used depending on the level. Furthermore, although the same one-way function is used in the given example, a different one-way function may be used for each of the levels. Decisions relating to whether to move up to levels of the tree using a one-way function or a public list, and if the former, which one-way function to use, may be made, as in example 1, using the position of the apparatus in the tree, and also index information appended to ciphertexts in the public list.

<6> Example 3: Method Using Secret Sharing Scheme Technique

Example 3 corresponds to the description given in relation to movie broadcast system 4.

In example 3, a shared curve (a straight line if the order of the curve=1) is derived from a subordinate node key, and a point uniquely determined on the curve is set as the superordinate node key. This method involves a similar technique to that used in secret sharing. In the given example, the curve is derived over a certain field, although the nature of this field is not specifically described here.

(1) Determination of Tree Structure by System Management Apparatus

The system management apparatus allots, to leaves in the tree shown in FIG. 16, system apparatus keys $Skd1^{(3)}$ to $Skd8^{(3)}$ of user apparatuses associated with the contents supply system. The apparatus keys allotted to leaves of the tree are points on a (x,y) plane.

(2) Generation of Public List by System Management Apparatus

The system management apparatus derives a straight line passing through $Skd1^{(3)}$, and $Skd2^{(3)}$), and releases a point on the derived straight line as s1. The x-coordinate of s1 (here, $x_0$) is determined in advance, and written into the public list, while only the y-coordinate $s1_{(y)}$ of s1 is written into the public list.

$KeyD^{(3)}$ on the straight line is derived by a predetermined process. Here, only a user apparatus able to derive the straight line can derive $KeyD^{(3)}$. In order to achieve this, a one-way function g, for example, may be included as part of the process. As shown in FIG. 18, for example, the y-intercept of the straight line is converted by performing a one-way function, and a point on the straight line having an x-coordinate g(y) is sets as $KeyD^{(3)}$. By performing a one-way function, user apparatuses other than user apparatuses 1 and 2 are not able to determine the x-coordinate of $KeyD^{(3)}$.

The system management apparatus derives a straight line passing through $KeyD^{(3)}$ and $KeyE^{(3)}$, releases a y-coordinate of a point on the derived straight line as $s5_{(y)}$, and derives $KeyB^{(3)}$. User apparatuses 1 to 4 are able to derive the straight line passing through $KeyD^{(3)}$ and $KeyE^{(3)}$, although for the reasons given above, it will be extremely difficult for user apparatuses 3 and 4 to derive $KeyD^{(3)}$ from this straight line.

According to the above process, the values to be written into the public list are sequentially determined by sequentially deriving the shared superordinate node keys of any two subordinate node keys. The values written into the public list are shown in FIG. 20. Here, each written value is a y-coordinate of points s1 to s7 shown in FIG. 16 when the relationship of $Skd1^{(3)}$ and $Skd2^{(3)}$ with public value s1 and superordinate node key $KeyD^{(3)}$ is as shown in FIG. 19.

(3) Calculation of Node Key by User Apparatus

A user apparatus derives a straight line passing though an apparatus key (stored by the user apparatus) and a value written into the public list (both being points on an (x,y) plane), and sequentially derives the node keys at each of the upper levels. For example, user apparatus 1 firstly derives a system apparatus key, and uses a straight line passing through the system apparatus key and s1 to determine $KeyD^{(3)}$. Next, user apparatus 1 uses a straight line passing through $KeyD^{(3)}$ and s5 to determine $KeyB^{(3)}$. $KeyA^{(3)}$ is derived according to the same process.

Here, the above example relates to a binary tree, although in the case of a binary triangle tree, each user apparatus derives a two-dimensional curve passing through the node key of the three nodes branching from a certain parent node, and includes two arbitrary points on the derived curve in the public list. The user apparatus derives the two-dimensional curve by using the node key stored by the user apparatus and two points in the public list, and then derives the node key of the parent node at the level above.

<7> Example 4: Method Using RSA

Example 4 corresponds to the description given in relation to the variation of music distribution system 2.

(1) Determination of Tree Structure by System Management Apparatus

The system management apparatus allots, to leaves in the tree shown in FIG. 44, system apparatus keys $Skd1^{(1)}$ to $Skd8^{(1)}$ of user apparatuses associated with the contents supply system.

(2) Generation of Public List by System Management Apparatus

An in RSA encryption, the system management apparatus derives primes p and q, and releases their product n=p×q. The system management apparatus derives e relatively prime with n, release e, and derives inverse d of integer e modulus L (i.e. $d=e^{-1}$ mod L, where d is a secret key; also L=LCM(p-1,q-1), where LCM is a lowest common multiple). As shown in FIG. 44, for example, the system management apparatus derives path information corresponding to each path and releases the path information. The system management apparatus arbitrarily derives a $KeyA^{(1)}$ for the root, and performs an exclusive-OR on $KeyA^{(1)}$ and path information p1 (left path) to derived a value, encrypts the value using the secret key d, and sets the result as $KeyB^{(1)}$. Furthermore, the system management apparatus performs an exclusive-OR on $KeyA^{(1)}$ and path information p2 (right path) to derive a value, encrypt the derived value using the secret key d, and sets the result as $KeyC^{(1)}$. The node keys of the remaining nodes (excluding leaves) in the tree are derived according to the same process. The public list generated as a result is shown in FIG. 46.

The node keys of the leaves in the tree are derived using one of the methods described in the above examples 1, 2 and 3, and a corresponding public list is generated.

(3) Calculation of Node Key by User Apparatus

A user apparatus uses one of the methods described in the above examples 1, 2 and 3 to sequentially determine node keys on the next level up. For example, user apparatus 1 firstly derives $KeyD^{(1)}$. User apparatus 1 then decrypts $KeyD^{(1)}$ using public key e, performs an exclusive-OR on the decrypted $KeyD^{(1)}$ and path information p3 to derive a value, and derives node key $KeyB^{(1)}$ at the level above. Furthermore, user apparatus 1 decrypts $KeyB^{(1)}$ using public key e, performs an exclusive-OR on the decrypted $KeyB^{(1)}$ and path information p1 to derive a value, and derives node key $KeyA^{(1)}$ of the root.

4. Further Variations

Although an embodiment of the present invention is described above, the present invention is, of course, not limited to the above embodiment. The following exemplary variations may also be included in the invention.

(1) Although described as including three contents supply systems, encrypted data distribution system 1 may include more than three contents supply systems.

Although each contents supply system is described as having a single tree structure and as using the tree to manage keys, a single contents supply systems may have a plurality of trees and may use the plurality of trees to manage keys. In this case, a plurality of public lists will be released (i.e. made public) by the contents supply system.

Furthermore, a single contents supply system may include a plurality of contents supply apparatuses.

Furthermore, music distribution system management apparatus 200 and music contents distribution apparatus 300 in music distribution system 2 may be included as a single apparatus.

Although encrypted data distribution system 1 is described as including three contents supply systems, and the three contents supply systems are described as each employing different methods of generating and managing a public list, two of the three contents supply systems may employ the same public list generation method and the same public list-management method.

(2) The node keys derived by a user apparatus using the methods given in the above examples 1 to 4 may, after being used and depending on the user apparatus and the contents supply system, be utilized and managed.

For example, if the contents supply system is frequently used, or if the user apparatus has a large memory capacity, the node keys may be stored, and then quickly accessed when required without needing to perform the above calculations.

On the other hand, if the contents supply system is not frequently used, or if the user apparatus does not have a large memory capacity, it is more efficient to compute the node keys when required. Alternatively, it is possible to employ a flexible method. For example, the node keys at some of the levels from the leaf may be stored in memory, and the remaining superordinate node keys may be calculated as required.

Furthermore, if the possibility exists that a user apparatus may be exploited unfairly, it may be preferable not to store node keys in the user apparatus. If a system management apparatus judges that a certain user apparatus is being exploited, the system management apparatus deletes from the public list, information required by the user apparatus to determine node keys at superordinate levels. In this way, it is possible to remove an exploited user apparatus from a group. However, a user apparatus can, for example, make a copy of a public list, or determine and store node keys immediately upon being exploited, and thus simply deleting required information from the public list may not prove effective in removing an exploited user apparatus from the group. In terms of applicability, however, this method is effective. When this method is employed, the system management apparatus instructs user apparatuses to delete the computed node keys once processing that uses the node keys has been completed.

(3) Any combination of the methods given in examples 1 to 4 is permissible. For example, the method of example 1 may be used to determine a node key at a level above a leaf in a tree, and the method of example 4 may be used to determine the node keys at levels above that.

(4) To supply a public list to a user apparatus, it is possible to use, for example, a web page managed by a contents supply system, or package media such as a DVD. Moreover, web pages or package media need not be provided per system, but may be divided among a plurality of contents supply systems for management and distribution. Moreover, it is possible to choose only the public information relating to a particular user apparatus, and to send the chosen public information using the Internet or the like.

(5) The tree construction method may be used to achieve the following objects:
  (a) Changing node keys per given unit of time.
  (b) Preparing a tree for remaining user apparatuses in the event that a majority of the user apparatuses being removed from the group results in a small tree structure having to cope with a large amount of encrypted key information. The encrypted key information load may be initialized after the small tree has been prepared.

(6) Although the system manager and the contents supplier are provided separately in the above embodiment, they may be the same organization. In other words, the system management apparatus and the contents supply apparatus may be the same apparatus.

(7) In the above embodiment, each user apparatus generates a corresponding system apparatus key from an apparatus key when operation of the contents supply system is commenced. However, the system apparatus key may be supplied by the contents supply system, or if the system apparatus key to be used by the contents supply system is already determined at the time of manufacturing the user apparatus, the system apparatus key may be embedded in the user apparatus.

(8) Although the above embodiment is described in terms of a content being encrypted by a generated group key, and the group key being encrypted by a certain node key, it is possible to encrypt data simply using the node key.

(9) Although the above embodiment refers to contents supply systems, and to a system manager and a contents supplier being provided per contents supply system, a contents supply system may simple be a common encryption apparatus.

(10) Although the tree structures are described as being binary trees structured from four levels, the present invention is not limited to this structure. Thus, the trees may have more than four levels, and may be binary triangle trees or quad-trees. In other words, the trees may be a conventional n-tree, where n is an integer greater than 2.

(11) Although described as supplying music and movie contents, the contents supply systems may supply other contents. Furthermore, although described as supplying contents via the Internet, package media such as a DVD, and broadcast media, the contents supply systems may supply contents via other media.

(12) Although the key management apparatus was described above as generating a unique apparatus key for a user apparatus, the present invention is not limited to this example. For example, a user apparatus may generate its own unique apparatus key, and secretly write the generated apparatus key into the key management apparatus.

(13) The present invention may be methods described above. Also, the invention may be a computer program for realizing these methods by a computer, or a digital signal that expresses the computer program.

Furthermore, the present invention may be a computer-readable storage medium that stores the computer program or the digital signal, examples of which include a flexible disk, a hard disk, a CD-ROM, a MO, a DVD, a DVD-ROM, a DVD-RAM, a BD (blu-ray disc), a semiconductor memory, or the like. Moreover, the invention may be the computer program or the digital signal stored on the storage medium.

Furthermore, the present invention may be the computer program or the digital signal transmitted via a network or the like, representative examples of which include an electronic communication line, a wireless communication line, a cable communication line, and the Internet.

Furthermore, the present invention may be a computer system that includes a microprocessor and a memory. The memory may store the computer program, and the microprocessor may operate in accordance with the computer program.

Furthermore, the computer program or the digital signal may be transferred to an independent computer system, either stored on the storage medium or via the network, and realized by the independent computer system.

(14) The present invention may be any combination of the above embodiment and variations.

5. Effects of the Present Invention

It is predicted that cases of a single user apparatus being connected to a plurality of contents supply systems will increase from now on. For example, a STB (set-top box), acting as a gateway machine, will be connected to package media, broadcast media, the Internet, and the like. To enable this, the STB will have to be compatible with a plurality of contents supply systems. On the other hand, difficulties are foreseen in attempting to standardize the methods used by the contents supply systems to manage keys for encryption.

The following two methods are suggested to allow a single user apparatus to be compatible with tree management methods used by a plurality of contents supply systems.

Method 1: All of the contents supply systems share a single tree.

Method 2: Each user apparatus includes an independent tree that is determined for the user apparatus in a contents supply system. In other words, each user apparatus stores node keys from a leaf to a root for a plurality of trees.

These two methods give rise to the follows problems.

(a) Lack of Flexibility (Both Method 1 and 2)

Method 2 requires that all of the contents supply systems to be used by a user apparatus are determined at the point of manufacture of the user apparatus, and that the user apparatus prestore the corresponding node keys. Thus, in order to add the user apparatus to a new contents supply system after the user apparatus has been manufactured and provided to a user, it is necessary to adopt special measures, such using a secure apparatus (e.g. IC card) to add node keys to the user apparatus.

On the other hand, even if it is desired to arbitrarily group the affiliated apparatuses together to distribute the keys, because the tree structure is fixed, it is necessary according to method 1 to distribute the keys separately, which increases the encrypted information amount and decreases efficiency.

(b) Lack of Confidentiality Between the Individual Systems (Method 1).

According to method 1, the system managers of the contents supply systems share all the node keys of the tree. In other words, a group key used by one contents supply system can be obtained by the system manager of another contents supply system.

(c) Large Number of Secretly Stored Keys (Method 2)

Method 2 requires that a user apparatus secretly store node keys from a leaf to a root for the trees of each of the contents supply systems. If the user apparatus is affiliated with a large number of contents supply systems, a large memory will be required for secret key storage within the user apparatus.

However, as described above, when a single user apparatus is connected to a plurality of contents supply systems, the present invention allows for each contents supply system to use a group key management method that employs flexible and independent tree structures.

Specifically, the key management apparatus distributes, to a system management apparatus of a contents supply system, only a system apparatus key generated from a one-way function. A system management apparatus uses the system apparatus key, manages node keys, and generates a public list. Each user apparatus stores only an apparatus key corresponding to a leaf of a tree, and uses the apparatus key and a public list for a corresponding contents supply system to sequentially determine node keys corresponding to the nodes from a leaf to the root of the tree.

Furthermore, according to the present invention, it is possible to expel only apparatuses specified as being corruptly used, and to reduce the amount of encrypted data stored on storage media while allowing for contents playback and the like in the remaining apparatuses.

Furthermore, the present invention has the following characteristics.

(a) Trees can be constructed freely for each contents supply system. Moreover, the addition of contents supply systems is possible.

(b) It is difficult for the system manager of one contents supply system to determine the node keys and group key used in the tree structure of another contents supply system.

(c) A user apparatus need only manage a single unique apparatus key.

As described above, the present invention may be a data distribution system structured from a key management apparatus, a plurality of contents supply apparatuses, and one or more user apparatuses, each contents supply apparatus supplying an encrypted content, and each user apparatus decrypting the encrypted content, the data distribution system including: the key management apparatus for (i) outputting to each user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus; the plurality of contents supply apparatuses, each of which is for receiving the first system apparatus key, encrypting a content which is a digital work, based on the first system apparatus key, to generate an encrypted content, and outputting the encrypted content to the user apparatuses; and the one or more user apparatuses, each of which is for receiving the apparatus key and the encrypted content, generating a second system apparatus key unique to the user apparatus by performing the one-way function, based on the apparatus key and the system information unique to the contents supply apparatus, and decrypting the encrypted content, based on the second system apparatus key, to generate a decrypted content.

Furthermore, the present invention may be a key management apparatus in a data distribution system structured from the key management apparatus, a plurality of contents supply apparatuses, and a user apparatus, the key management apparatus supplying to the user apparatus, an apparatus key unique to the user apparatus, each contents supply apparatus supplying an encrypted content, and the user apparatus decrypting the encrypted content, the key management apparatus including: an apparatus key output unit operable to output to the user apparatus, an apparatus key unique to the user apparatus; and a system apparatus key generation unit operable, for each contents supply apparatus, to use a one-way function, based on the apparatus key and system information unique to the contents supply apparatus, to generate a first system apparatus key unique to the user apparatus, and to output the first system apparatus key to the contents supply apparatus.

Furthermore, the present invention may be a contents supply apparatus in data distribution system structured from a key management apparatus, a plurality of the contents supply apparatuses, and a user apparatus, the key management apparatus (i) outputting to the user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus, the contents supply apparatus including: a storage unit operable to store a content which is a digital work; an obtaining unit operable to obtain the first system apparatus key from the key management apparatus; an encryption unit operable to encrypt the content, based on the first system apparatus key, to generate an encrypted content; and an output unit operable to output the encrypted content to the user apparatus.

Furthermore, the present invention may be a user apparatus in a data distribution system structured from a key management apparatus, a plurality of contents supply apparatuses, and the user apparatus, the key management apparatus (i) outputting to the user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus, each contents supply apparatus receiving the first system apparatus key, encrypting a content which is a digital work, based on the first system apparatus key, to generate an encrypted content, and outputting the encrypted content to the user apparatus, user apparatus including: an obtaining unit operable to receive the apparatus key from the key management apparatus; a receiving unit operable to receive the encrypted content from the contents supply apparatus; a system apparatus key generation unit operable to generate a second system apparatus key unique to the user apparatus by performing the one-way function, based on the apparatus key and the system information unique to the contents supply apparatus; and a decryption unit operable to decrypt the encrypted content, based on the second system apparatus key, to generate a decrypted content.

According to these structures, each contents supply system is capable of flexible and independent key management.

Here, the present invention may also be a data distribution system structured from a key management apparatus, a plurality of contents supply apparatuses, and a user apparatus, each contents supply apparatus supplying an encrypted content, and the user apparatus decrypting the encrypted content, data distribution system including: the key management apparatus for (i) outputting to the user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus; the plurality of contents supply apparatuses, each of which is for (i) receiving the first system apparatus key, (ii) determining, based on the first system apparatus key, a device key that an encryption of a content is based on, (iii) encrypting a content which is a digital work, based on the device key, to generate an encrypted content, (iv) outputting the encrypted content to the user apparatus, (v) generating, based on the first system apparatus key, a public list for specifying the device key, and (vi) releasing the generated public list; and the user apparatus for (i) receiving the apparatus key and the encrypted content, (ii) obtaining the released public list, (iii) generating a second system apparatus key unique to the user apparatus by performing the one-way function, based on the apparatus key and the system information unique to the contents supply apparatus, (iv) specifying the device key from the public list, and (v) decrypting the encrypted content, based on the specified device key, to generate a decrypted content.

Furthermore, the present invention may be a contents supply apparatus in a data distribution system structured from a key management apparatus, a plurality of the contents supply apparatuses, and a user apparatus, the key management apparatus (i) outputting to the user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus, the contents supply apparatus including: a storage unit operable to store a content which is a digital work; an obtaining unit operable to obtain the first system apparatus key from the key management apparatus; an encryption unit operable to determine, based on the first system apparatus key, a device key that an encryption of a content is based on, and to encrypt a content which is a digital work, based on the device key, to generate an encrypted content; a public list generation unit operable to generate, based on the first system apparatus key, a public list for specifying the device key; and an output unit operable to output the encrypted content to the user apparatus, and to release the public list.

Furthermore, the present invention may be a user apparatus in a data distribution system structured from a key management apparatus, a plurality of contents supply apparatuses, and the user apparatus, the key management apparatus (i) outputting to the user apparatus, an apparatus key unique to the user apparatus, and (ii) for each contents supply apparatus, generating a first system apparatus key unique to the user apparatus by performing a one-way function, based on the apparatus key and system information unique to the contents supply apparatus, and outputting the first system apparatus key to the contents supply apparatus, each contents supply apparatus (i) receiving the first system apparatus key, (ii) determining, based on the first system apparatus key, a device key that an encryption of a content is based on, (iii) encrypting a content which is a digital work, based on the device key, to generate an encrypted content, (iv) outputting the encrypted content to the user apparatus, (v) generating, based on the first system apparatus key, a public list for specifying the device key, and (vi) releasing the generated public list, the user apparatus including: an obtaining unit operable to receive the apparatus key from the key management apparatus, obtain the released public list, and receive the encrypted content from the contents supply apparatus; a system apparatus key generation unit operable to generate a second system apparatus key unique to the user apparatus by performing the one-way function, based on the apparatus key and the system information unique to the contents supply apparatus; a device key specifying unit operable to specify the device key from the public list, based on the second system apparatus key; and a decryption unit operable to decrypt the encrypted content, based on the specified device key, to generate a decrypted content.

According to these structures, a content is encrypted based on an device key allotted to a user apparatus, the user apparatus being able to obtain the device key from a released public list and decrypt the encrypted contents using the obtained device key. As a result, the encrypted content will not be decrypted imprudently by apparatuses other than the user apparatus.

Here, the contents supply apparatus may include a tree system in which the first system apparatus key is allotted to a leaf and node keys are allotted to other nodes, determine the device key from among one or more node keys managed using the tree system, and use the determined device key to generate the public list, and the user apparatus may use the tree system to specify the device key from the public list.

Here, the encryption unit may include a tree system in which the first system apparatus key is allotted to a leaf and node keys are allotted to other nodes, and determine the device key from among one or more node keys managed using the tree system.

Here, the contents supply apparatus may include a tree system in which the first system apparatus key is allotted to a leaf and node keys are allotted to other nodes, determine the device key from among one or more node keys managed using the tree system, and use the determined device key to generate the public list, and the device key specifying unit may use the tree system to specify the device key from the public list.

According to these structures, keys are managed using a tree system, and thus it is possible to reduce the data amount of the key information to be managed by a contents supply apparatus.

Here, the contents supply apparatus may output only information relating to the user apparatus from the public list, and the user apparatus may obtain only information relating to the user apparatus from the public list.

Here, the output unit may release the public list via a web server, a package medium or a broadcast medium.

Here, the contents supply apparatus may release the public list via a web server, a package medium or a broadcast medium, and the obtaining unit may obtain the public list via the web server, the package medium or the broadcast medium.

According to these structures, the encrypted key information is transmitted to a user apparatus via a web server, package media or broadcast media, and thus the user apparatus can easily obtain the encrypted key information via one of these media.

Here, the contents supply apparatus may output only information relating to the user apparatus from the public list, and the user apparatus may obtain only information relating to the user apparatus from the public list.

Here, the public list generation unit may generate only user apparatus related information in the public list, and the output unit may release the user apparatus related information.

Here, the contents supply apparatus may generate and release only user apparatus related information in the public list, the obtaining unit may obtain the user apparatus related information, and the device key specifying unit may specify the device key corresponding to the user apparatus from the user apparatus related information.

According to these structures, only the piece of encrypted key information relating to a user apparatus is transmitted to the user apparatus, and thus the transmitted data amount can be reduced.

Here, the public list generation unit may (i) generate, for each node that is not a leaf in the tree system, an encrypted node key by encrypting a node key allotted to the node, using a node key allotted to a child node of the node, and (ii) generate the public list to include the encrypted node key.

Here, the contents supply apparatus may (i) generate, for each node that is not a leaf in the tree system, an encrypted node key by encrypting a node key allotted to the node, using a node key allotted to a child node of the node, and (ii) generate the public list to include the encrypted node key, and the device key specifying unit may decrypt an encrypted node key included in the public list using a node key corresponding to a node in the tree system, to derive a node key of a parent node of the node.

According to these structures, a parent node key is encrypted using a child node key, and the encrypted parent node key can be decrypted to derive the child node key. As a result, it is possible to determine the node keys in order from the child nodes to the parent nodes in a tree system.

Here, the public list generation unit may (i) generate, for each node that is not a leaf in the tree system, a node key of the node by performing a one-way function on a node key allotted to a child node of the node, (ii) encrypt the generated node key using a node key allotted to another child node of the node, to generate an encrypted node key, and (iii) generate the public list to include the encrypted node key.

Here, the contents supply apparatus may (i) generate, for each node that is not a leaf in the tree system, a node key of the node by performing a one-way function on a node key allotted to a child node of the node, (ii) encrypt the generated node key using a node key allotted to another child node of the node, to generate an encrypted node key, and (iii) generate the public list to include the encrypted node key, and the device key specifying unit may select a value that is one of (i) a deciphertext generated by decrypting an encrypted node key included in the public list, using a node key corresponding to a node in the tree system, and (ii) an output value obtained by performing a one-way function on the node key corresponding to the node, and set the selected value as a node key of a parent node of the node.

According to these structures, some of the parent node keys are generated by performing a one-way function on a child node key, and thus a reduction in the data amount of encrypted key information for release can be realized.

Here, the public list generation unit may generate, on an (x,y) plane, a $(k+m-1)^{th}$ order curve that connects node keys of k number of nodes sharing the same parent node in the tree system, and generate the public list to include (k+m−1) number of points on the curve excluding the node keys, where k is an integer greater than or equal to 2, m is an integer greater than or equal to 0, the tree system has a k-ary tree, and each node key is a point on the (x,y) plane.

Here, the contents supply apparatus may generate, on an (x,y) plane, a $(k+m-1)^{th}$ order curve that connects node keys of k number of nodes sharing the same parent node in the tree system, and generate the public list to include (k+m−1) number of points on the curve excluding the node keys, where k is an integer greater than or equal to 2, m is an integer greater than or equal to 0, the tree system has a k-ary tree, and each node key is a point on the (x,y) plane, and the device key specifying unit may derive a $(k+m-1)^{th}$ order curve that connects a node key corresponding to a node in the tree system and (k+m−1) number of points included in the public list, and derive, from the curve, a node key corresponding to a parent node of the node by performing a one-way function.

According to these structures, node keys can be decrypted securely and while maintaining secrecy.

Here, the public list generation unit may (i) generate a public key/secret key pair for public key cryptography, stores the secret key secretly, and generate the public list to include the public key, and may (ii) for each node that is not a leaf in the tree system, encrypt a node key corresponding to the node using the secret key, to generate an encrypted node key, and set the generated node key as a node key corresponding to a child node of the node, and the output unit may release the public list.

Here, the contents supply apparatus may (i) generate a public key/secret key pair for public key cryptography, stores the secret key secretly, and generate the public list to include the public key, and may (ii) for each node that is not a leaf in the tree system, encrypt a node key corresponding to the node using the secret key, to generate an encrypted node key, set the generated node key as a node key corresponding to a child node of the node, and release the public list, and the device key specifying unit may decrypt a node key corresponding to a node in the tree system, using the public key included in the public list, and set the decryption result as a node key corresponding to a parent node of the node.

A public key encryption method is used according to these structures, and thus node keys can be decrypted securely and while maintaining secrecy.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A contents supply apparatus in a data distribution system structured from a key management apparatus, a plurality of the contents supply apparatuses, and a user apparatus, the key management apparatus (i) being operable to output to the user apparatus an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, the contents supply apparatus comprising:

a storage unit operable to store a content which is a digital work;

an obtaining unit operable to obtain the first system apparatus key from the key management apparatus;

an encryption unit operable to determine, based on the first system apparatus key, a device key that an encryption of a content is based on, and to encrypt a content which is a digital work, based on the device key, to generate an encrypted content;

a public list generation unit operable to generate, based on the first system apparatus key, a public list for specifying the device key; and an output unit operable to output the encrypted content to the user apparatus, and to release the public list;

wherein the encryption unit includes a tree system in which the first system apparatus key is allotted to a leaf and node keys are allotted to other nodes, and is operable to determine the device key from among one or more node keys managed using the tree system; and wherein the public list generation unit is operable to generate, on an (x,y) plane, a $(k+m-1)^{th}$ order curve that connects node keys of k number of nodes sharing the same parent node in the tree system, and generates the public list to include (k+m−1) number of points on the curve excluding the node keys, where k is an integer greater than or equal to 2, m is an integer greater than or equal to 0, the tree system has a k-ary tree, and each node key is a point on the (x,y) plane.

2. The contents supply apparatus of claim 1, wherein the public list generation unit is operable to set, as a node key corresponding to the shared parent node, a point uniquely determined from the $(k+m-1)^{th}$ order curve by a predetermined technique that uses a one-way function.

3. A contents supply apparatus in a data distribution system structured from a key management apparatus, a plurality of the contents supply apparatuses, and a user apparatus, the key management apparatus (i) being operable to output to the user apparatus an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, the contents supply apparatus comprising:

a storage unit operable to store a content which is a digital work;

an obtaining unit operable to obtain the first system apparatus key from the key management apparatus;

an encryption unit operable to determine, based on the first system apparatus key, a device key that an encryption of a content is based on, and to encrypt a content which is a digital work, based on the device key, to generate an encrypted content;

a public list generation unit operable to generate, based on the first system apparatus key, a public list for specifying the device key; and an output unit operable to output the encrypted content to the user apparatus, and to release the public list;

wherein the encryption unit includes a tree system in which the first system apparatus key is allotted to a leaf and node keys are allotted to other nodes, and is operable to determine the device key from among one or more node keys managed using the tree system;

wherein the public list generation unit (i) is operable to generate a public key/secret key pair for public key cryptography, to store the secret key secretly, and to generate the public list to include the public key, and (ii) for each node that is not a leaf in the tree system, is operable to encrypt a node key corresponding to the node using the secret key, to generate an encrypted node key, and to set the generated node key as a node key corresponding to a child node of the node;

wherein the output unit releases the public list; and wherein the public list generation unit (a) is operable to calculate a product n of secret prime numbers p and q, (b) is operable to derive a lowest common multiple L of p-1 and q-1, (c) is operable to derive an integer e that is less than or equal to L and relatively prime with n, (d) is operable to derive, as the secret key, an inverse d of e mod L, (e) is operable to generate the public list to include, as a public key, the integer e and the product n, (f) is operable to perform an exclusive-OR on the node key corresponding to the node and path information uniquely determined in advance for a path connecting the node to the child node of the node, to derive a value, (g) is operable to encrypt the derived value using the secret key d to generate an encrypted node key, and (h) is operable to set the encrypted node key as the node key corresponding to the child node.

4. A contents supply apparatus in a data distribution system structured from a key management apparatus, a plurality of the contents supply apparatuses, and a user apparatus, the key management apparatus (i) being operable to output to the user apparatus an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, the contents supply apparatus comprising:

a storage unit operable to store a content which is a digital work;

an obtaining unit operable to obtain the first system apparatus key from the key management apparatus;

an encryption unit operable to determine, based on the first system apparatus key, a device key that an encryption of a content is based on, and to encrypt a content which is a digital work, based on the device key, to generate an encrypted content;

a public list generation unit operable to generate, based on the first system apparatus key, a public list for specifying the device key; and an output unit operable to output the encrypted content to the user apparatus, and to release the public list;

wherein the encryption unit includes a tree system in which the first system apparatus key is allotted to a leaf and node keys are allotted to other nodes, and is operable to determine the device key from among one or more node keys managed using the tree system; and wherein the public list generation unit is operable to:
(A) for each node having a child node that is a leaf of a tree system, (a) encrypt a node key allotted to the node using a node key allotted to a child node of the node, to generate an encrypted node key, and generate the public list to include the encrypted node key, or (b) generate a node key of the node by performing a one-way function on a node key allotted to a child node of the node, encrypt the generated node key using a node key allotted to another child node of the node, to generate an encrypted node key, and generate the public list to include the encrypted node key, or (c) generate, on an (x,y) plane, a $(k+m-1)^{th}$ order curve that connects node keys of k number of leaves sharing the same parent node, and generate the public list to include (k+m−1) number of points on the curve excluding the node keys, where k is an integer greater than or equal to 2, m is an integer greater than or equal to 0, the tree system has a k-ary tree, and each node key is a point on the (x,y) plane, and
(B) for each node having a child node that is not a leaf or a parent node of a leaf in the tree system, generate a public key/secret key pair for public key cryptography, store the secret key secretly, generate the public list to include the public key, encrypt a node key corresponding to the node using the secret key, to generate an encrypted node key, and set the generated node key as a node key corresponding to a child node of the node.

5. A user apparatus in a data distribution system structured from a key management apparatus, a plurality of contents supply apparatuses, and the user apparatus, the key management apparatus (i) being operable to output to the user apparatus, an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, each contents supply apparatus being operable to receive the first system apparatus key, encrypt a content which is a digital work, based on the first system apparatus key, to generate an encrypted content, and output the encrypted content to the user apparatus, the user apparatus comprising:
an obtaining unit operable to receive the apparatus key from the key management apparatus;
a receiving unit operable to receive the encrypted content from the contents supply apparatus;
a system apparatus key generation unit operable to generate a second system apparatus key unique to the user apparatus by performing the one-way function, based on the apparatus key and the system information unique to the contents supply apparatus; and
a decryption unit operable to decrypt the encrypted content, based on the second system apparatus key, to generate a decrypted content.

6. A user apparatus in a data distribution system structured from a key management apparatus, a plurality of contents supply apparatuses, and the user apparatus, the key management apparatus (i) being operable to output to the user apparatus, an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, each contents supply apparatus being operable to (i) receive the first system apparatus key, (ii) determine, based on the first system apparatus key, a device key that an encryption of a content is based on, (iii) encrypt a content which is a digital work, based on the device key, to generate an encrypted content, (iv) output the encrypted content to the user apparatus, (v) generate, based on the first system apparatus key, a public list for specifying the device key, and (vi) release the generated public list, the user apparatus comprising:
an obtaining unit operable to receive the apparatus key from the key management apparatus, obtain the released public list, and receive the encrypted content from the contents supply apparatus;
a system apparatus key generating unit operable to generate a second system apparatus key unique to the user apparatus by performing the one-way function, based on the apparatus key and the system information unique to the contents supply apparatus;
a device key specifying unit operable to specify the device key from the public list, based on the second system apparatus key; and
a decryption unit operable to decrypt the encrypted content, based on the specified device key, to generate a decrypted content.

7. The user apparatus of claim 6, wherein
the contents supply apparatus is operable to release the public list via a web server, a package medium or a broadcast medium, and
the obtaining unit is operable to obtain the public list via the web server, the package medium or the broadcast medium.

8. The user apparatus of claim 7, wherein
the contents supply apparatus is operable to generate and release only user apparatus related information in the public list,
the obtaining unit is operable to obtain the user apparatus related information, and
the device key specifying unit is operable to specify the device key corresponding to the user apparatus from the user apparatus related information.

9. The user apparatus of claim 6, wherein
the contents supply apparatus includes a tree system in which the first system apparatus key is allotted to a leaf and node keys are allotted to other nodes, the contents supply apparatus is operable to determine the device key from among one or more node keys managed using the tree system, and is operable to use the determined device key to generate the public list, and
the device key specifying unit is operable to use the tree system to specify the device key from the public list.

10. The user apparatus of claim 9, wherein
the device key specifying unit is operable to sequentially derive, from the second system apparatus key allotted to a leaf in the tree system using the obtained public list, a node key corresponding to each node on a route from the leaf to a root of the tree system.

11. The user apparatus of claim 10, wherein
the contents supply apparatus (i) is operable to generate, for each node that is not a leaf in the tree system, an encrypted node key by encrypting a node key allotted to the node, using a node key allotted to a child node of the node, and (ii) is operable to generate the public list to include the encrypted node key, and the device key specifying unit is operable to decrypt an encrypted node key included in the public list using a node key corresponding to a node in the tree system, to derive a node key of a parent node of the node.

12. The user apparatus of claim 10, wherein the contents supply apparatus is operable to (i) generate, for each node that is not a leaf in the tree system, a node key of the node by performing a one-way function on a node key allotted to a child node of the node, (ii) encrypt the generated node key using a node key allotted to another child node of the node, to generate an encrypted node key, and (iii) generate the public list to include the encrypted node key, and the device key specifying unit is operable to select a value that is one of (i) a deciphertext generated by decrypting an encrypted node key included in the public list, using a node key corresponding to a node in the tree system, and (ii) an output value obtained by performing a one-way function on the node key corresponding to the node, and is operable to set the selected value as a node key of a parent node of the node.

13. The user apparatus of claim 10, wherein the contents supply apparatus is operable to generate, on an (x,y) plane, a $(k+m-1)^{th}$ order curve that connects node keys of k number of nodes sharing the same parent node in the tree system, and is operable to generate the public list to include (k+m−1) number of points on the curve excluding the node keys, where k is an integer greater than or equal to 2, m is an integer greater than or equal to 0, the tree system has a k-ary tree, and each node key is a point on the (x,y) plane, and the device key specifying unit is operable to derive a $(k+m-1)^{th}$ order curve that connects a node key corresponding to a node in the tree system and (k+m−1) number of points included in the public list, and derive, from the curve, a node key corresponding to a parent node of the node by performing a one-way function.

14. The user apparatus of claim 10, wherein the contents supply apparatus is operable to (i) generate a public key/secret key pair for public key cryptography, store the secret key secretly, and generate the public list to include the public key, and (ii) for each node that is not a leaf in the tree system, is operable to encrypt a node key corresponding to the node using the secret key, to generate an encrypted node key, set the generated node key as a node key corresponding to a child node of the node, and release the public list, and the device key specifying unit is operable to decrypt a node key corresponding to a node in the tree system, using the public key included in the public list, and set the decryption result as a node key corresponding to a parent node of the node.

15. The user apparatus of claim 14, wherein the contents supply apparatus is operable to (a) calculate a product n of secret prime numbers p and q, (b) derive a lowest common multiple L of p-1 and q-1, (c) derive an integer e that is less than or equal to L and relatively prime with n, (d) derive, as the secret key, an inverse d of e mod L, (e) generate the public list to include, as a public key, the integer e and the product n, (f) perform an exclusive-OR on the node key corresponding to the node and path information uniquely determined in advance for a path connecting the node to the child node of the node, to derive a value, (g) encrypt the derived value using the secret key d to generate an encrypted node key, and (h) set the encrypted node key as the node key corresponding to the child node, and the device key specifying unit is operable to decrypt a node key corresponding to a node in the tree system, using the public key (e,n) included in the public list, perform an exclusive-OR on the decryption result and path information of a path connecting the node and a parent node of the node, to derive a value, and set the derived value as a node key corresponding to the parent node.

16. The user apparatus of claim 10, wherein the contents supply apparatus is operable to:

(A) for each node having a child node that is a leaf of a tree system, (a) encrypt a node key allotted to the node using a node key allotted to a child node of the node, to generate an encrypted node key, and generate the public list to include the encrypted node key, or (b) generate a node key of the node by performing a one-way function on a node key allotted to a child node of the node, encrypt the generated node key using a node key allotted to another child node of the node, to generate an encrypted node key, and generate the public list to include the encrypted node key, or (c) generate, on an (x,y) plane, a $(k+m-1)^{th}$ order curve that connects node keys of k number of leaves sharing the same parent node, and generate the public list to include (k+m−1) number of points on the curve excluding the node keys, where k is an integer greater than or equal to 2, m is an integer greater than or equal to 0, the tree system has a k-ary tree, and each node key is a point on the (x,y) plane, and (B) for each node having a child node that is not a leaf or a parent node of a leaf in the tree system, generate a public key/secret key pair for public key cryptography, store the secret key secretly, generate the public list to include the public key, encrypt a node key corresponding to the node using the secret key, to generate an encrypted node key, and set the generated node key as a node key corresponding to a child node of the node, and the device key specifying unit is operable to:

(A) for each node that is a leaf in the tree system, (a) decrypt an encrypted node key included in the public list using a node key corresponding to the node, to derive a node key of a parent node of the node, or (b) select a value that is one of a deciphertext generated by decrypting an encrypted node key in the public list using a node key corresponding to the node and an output value obtained by performing a one-way function on the node key corresponding to the node, and sets the selected value as a node key of a parent node of the node, or (c) derive a $(k+m-1)^{th}$ order curve that connects a node key corresponding to the node and (k+m−1) number of points included in the public list, and derive, from the curve, a node key corresponding to a parent node of the node by performing a one-way function, and (B) for each node that is not a leaf or a parent node of a leaf in the tree system, decrypt a node key corresponding to the node, using the public key included in the public list, and set the decryption result as a node key corresponding to a parent node of the node.

17. A method used by a user apparatus that is in a data distribution system structured from a key management apparatus, a plurality of contents supply apparatuses, and the user apparatus, the key management apparatus (i) being operable to output to the user apparatus, an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, each contents supply apparatus being operable to receive the first system apparatus key, encrypt a content which is a digital work, based on the first system apparatus key, to generate an encrypted content, and output the encrypted content to the user apparatus, the method comprising:

an obtaining step of receiving the apparatus key from the key management apparatus;

a receiving step of receiving the encrypted content from the contents supply apparatus;

a system apparatus key generation step of generating a second system apparatus key unique to the user apparatus by performing the one-way function, based on the apparatus key and the system information unique to the contents supply apparatus; and a decryption step of decrypting the encrypted content, based on the second system apparatus key, to generate a decrypted content.

18. A computer program used by a user apparatus that is in a data distribution system structured from a key management apparatus, a plurality of contents supply apparatuses, and the user apparatus, the key management apparatus (i) being operable to output to the user apparatus, an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, each contents supply apparatus being operable to receive the first system apparatus key, encrypt a content which is a digital work, based on the first system apparatus key, to generate an encrypted content, and output the encrypted content to the user apparatus, the computer program comprising:

an obtaining step of receiving the apparatus key from the key management apparatus;

a receiving step of receiving the encrypted content from the contents supply apparatus;

a system apparatus key generation step of generating a second system apparatus key unique to the user apparatus by performing the one-way function, based on the apparatus key and the system information unique to the contents supply apparatus; and a decryption step of decrypting the encrypted content, based on the second system apparatus key, to generate a decrypted content.

19. A computer-readable storage medium storing a computer program used by a user apparatus that is in a data distribution system structured from a key management apparatus, a plurality of contents supply apparatuses, and the user apparatus, the key management apparatus (i) being operable to output to the user apparatus, an apparatus key unique to the user apparatus, and (ii) for each contents supply apparatus, being operable to generate a first system apparatus key unique to the user apparatus by performing a one-way function, based on the apparatus key and system information unique to the contents supply apparatus, and output the first system apparatus key to the contents supply apparatus, each contents supply apparatus being operable to receive the first system apparatus key, encrypt a content which is a digital work, based on the first system apparatus key, to generate an encrypted content, and output the encrypted content to the user apparatus, the computer program comprising:

an obtaining step of receiving the apparatus key from the key management apparatus;

a receiving step of receiving the encrypted content from the contents supply apparatus;

a system apparatus key generation step of generating a second system apparatus key unique to the user apparatus by performing the one-way function, based on the apparatus key and the system information unique to the contents supply apparatus; and a decryption step of decrypting the encrypted content, based on the second system apparatus key, to generate a decrypted content.

* * * * *